(12) United States Patent
Song et al.

(10) Patent No.: US 11,460,671 B2
(45) Date of Patent: Oct. 4, 2022

(54) CAMERA LENS ASSEMBLY

(71) Applicant: Zhejiang Sunny Optical Co., Ltd., Ningbo (CN)

(72) Inventors: Bo Song, Ningbo (CN); Jianke Wenren, Ningbo (CN)

(73) Assignee: Zhejiang Sunny Optical Co., Ltd.

( * ) Notice: Subject to any disclaimer, the term of this patent is extended or adjusted under 35 U.S.C. 154(b) by 370 days.

(21) Appl. No.: 16/843,626

(22) Filed: Apr. 8, 2020

(65) Prior Publication Data

US 2020/0249439 A1 Aug. 6, 2020

Related U.S. Application Data

(63) Continuation of application No. PCT/CN2018/100479, filed on Aug. 14, 2018.

(51) Int. Cl.
*G02B 13/00* (2006.01)
*G02B 9/64* (2006.01)
*G02B 13/06* (2006.01)
*G02B 27/00* (2006.01)

(52) U.S. Cl.
CPC ............ *G02B 13/0045* (2013.01); *G02B 9/64* (2013.01); *G02B 13/06* (2013.01); *G02B 27/0025* (2013.01)

(58) Field of Classification Search
CPC ...... G02B 13/0045; G02B 9/64; G02B 13/06; G02B 27/0025; G02B 13/18
See application file for complete search history.

(56) References Cited

U.S. PATENT DOCUMENTS

2013/0155527 A1*  6/2013  Yoneyama ............... G02B 7/04
359/745

FOREIGN PATENT DOCUMENTS

CN    107085285 A    8/2017

* cited by examiner

Primary Examiner — James C. Jones
(74) Attorney, Agent, or Firm — Barnes & Thornburg LLP

(57) ABSTRACT

The application discloses a camera lens assembly, and the lens assembly includes, sequentially from an object side to an image side along an optical axis: a first lens having a positive refractive power, an image side surface of which is a concave surface; a second lens having a refractive power; a third lens having a refractive power; a fourth lens having a refractive power; a fifth lens having a refractive power; a sixth lens having a positive refractive power, an object side surface of which is a concave surface; a seventh lens having a refractive power; and an eighth lens having a negative refractive power, an object side surface of which is a concave surface. A total effective focal length f of the camera lens assembly and an entrance pupil diameter EPD of the camera lens assembly satisfy $f/EPD \leq 2.0$.

20 Claims, 18 Drawing Sheets

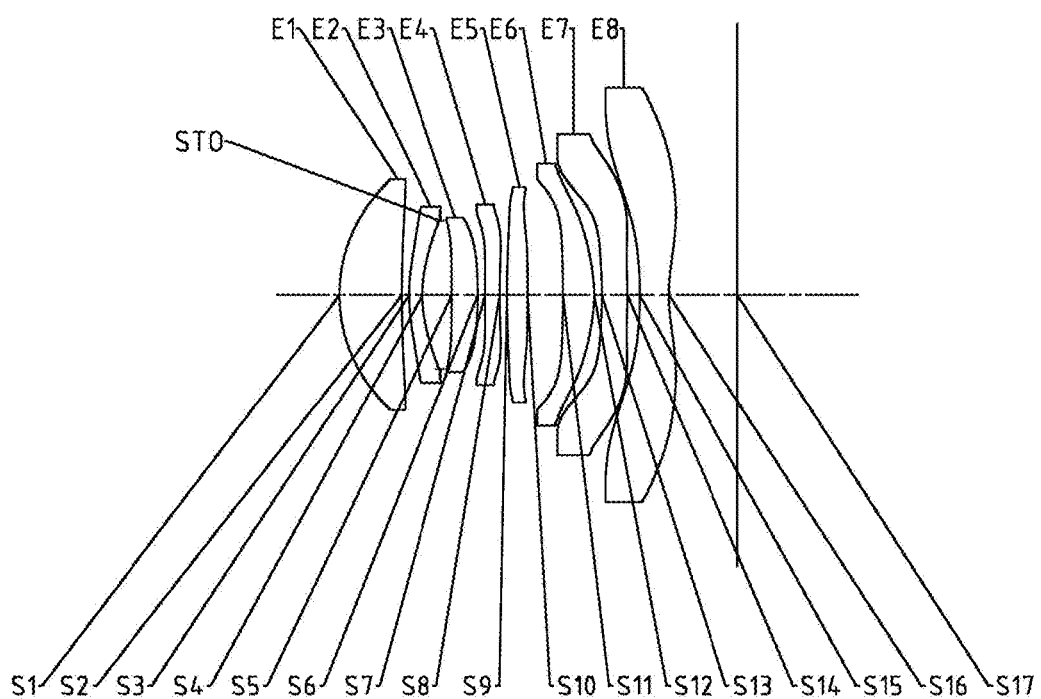
Fig. 1
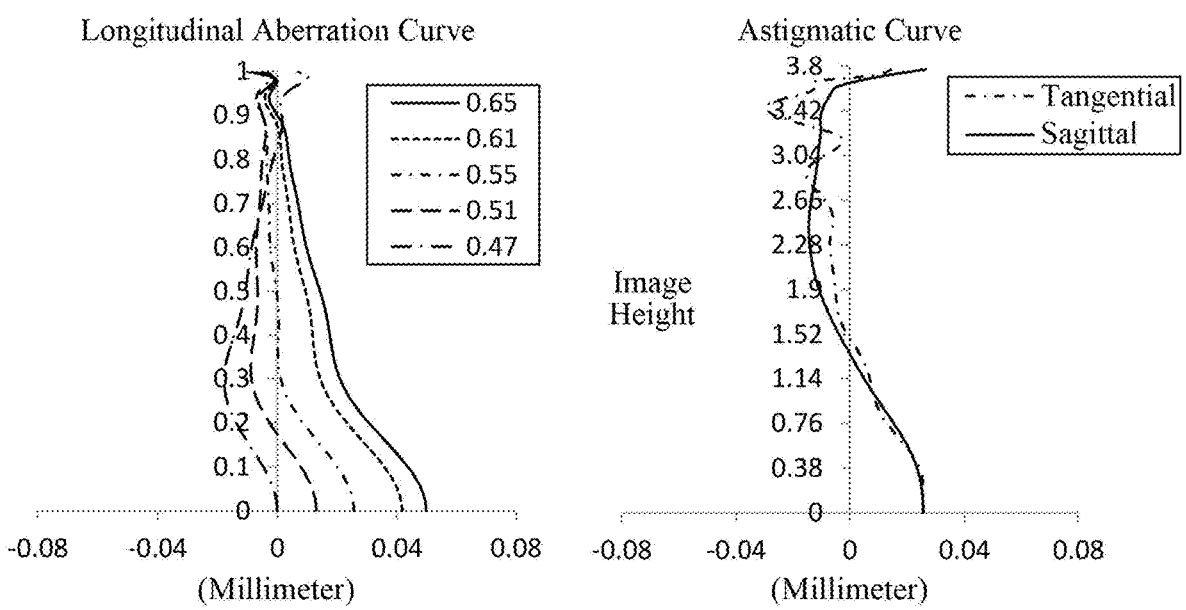
Fig. 2A
Fig. 2B

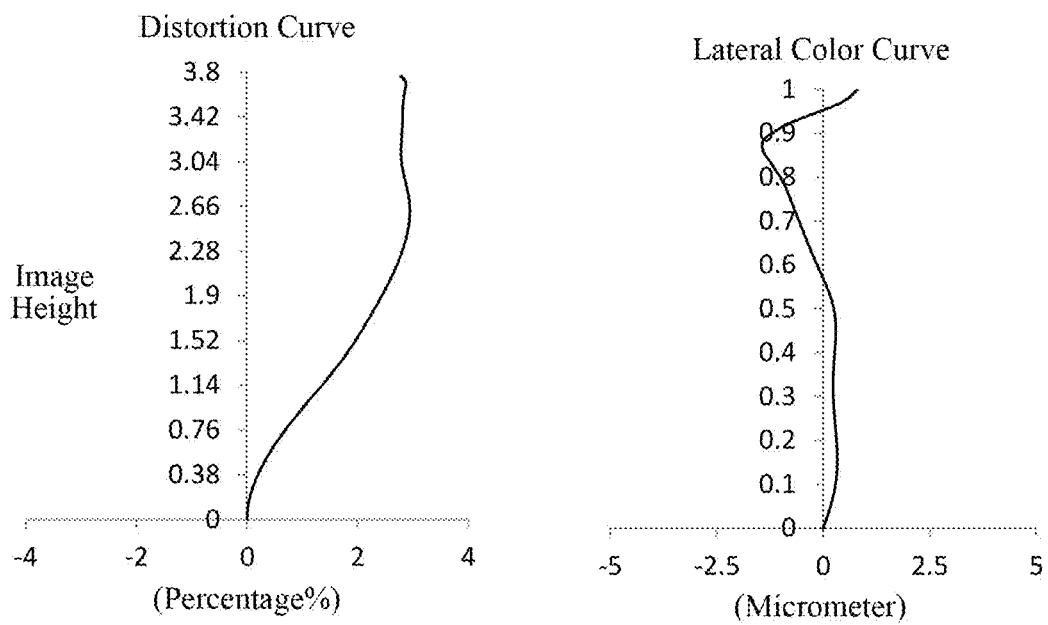
Fig. 2C
Fig. 2D
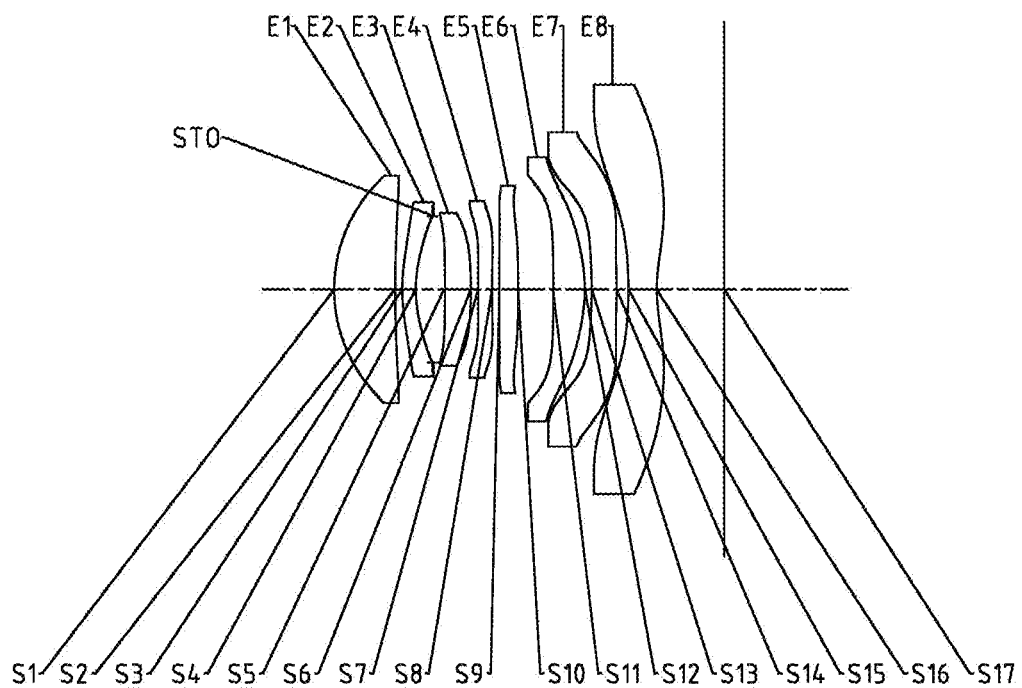
Fig. 3

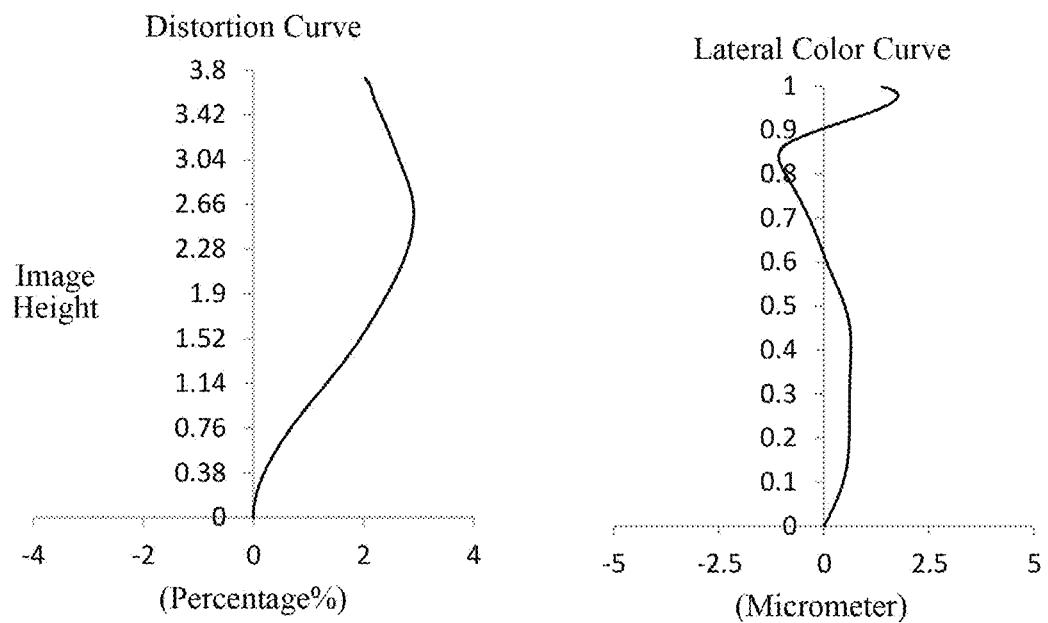
Fig. 6C
Fig. 6D
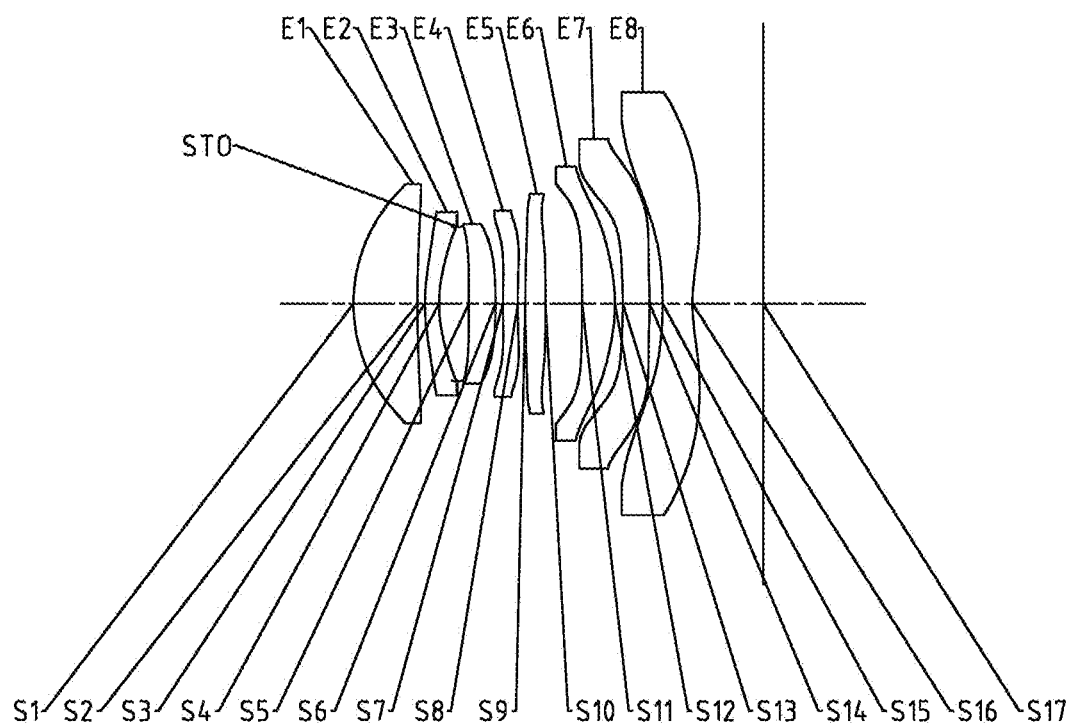
Fig. 7

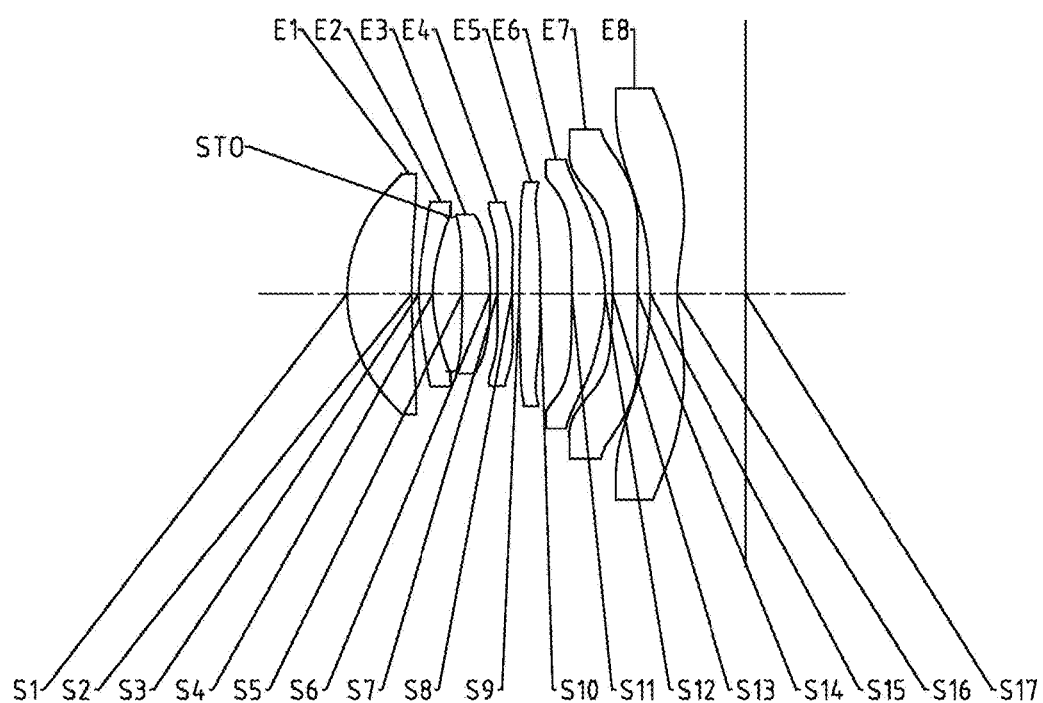
Fig. 9
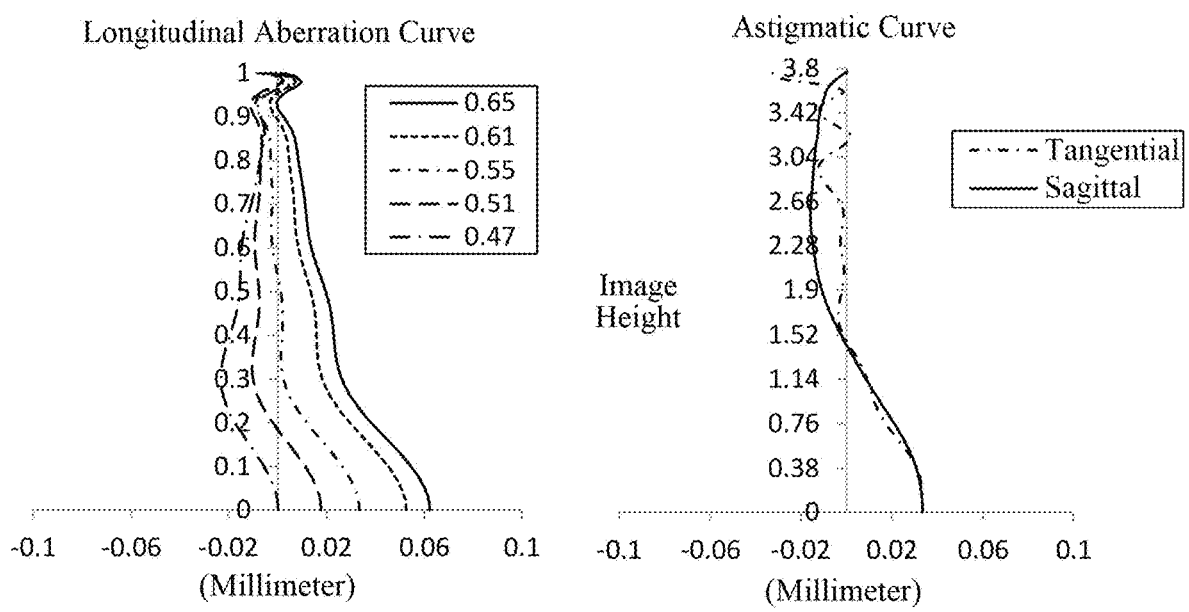
Fig. 10A
Fig. 10B

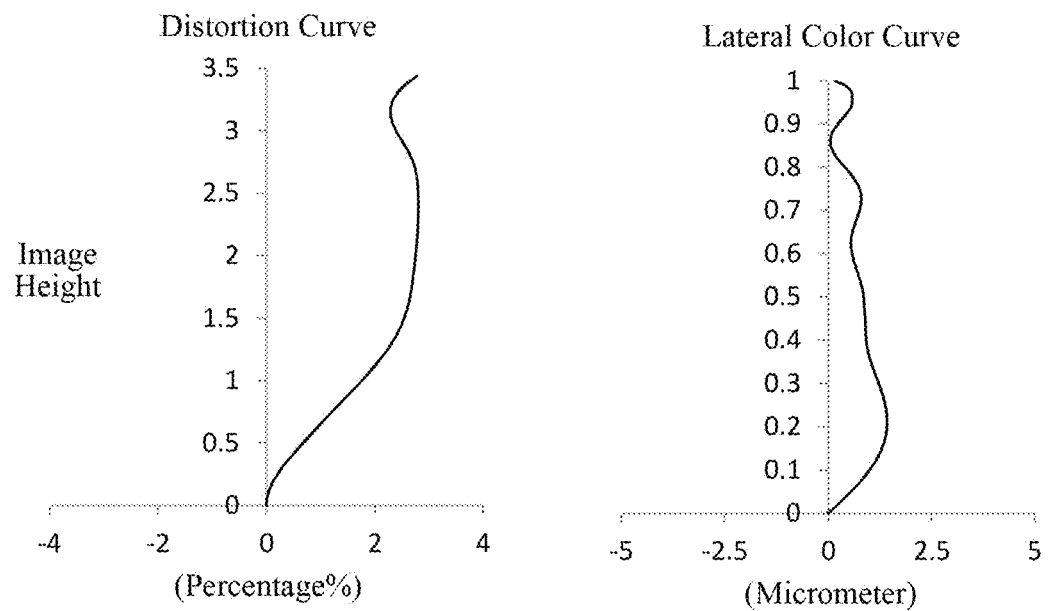
Fig. 18C
Fig. 18D
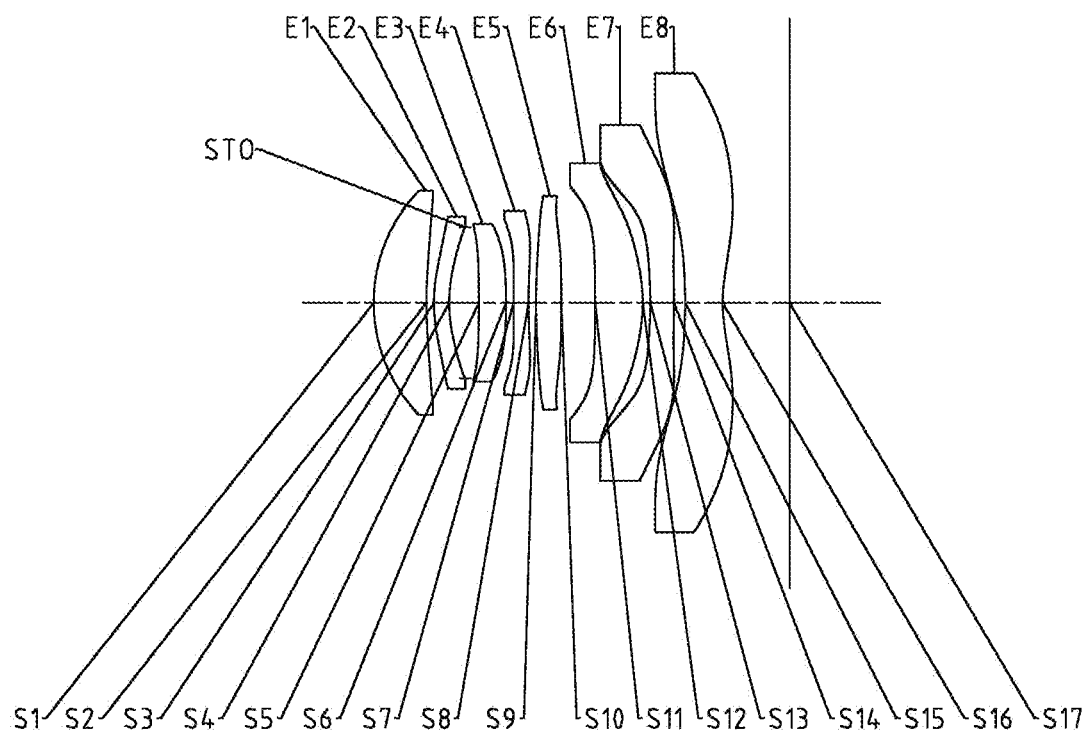
Fig. 19

US 11,460,671 B2

CAMERA LENS ASSEMBLY

CROSS-REFERENCE TO RELATED APPLICATIONS

The present patent application is a continuation of International Application No. PCT/CN2018/100479, filed on Aug. 14, 2018, which claims priority from Chinese Patent Application No. 201711105103.4, filed before the State Intellectual Property Office (SIPO) of China on Nov. 10, 2017, and Chinese Patent Application No. 201721494117.5 filed before the SIPO on Nov. 10, 2017, the disclosures of all the aforementioned patent applications are hereby incorporated by reference in their entirety.

TECHNICAL FIELD

The present application relates to a camera lens assembly, and more particularly, to a camera lens assembly with a large field of view and a large aperture and including eight lenses.

BACKGROUND

As the performance of the conventional photosensitive elements, such as a photosensitive Charge-Coupled Device (CCD) or a Complementary Metal-Oxide Semiconductor (CMOS), is improved and the size thereof is reduced, the number of pixels of the photosensitive element is increased while the size of each pixel is reduced. Therefore, it has raised a higher requirement to get high imaging quality and miniaturize a camera lens assembly to which the photosensitive elements will be applied.

The reduction in size of the photosensitive elements means that the amount of light into an imaging system will be smaller in the same exposure time. However, image sensors and the environmental background have certain system noise, and thus a certain amount of light is required to pass through the imaging system. The imaging system can achieve a better imaging quality only when the effective light amount is enough. Generally, an eight-lens optical imaging system can effectively correct aberration of a large amount of light. However, the total track length of the imaging system is not satisfactory due to a large number of lenses, and thus it is hard to meet the requirement of thinning portable electronic products, such as smart phones.

Therefore, the application provides an eight-lens optical imaging system, which is applicable to portable electronic products and has an ultrathin large aperture and good imaging quality.

SUMMARY

The present application provides a camera lens assembly, such as a large aperture lens, applicable to portable electronic products, which may at least solve or partially solve at least one of the above-mentioned disadvantages in the prior art.

On one aspect, the present application provides a camera lens assembly. Sequentially from an object side to an image side along an optical axis, the lens assembly includes a first lens having a positive refractive power, an image side surface of which may be a concave surface; a second lens having n refractive power; a third lens having a refractive power; a fourth lens having a refractive power; a fifth lens having a refractive power; a sixth lens having a positive refractive power, an object side surface of which may be a concave surface; a seventh lens having a refractive power; a eighth lens having a negative refractive power, an object side surface of which may be a concave surface. A total effective focal length f of the camera lens assembly and an entrance pupil diameter EPD of the camera lens assembly may satisfy $f/EPD \leq 2.0$.

In an implementation, a total track length TTL of the camera lens assembly and half of a diagonal length ImgH of an effective pixel area on an imaging plane of the camera lens assembly may satisfy $TTL/ImgH \leq 1.6$.

In an implementation, a full field of view FOV of the camera lens assembly may satisfy $75° < FOV < 85°$.

In an implementation, the camera lens assembly may further include a stop, and the stop may be disposed between the second lens and the third lens.

In an implementation, an effective focal length f2 of the second lens and the total effective focal length f of the camera lens assembly may satisfy $-10 < f2/f < 25$.

In an implementation, an effective focal length f4 of the fourth lens and the total effective focal length f of the camera lens assembly may satisfy $-45 < f4/f < 25$.

In an implementation, an effective focal length f7 of the seventh lens and the total effective focal length f of the camera lens assembly may satisfy $-30 < f7/f < 50$.

In an implementation, a radius of curvature R11 of the object side surface of the sixth lens and a radius of curvature R12 of an image side surface of the sixth lens may satisfy $4 < R11/R12 < 10$.

In an implementation, a center thickness CT1 of the first lens on the optical axis and a center thickness CT2 of the second lens on the optical axis may satisfy $2 < CT1/CT2 < 6$.

In an implementation, a total track length TTL of the camera lens assembly, half of a diagonal length ImgH of an effective pixel area on an imaging plane of the camera lens assembly, the total effective focal length f of the camera lens assembly, and the entrance pupil diameter EPD of the camera lens assembly may satisfy $0.5 < (TTL/ImgH)/(f/EPD) \leq 1.5$.

In an implementation, an effective focal length f7 of the seventh lens and an effective focal length f8 of the eighth lens may satisfy $-65 < f7/f8 < 45$.

In an implementation, an effective focal length f7 of the seventh lens and a radius of curvature R6 of an image side surface of the third lens may satisfy $-25 < f7/R6 < 20$.

On another aspect, the present application provides a camera lens assembly including, sequentially from an object side to an image side along an optical axis, a first lens having a positive refractive power, an image side surface of which may be a concave surface; a second lens having a refractive power; a third lens having a refractive power; a fourth lens having a refractive power; a fifth lens having a refractive power; a sixth lens having a positive refractive power, an object side surface of which may be a concave surface; a seventh lens having a refractive power; and an eighth lens having a negative refractive power, an object side surface of which may be a concave surface. A center thickness CT1 of the first lens on the optical axis and a center thickness CT2 of the second lens on the optical axis may satisfy $2 < CT1/CT2 < 6$.

On yet another aspect, the present application provides a camera lens assembly including, sequentially from an object side to an image side along an optical axis, a first lens having a positive refractive power, an image side surface of which may be a concave surface; a second lens having a refractive power; a third lens having a refractive power; a fourth lens having a refractive power; a fifth lens having a refractive power; a sixth lens having a positive refractive power, an object side surface of which may be a concave surface; a seventh lens having a refractive power; a eighth lens having a negative refractive power, an object side surface of which may be a concave surface. A radius of radius of curvature R11 of the object side surface of the sixth lens and a radius of curvature R12 of an image side surface of the sixth lens may satisfy 4<R11/R12<10.

On yet another aspect, the present application provides a camera lens assembly including, sequentially from an object side to an image side along an optical axis, a first lens having a positive refractive power, an image side surface of which may be a concave surface; a second lens having an refractive power; a third lens having a refractive power; a fourth lens having a refractive power; a fifth lens having a refractive power; a sixth lens having a positive refractive power, an object side surface of which may be a concave surface; a seventh lens having a refractive power; and an eighth lens having a negative refractive power, an object side surface of which may be a concave surface. The camera lens assembly may further include a stop, and the stop may be disposed between the second lens and the third lens.

The present application employs a plurality of (e.g., eight) lenses, and the camera lens assembly as described above have at least one advantage of ultrathin miniaturization, large aperture, good processability, high imaging quality, and the like, by reasonably assigning the refractive power, surface shape, center thickness of each lens, and on-axis interval between adjacent lens.

BRIEF DESCRIPTION OF THE DRAWINGS

Other features, objects, and advantages of the present application will become more apparent from the following detailed description of non-limiting embodiments when taken in conjunction with the accompanying drawings. In the drawings:

FIG. 1 shows a schematic configuration diagram of a camera lens assembly according to embodiment 1 of the present application;

FIG. 2A to 2D show a longitudinal aberration curve, an astigmatism curve, a distortion curve, and a lateral color curve, respectively, of the camera lens assembly of embodiment 1;

FIG. 3 shows a schematic configuration diagram of a camera lens assembly according to embodiment 2 of the present application;

FIG. 6A to 6D show a longitudinal aberration curve, an astigmatism curve, a distortion curve, and a lateral color curve, respectively, of the camera lens assembly of embodiment 3;

FIG. 7 shows a schematic configuration diagram of a camera lens assembly according to embodiment 4 of the present application;

FIG. 9 shows a schematic configuration diagram of a camera lens assembly according to embodiment 5 of the present application;

FIG. 10A to 10D show a longitudinal aberration curve, an astigmatism curve, a distortion curve, and a lateral color curve, respectively, of the camera lens assembly of embodiment 5;

FIG. 18A to 18D show a longitudinal aberration curve, an astigmatism curve, a distortion curve, and a lateral color curve, respectively, of the camera lens assembly of embodiment 9;

FIG. 19 shows a schematic configuration diagram of a camera lens assembly according to embodiment 10 of the present application;

DETAILED DESCRIPTION

Figure 4A:
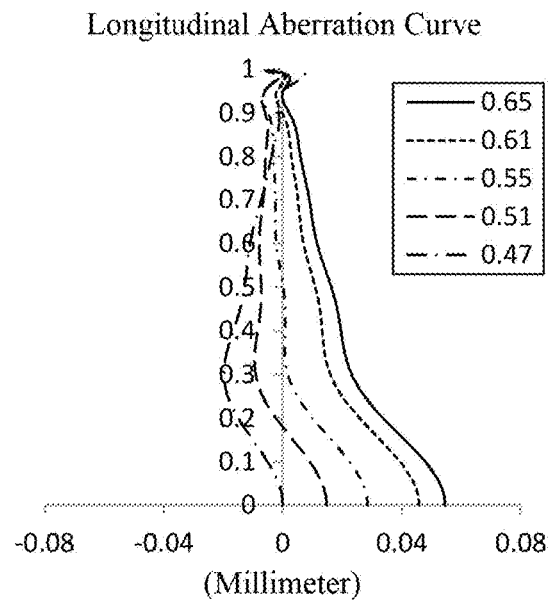
FIG. 4A to 4D show a longitudinal aberration curve, an astigmatism curve, a distortion curve, and a lateral color curve, respectively, of the camera lens assembly of embodiment 2.

For a better understanding of the present application, various aspects of the present application will be described in more detail with reference to the accompanying drawings. It should be understood that the detailed description is merely illustrative of exemplary embodiments of the present application and does not limit the scope of the present application in any way. Throughout the specification, the same reference numerals designate the same elements. The expression "and/or" includes any and all combinations of one or more of the associated listed items.

It should be noted that in the present specification, the expressions such as first, second, third etc. are merely used to distinguish one feature from another without limiting the feature. Thus, a first lens discussed below may also be referred to as a second lens or a third lens without departing from the teachings of the present application.

In the drawings, the thicknesses, sizes and shapes of the lenses have been slightly exaggerated for convenience of explanation. Specifically, spherical or aspherical shapes shown in the drawings are shown by way of example. That is, spherical or aspheric shapes are not limited to the spherical or aspheric shapes shown in the accompanying drawings. The accompanying drawings are merely examples, and not strictly drawn to scale.

Herein, a paraxial area refers to an area near the optical axis. If a surface of a lens is a convex surface and the position of the convex is not defined, it indicates that the surface of the lens is convex at least in the paraxial area; and if a surface of a lens is a concave surface and the position of the concave is not defined, it indicates that the surface of the lens is concave at least in the paraxial area. In each lens, the surface closest to the object side is referred to as an object-side surface; and in each lens, the surface closest to the image side is referred to as an image-side surface.

It should be further understood that the terms "comprising," "including," "having," "containing" and/or "contain," when used in the specification, specify the presence of stated features, elements, and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing implementations of the present application, refers to "one or more implementations of the present application." Also, the term "exemplary" is intended to refer to an example or illustration.

Unless otherwise defined, all terms (including technical and scientific terms) used herein have the same meaning as commonly understood by those of ordinary skill in the art to which the present application belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the embodiments in the present application and the features in the embodiments may be combined with each other on a non-conflict basis. The present application will be described in detail below with reference to the accompanying drawings and in combination with the embodiments.

The following provides a detailed description of the features, principles, and other aspects of the present application.

The camera lens assembly according to the exemplary implementations of the present application includes, for example, eight lenses having refractive power, i.e., a first lens, a second lens, a third lens, a fourth lens, a fifth lens, a sixth lens, a seventh lens, and an eighth lens. The eight lenses are arranged in order from an object side of the lens assembly to an image side of the assembly along an optical axis.

In an exemplary implementation, the first lens may have a positive refractive power, and the image side surface thereof may be a concave surface; the second lens has a positive refractive power or a negative refractive power; the third lens has a positive refractive power or a negative refractive power; the fourth lens has a positive refractive power or a negative refractive power; the fifth lens has a positive refractive power or a negative refractive power; the sixth lens may have a positive refractive power, and an object side surface thereof may be a concave surface; the seventh lens has a positive refractive power or a negative refractive power; and the eighth lens may have a negative refractive power, and the object side surface thereof is a concave surface.

In an exemplary implementation, an object side surface of the first lens may be a convex surface.

In an exemplary implementation, an object side surface of the second lens may be a convex surface and an image side surface thereof may be a concave surface.

In an exemplary implementation, at least one of an object side surface and an image side surface of the third lens may be a convex surface, for example, the image side surface of the third lens may be a convex surface.

In an exemplary implementation, an image side surface of the sixth lens may be a convex surface.

In an exemplary implementation, an object side surface of the seventh lens may be a concave surface, and an image side surface thereof may be a convex surface.

In an exemplary implementation, the camera lens assembly of the present application may satisfy: $f/EPD \leq 2.0$, where f is a total effective focal length of the camera lens assembly, and EPD is an entrance pupil diameter of the camera lens assembly. More specifically, f and EPD may further satisfy $1.35 \leq f/EPD \leq 1.98$. The light amount of the camera lens assembly is reasonably controlled, and thus the low-order aberration of the imaging system is effectively compensated.

In an exemplary implementation, the camera lens assembly of the present application may satisfy $TTL/ImgH \leq 1.6$, where TTL is a total track length of the camera lens assembly (i.e., the distance from the center of the object side surface of the first lens to an imaging surface of the camera lens assembly along the optical axis), and ImgH is half of a diagonal length of an effective pixel area on the imaging plane. More specifically, TTL and ImgH may further satisfy $1.24 \leq TTL/ImgH \leq 1.58$. The miniaturization characteristic of the imaging system is ensured by reasonably making the ratio of TTL to ImgH satisfy these criteria.

In an exemplary implementation, the camera lens assembly of the present application may satisfy $75° < FOV < 85°$, where FOV is a full field of view of the camera lens assembly. More specifically, the FOV may further satisfy $77.5° \leq FOV \leq 82.6°$. By making the full field of view FOV this criteria, the imaging range of the imaging system is effectively controlled.

In an exemplary implementation, the camera lens assembly of the present application may satisfy $-10 < f2/f < 25$, where f2 is an effective focal length of the second lens, and f is a total effective focal length of the camera lens assembly. More specifically, f2 and f may further satisfy $-10 < f2/f < 23$, e.g., $-9.64 \leq f2/f \leq 22.31$. By this, the refractive power range of the second lens is reasonably controlled, and the spherical aberration of the imaging system would be reasonable and thus the low-order aberration of the imaging system would be compensated.

In an exemplary implementation, the camera lens assembly of the present application may satisfy $-45 < f4/f < 25$, where f4 is an effective focal length of the fourth lens, and f is a total effective focal length of the camera lens assembly. More specifically, f4 and f may further satisfy $-44 < f4/f < 23$, e.g., $-43.38 \leq f4/f \leq 22.03$. By this, the refractive power range of the fourth lens is reasonably controlled, and thus the coma of the imaging system is effectively controlled.

In an exemplary implementation, the camera lens assembly of the present application may satisfy −30<f7/f<50, where f7 is an effective focal length of the seventh lens, and f is a total effective focal length of the camera lens assembly. More specifically, f7 and f may further satisfy −24<f7/f<42, e.g., −23.66≤f7/f≤41.98. By this, the refractive power range of the seventh lens is reasonably controlled, the field curvature of the imaging system is effectively controlled.

In an exemplary implementation, the camera lens assembly of the present application may satisfy 4<R11/R12<10, where R11 is a radius of curvature of an object side surface of the sixth lens, and R12 is a radius of curvature of an image side surface of the sixth lens. More specifically, R11 and R12 may further satisfy 4.85≤R11/R12≤9.94. The bending direction and the bending degree of the sixth lens are reasonably controlled, and thus the field curvature of the imaging system is effectively controlled and the imaging quality of the imaging system is improved.

In an exemplary implementation, the camera lens assembly of the present application may satisfy 2<CT1/CT2<6, where CT1 is a center thickness of the first lens on the optical axis, and CT2 is a center thickness of the second lens on the optical axis. More specifically, CT1 and CT2 may further satisfy 2.47≤CT1/CT2≤5.12. The ratio of the center thicknesses of the first lens to the second lens is reasonably controlled, and thus there is a good processability of the imaging system.

In an exemplary implementation, the camera lens assembly of the present application may satisfy 0.5<(TTL/ImgH)/(f/EPD)≤1.5, where TTL is a total track length of the camera lens assembly, ImgH is half of a diagonal length of an effective pixel area on the imaging plane, f is a total effective focal length of the camera lens assembly, and EPD is an entrance pupil diameter of the camera lens assembly. More specifically, TTL, ImgH, f, and EPD may further satisfy 0.72≤(TTL/ImgH)/(f/EPD)≤1.15. By making the ratio of TTL and ImgH and the ratio of f and EPD satisfy these criteria, the imaging system is ensured to have the characteristics of ultrathinness and large aperture.

In an exemplary implementation, the camera lens assembly of the present application may satisfy −65<f7/f8<45, where f7 is an effective focal length of the seventh lens, and f8 is an effective focal length of the eighth lens. More specifically, f7 and f8 may further satisfy −63<f7/f8<43, for example, −60.82≤f7/f8≤42.78. The ratio of the effective focal lengths of the seventh lens and the eighth lens is reasonably controlled, so that the astigmatism of the system can be effectively controlled within a reasonable range.

In an exemplary implementation, the camera lens assembly of the present application may satisfy −25<f7/R6<20, where f7 is an effective focal length of the seventh lens, and R6 is a radius of curvature of an image side surface of the third lens. More specifically, f7 and R6 may further satisfy −24<f7/R6<17, for example, −23.90≤f7/R6≤16.39.

In an exemplary implementation, the above-mentioned camera lens assembly may further include a stop disposed between the second lens and the third lens to improve the image quality of the lens assembly.

Alternatively, the above-described camera lens assembly may further include an optical filter for correcting color deviation and/or a protective glass for protecting a photosensitive element located on an imaging plane.

The camera lens assembly according to the above-described implementations of the present application may employ a plurality of lenses, for example, eight lenses as described above. By reasonably assigning the refractive power, the surface type, the center thickness of each lens, the on-axis interval between adjacent lens and the like, the size of the lens assembly is effectively reduced, the sensitivity of the lens assembly is reduced, and the processability of the lens assembly is improved. Therefore, the camera lens assembly is more advantageous to be produced and processed, which in turn makes it more suitable for portable electronic products. Meanwhile, the camera lens assembly configured as above also has advantages such as ultrathinness, large aperture, high imaging quality, and the like.

In the implementations of the present application, both surfaces of each lens are aspherical surfaces, wherein the curvature varies continuously from the center of the lens to the periphery of the lens. Unlike a spherical lens having a constant curvature from the center of the lens to the periphery of the lens, an aspherical lens has a better radius of curvature characteristic, and has advantages of improving distortion aberration and improving astigmatism aberration. With the aspheric lens, the aberration generated during imaging is eliminated as much as possible, thereby improving the imaging quality.

However, it will be understood by those skilled in the art that the number of lenses constituting the camera lens assembly may be varied to achieve the various results and advantages described in this specification without departing from the technical solution claimed by the present disclosure. For example, although the implementation is described by taking eight lenses as an example, the optical imaging system is not limited to the implementation of eight lenses. The camera lens assembly may also include other numbers of lenses, if desired. Specific embodiments of the camera lens assembly applicable to the above-described implementations are further described below with reference to the drawings.

Embodiment 1

A camera lens assembly according to embodiment 1 of the present application is described below with reference to FIGS. 1 to 2D. FIG. 1 shows a schematic configuration diagram of the camera lens assembly according to embodiment 1 of the present application.

As shown in FIG. 1, a camera lens assembly according to an exemplary implementation of the present application includes, sequentially from an object side of the lens assembly to an image side of the lens assembly along an optical axis, a first lens E1, a second lens E2, a third lens E3, a fourth lens E4, a fifth lens E5, a sixth lens E6, a seventh lens E7, an eighth lens E8, and an imaging plane S17.

The first lens E1 has a positive refractive power. An object side surface S1 of the first lens E1 is a convex surface. An image side surface S2 of the first lens E1 is a concave surface. The second lens E2 has a negative refractive power. An object side surface S3 of the second lens E2 is a convex surface. An image side surface S4 of the second lens E2 is a concave surface. The third lens E3 has a positive refractive power. An object side surface S5 of the third lens E3 is a concave surface. An image side surface S6 of the third lens E3 is a convex surface. The fourth lens E4 has a negative refractive power. An object side surface S7 of the fourth lens E4 is a convex surface. An image side surface S8 of the fourth lens E4 is a concave surface. The fifth lens E5 has a positive refractive power. An object side surface S9 of the fifth lens E5 is a convex surface. An image side surface S10 of the fifth lens E5 is a convex surface. The sixth lens E6 has a positive refractive power. An object side surface S11 of the sixth lens E6 is a concave surface. An image side surface S12 of the sixth lens E6 is a convex surface. The seventh lens E7 has a negative refractive power. An object side surface S13 of the seventh lens E7 is a concave surface. An image side surface S14 of the seventh lens E7 is a convex surface. The eighth lens E8 has a negative refractive power. An object side surface S15 of the eighth lens E8 is a concave surface. An image side surface S16 of the eighth lens E8 is a concave surface. Light from an object sequentially passes through the respective surfaces S1 to S16 and is finally imaged on the imaging plane S17.

Alternatively, the camera lens assembly in the present embodiment further includes a stop STO disposed between the second lens E2 and the third lens E3.

Table 1 shows the surface type, radius of curvature, thickness, material, and conic coefficient of each lens of the camera lens assembly of embodiment 1, wherein the unit of the radius of curvature and the thickness are both millimeters (mm).

TABLE 1

| Surface number | Surface type | Radius of curvature | Thickness | Material Refractive index | Abbe number | Conic coefficient |
|---|---|---|---|---|---|---|
| OBJ | Spherical | Infinite | Infinite | | | |
| S1 | Aspherical | 2.1585 | 0.8600 | 1.55 | 64.1 | 0.0402 |
| S2 | Aspherical | 14.0988 | 0.1000 | | | −99.0000 |
| S3 | Aspherical | 2.4680 | 0.1900 | 1.67 | 20.4 | −3.3532 |
| S4 | Aspherical | 1.7840 | 0.2420 | | | −1.7146 |
| STO | Spherical | Infinite | 0.1654 | | | |
| S5 | Aspherical | −41.2671 | 0.3589 | 1.55 | 64.1 | 99.0000 |
| S6 | Aspherical | −5.9700 | 0.1000 | | | 24.4439 |
| S7 | Aspherical | 156.0558 | 0.2030 | 1.67 | 20.4 | −99.0000 |
| S8 | Aspherical | 33.1772 | 0.1000 | | | −99.0000 |
| S9 | Aspherical | 48.4680 | 0.2845 | 1.55 | 64.1 | −99.0000 |

TABLE 1-continued

| Surface number | Surface type | Radius of curvature | Thickness | Material Refractive index | Abbe number | Conic coefficient |
|---|---|---|---|---|---|---|
| S10 | Aspherical | −40.7456 | 0.4857 | | | −99.0000 |
| S11 | Aspherical | −16.1044 | 0.4315 | 1.67 | 20.4 | 95.3852 |
| S12 | Aspherical | −2.0782 | 0.1069 | | | −8.9058 |
| S13 | Aspherical | −4.7312 | 0.3500 | 1.55 | 64.1 | 2.3230 |
| S14 | Aspherical | −5.9428 | 0.1720 | | | 2.9987 |
| S15 | Aspherical | −5.8076 | 0.4000 | 1.67 | 20.4 | 1.7575 |
| S16 | Aspherical | 2.3104 | 0.9500 | | | −14.8890 |
| S17 | Spherical | Infinite | | | | |

As can be seen from Table 1, the object side surface and the image side surface of any one of the first lens E1 to the eighth lens E8 are aspheric. In this embodiment, the surface shape of each aspheric lens may be defined by using, but not limited to, the following aspheric formula:

$$x = \frac{ch^2}{1 + \sqrt{1 - (k+1)c^2h^2}} + \sum A_i h^i \qquad (1)$$

where, x is the sag—the axis-component of the displacement of the aspheric surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient (given in the above Table 1); Ai is a correction coefficient for the i-th order of the aspheric surface. Table 2 below shows high-order coefficients A4, A6, A8, A10, A12, A16, A18 and A20, which are applicable to each aspheric surface S1 -S16 in embodiment 1.

TABLE 2

| Surface number | A4 | A6 | A8 | A10 | A12 |
|---|---|---|---|---|---|
| S1 | 8.5886E−04 | −2.1473E−03 | 1.8965E−03 | 1.0452E−03 | −3.6155E−03 |
| S2 | −2.7810E−02 | 6.2108E−02 | −8.0208E−02 | 7.0162E−02 | −4.1483E−02 |
| S3 | −1.0570E−01 | 3.4738E−02 | 1.5408E−01 | −5.0365E−01 | 8.0426E−01 |
| S4 | −8.0862E−02 | −3.8579E−02 | 5.3233E−01 | −2.0010E+00 | 4.5366E+00 |
| S5 | −1.0700E−03 | −2.6583E−01 | 1.2946E+00 | −4.2862E+00 | 8.9748E+00 |
| S6 | 6.2762E−02 | −7.0295E−01 | 2.2976E+00 | −5.0095E+00 | 7.4323E+00 |
| S7 | 1.9345E−01 | −1.3529E+00 | 3.7316E+00 | −6.8347E+00 | 8.3223E+00 |
| S8 | 3.0481E−01 | −1.4390E+00 | 3.4010E+00 | −5.3002E+00 | 5.4408E+00 |
| S9 | 2.1927E−01 | −8.7917E−01 | 1.8829E+00 | −2.4579E+00 | 2.0451E+00 |
| S10 | 2.6143E−03 | −1.6573E−01 | 2.5351E−01 | −1.5797E−01 | 3.3891E−02 |
| S11 | 4.8603E−02 | −1.0400E−01 | 8.2001E−02 | −2.6670E−02 | −3.9947E−02 |
| S12 | 7.3830E−02 | −2.1772E−01 | 3.1788E−01 | −3.0583E−01 | 1.8183E−01 |
| S13 | 2.2371E−01 | −4.7305E−01 | 5.2207E−01 | −4.1151E−01 | 2.1024E−01 |
| S14 | 2.7156E−01 | −3.5241E−01 | 2.5669E−01 | −1.3345E−01 | 4.9502E−02 |
| S15 | 1.1571E−02 | −7.9185E−02 | 7.7459E−02 | −3.6334E−02 | 9.9240E−03 |
| S16 | −7.3146E−02 | 2.1674E−02 | −3.6900E−03 | 8.7609E−04 | −3.4110E−04 |

| Surface number | A14 | A16 | A18 | A20 |
|---|---|---|---|---|
| S1 | 3.3201E−03 | −1.5200E−03 | 3.4732E−04 | −3.2747E−05 |
| S2 | 1.5522E−02 | −3.3211E−03 | 3.2489E−04 | −5.6616E−06 |
| S3 | −7.5885E−01 | 4.2875E−01 | −1.3341E−01 | 1.7497E−02 |
| S4 | −6.4322E+00 | 5.5937E+00 | −2.7232E+00 | 5.7107E−01 |
| S5 | −1.1970E+01 | 9.8617E+00 | −4.5690E+00 | 9.1139E−01 |
| S6 | −7.3943E+00 | 4.7367E+00 | −1.7685E+00 | 2.9293E−01 |
| S7 | −6.5672E+00 | 3.1981E+00 | −8.6153E−01 | 9.6898E−02 |
| S8 | −3.6611E+00 | 1.5619E+00 | −3.8453E−01 | 4.2181E−02 |
| S9 | −1.0965E+00 | 3.6886E−01 | −7.0942E−02 | 5.9445E−03 |
| S10 | 1.2797E−02 | −9.5076E−03 | 2.1968E−03 | −1.9202E−04 |

TABLE 2-continued

| | | | | |
|---|---|---|---|---|
| S11 | 5.6194E−02 | −3.0262E−02 | 7.7042E−03 | −7.6013E−04 |
| S12 | −6.5203E−02 | 1.3743E−02 | −1.5668E−03 | 7.4415E−05 |
| S13 | −6.5364E−02 | 1.1890E−02 | −1.1580E−03 | 4.6189E−05 |
| S14 | −1.2429E−02 | 1.9704E−03 | −1.7618E−04 | 6.7386E−06 |
| S15 | −1.6523E−03 | 1.6508E−04 | −9.0767E−06 | 2.1014E−07 |
| S16 | 8.2677E−05 | −1.0693E−05 | 7.0730E−07 | −1.9052E−08 |

Table 3 shows effective focal lengths f1 to f8 of the respective lenses, a total effective focal length f of the camera lens assembly, the total track length TTL of the camera lens assembly (i.e., a distance along the optical axis from the center of the object side surface S1 of the first lens E1 to the imaging plane S17), ImgH which is half of a diagonal length of an effective pixel area on the imaging plane S17, and a maximum field of view FOV of the camera lens assembly in embodiment 1.

TABLE 3

| | | | |
|---|---|---|---|
| f1 (mm) | 4.50 | f7 (mm) | −46.83 |
| f2 (mm) | −10.53 | f8 (mm) | −2.35 |
| f3 (mm) | 12.59 | f (mm) | 4.53 |
| f4 (mm) | −61.19 | TTL (mm) | 5.50 |
| f5 (mm) | 40.12 | ImgH (mm) | 3.77 |
| f6 (mm) | 3.42 | FOV (°) | 78.6 |

The camera lens assembly in embodiment 1 satisfies:

f/EPD=1.71, where f is the total effective focal length of the camera lens assembly, and EPD is an entrance pupil diameter of the camera lens assembly;

TTL/ImgH=1.46, where TTL is the total track length of the camera lens assembly, and ImgH is half of the diagonal length of the effective pixel area on the imaging plane S17;

f2/f=−2.32, where f2 is the effective focal length of the second lens E2, and f is the total effective focal length of the camera lens assembly;

f4/f=−13.50, where f4 is the effective focal length of the fourth lens E4, and f is the total effective focal length of the camera lens assembly;

f7/f=−10.33, where f7 is the effective focal length of the seventh lens E7, and f is the total effective focal length of the camera lens assembly;

R11/R12=7.75, where R11 is a radius of curvature of the object side surface S11 of the sixth lens E6, and R12 is a radius of curvature of the image side surface S12 of the sixth lens E6;

CT1/CT2=4.53, where CT1 is the center thickness of the first lens E1 on the optical axis, and CT2 is the center thickness of the second lens E2 on the optical axis;

(TTL/ImgH)/(f/EPD)=0.85, where TTL is the total track length of the camera lens assembly, ImgH is half of the diagonal length of the effective pixel area on the imaging plane S17, f is the total effective focal length of the camera lens assembly, and EPD is the entrance pupil diameter of the camera lens assembly;

f7/f8=19.92, where f7 is the effective focal length of the seventh lens E7, and f8 is the effective focal length of the eighth lens E8; and f7/R6=6.81, where f7 is the effective focal length of the seventh lens E7, and R6 is a radius of curvature of the image side surface S6 of the third lens E3.

FIG. 2A shows a longitudinal aberration curve of the camera lens assembly of embodiment 1, which represents deviations of focal points converged by light of different wavelengths after passing through the camera lens assembly. FIG. 2B shows an astigmatism curve of the camera lens assembly of embodiment 1, which represents a curvature of a tangential plane and a curvature of a sagittal plane. FIG. 2C shows a distortion curve of the camera lens assembly of embodiment 1, which represents amounts of distortion at different FOVs. FIG. 2D shows a lateral color curve of the camera lens assembly of embodiment 1, which represents deviations of different image heights on the imaging plane after light passes through the lens assembly. As can be seen from FIGS. 2A to 2D, the camera lens assembly according to embodiment 1 can achieve good image quality.

Embodiment 2

A camera lens assembly according to embodiment 2 of the present application is described below with reference to FIGS. 3 to 4D. In this embodiment and the following embodiments, a description of parts similar to those of embodiment 1 will be omitted for the sake of brevity. FIG. 3 shows a schematic configuration diagram of the camera lens assembly according to embodiment 2 of the present application.

As shown in FIG. 3, a camera lens assembly according to an exemplary implementation of the present application includes, sequentially from an object side of the lens assembly to an image side of the lens assembly along an optical axis, a first lens E1, a second lens E2, a third lens E3, a fourth lens E4, a fifth lens E5, a sixth lens E6, a seventh lens E7, an eighth lens E8, and an imaging plane S17.

The first lens E1 has a positive refractive power. An object side surface S1 of the first lens E1 is a convex surface. An image side surface S2 of the first lens E1 is a concave surface. The second lens E2 has a negative refractive power. An object side surface S3 of the second lens E2 is a convex surface. An image side surface S4 of the second lens E2 is a concave surface. The third lens E3 has a positive refractive power. An object side surface S5 of the third lens E3 is a concave surface. An image side surface S6 of the third lens E3 is a convex surface. The fourth lens E4 has a positive refractive power. An object side surface S7 of the fourth lens E4 is a convex surface. An image side surface S8 of the fourth lens E4 is a convex surface. The fifth lens E5 has a positive refractive power. An object side surface S9 of the fifth lens E5 is a concave surface. An image side surface S10 of the fifth lens E5 is a convex surface. The sixth lens E6 has a positive refractive power. An object side surface S11 of the sixth lens E6 is a concave surface. An image side surface S12 of the sixth lens E6 is a convex surface. The seventh lens E7 has a negative refractive power. An object side surface S13 of the seventh lens E7 is a concave surface. An image side surface S14 of the seventh lens E7 is a convex surface. The eighth lens E8 has a negative refractive power. An object side surface S15 of the eighth lens E8 is a concave surface. An image side surface S16 of the eighth lens E8 is a concave surface. Light from an object sequentially passes through the respective surfaces S1 to S16 and is finally imaged on the imaging plane S17.

Alternatively, the camera lens assembly in the present embodiment further includes a stop STO disposed between the second lens E2 and the third lens E3.

Table 4 shows the surface type, radius of curvature, thickness, material, and conic coefficient of each lens of the camera lens assembly of embodiment 2, wherein the unit of the radius of curvature and the thickness are both millimeters (mm). Table 5 shows high-order coefficients that may be used for each aspherical surface in embodiment 2, wherein each aspherical surface type can be defined by formula (1) given in embodiment 1 above. Table 6 shows effective focal lengths f1 to f8 of the respective lenses, a total effective focal length f of the camera lens assembly, a total track length TTL of the camera lens assembly, ImgH which is half of a diagonal length of an effective pixel area on the imaging plane S17, and a maximum field of view FOV of the camera lens assembly in embodiment 2.

TABLE 4

| Surface number | Surface type | Radius of curvature | Thickness | Material Refractive index | Abbe number | Conic coefficient |
|---|---|---|---|---|---|---|
| OBJ | Spherical | Infinite | Infinite | | | |
| S1 | Aspherical | 2.1586 | 0.8600 | 1.55 | 64.1 | 0.0385 |
| S2 | Aspherical | 14.5930 | 0.1000 | | | −94.2624 |

TABLE 4-continued

| Surface number | Surface type | Radius of curvature | Thickness | Material Refractive index | Abbe number | Conic coefficient |
|---|---|---|---|---|---|---|
| S3 | Aspherical | 2.5439 | 0.1904 | 1.67 | 20.4 | −3.3992 |
| S4 | Aspherical | 1.8107 | 0.2412 | | | −1.7094 |
| STO | Spherical | Infinite | 0.1705 | | | |
| S5 | Aspherical | −43.1767 | 0.3651 | 1.55 | 64.1 | 5.9445 |
| S6 | Aspherical | −5.9661 | 0.1020 | | | 24.4211 |
| S7 | Aspherical | 175.0677 | 0.1978 | 1.67 | 20.4 | −99.0081 |
| S8 | Aspherical | −113.7987 | 0.1009 | | | −99.0267 |
| S9 | Aspherical | −34.2864 | 0.2659 | 1.55 | 64.1 | 51.7806 |
| S10 | Aspherical | −27.3634 | 0.4977 | | | −47.3207 |
| S11 | Aspherical | −16.0453 | 0.4418 | 1.67 | 20.4 | 95.4126 |
| S12 | Aspherical | −2.0888 | 0.0977 | | | −9.1340 |
| S13 | Aspherical | −4.7409 | 0.3501 | 1.55 | 64.1 | 2.2799 |
| S14 | Aspherical | −5.6889 | 0.1667 | | | 3.1865 |
| S15 | Aspherical | −5.6307 | 0.4000 | 1.67 | 20.4 | 1.7031 |
| S16 | Aspherical | 2.2619 | 0.9500 | | | −15.2351 |
| S17 | Spherical | Infinite | | | | |

TABLE 5

| Surface number | A4 | A6 | A8 | A10 | A12 |
|---|---|---|---|---|---|
| S1 | 1.2955E−03 | −4.0303E−03 | 5.0713E−03 | −1.5162E−03 | −2.9843E−03 |
| S2 | −2.7204E−02 | 5.9210E−02 | −7.3851E−02 | 6.1954E−02 | −3.4337E−02 |
| S3 | −1.0630E−01 | 3.3132E−02 | 1.4412E−01 | −4.4025E−01 | 6.6736E−01 |
| S4 | −7.7572E−02 | −6.1847E−02 | 5.9983E−01 | −2.0940E+00 | 4.5736E+00 |
| S5 | 7.5542E−03 | −3.1809E−01 | 1.4814E+00 | −4.6569E+00 | 9.3142E+00 |
| S6 | 6.3017E−02 | −7.2623E−01 | 2.4088E+00 | −5.3047E+00 | 7.9219E+00 |
| S7 | 1.9192E−01 | −1.3488E+00 | 3.7286E+00 | −6.8547E+00 | 8.3850E+00 |
| S8 | 3.0504E−01 | −1.4336E+00 | 3.3847E+00 | −5.2849E+00 | 5.4494E+00 |
| S9 | 2.2399E−01 | −9.0582E−01 | 1.9519E+00 | −2.5588E+00 | 2.1371E+00 |
| S10 | 1.4899E−03 | −1.6062E−01 | 2.3594E−01 | −1.1465E−01 | −2.9012E−02 |
| S11 | 4.4031E−02 | −9.1718E−02 | 6.1222E−02 | −3.2334E−03 | −5.6587E−02 |
| S12 | 7.4221E−02 | −2.1427E−01 | 3.0770E−01 | −2.9345E−01 | 1.7322E−01 |
| S13 | 2.2395E−01 | −4.7080E−01 | 5.1804E−01 | −4.1026E−01 | 2.1193E−01 |
| S14 | 2.7276E−01 | −3.5611E−01 | 2.6034E−01 | −1.3585E−01 | 5.0567E−02 |
| S15 | 1.1468E−02 | −8.1706E−02 | 8.1395E−02 | −3.9003E−02 | 1.0916E−02 |
| S16 | −7.2480E−02 | 2.1938E−02 | −3.6893E−03 | 8.0384E−04 | −3.1144E−04 |

| Surface number | A14 | A16 | A18 | A20 |
|---|---|---|---|---|
| S1 | 3.7938E−03 | −1.9269E−03 | 4.6549E−04 | −4.5487E−05 |
| S2 | 1.1336E−02 | −1.7820E−03 | 8.2376E−06 | 2.1874E−05 |
| S3 | −6.0158E−01 | 3.2552E−01 | −9.6928E−02 | 1.2119E−02 |
| S4 | −6.3531E+00 | 5.4566E+00 | −2.6343E+00 | 5.4903E−01 |
| S5 | −1.1927E+01 | 9.4805E+00 | −4.2580E+00 | 8.2727E−01 |
| S6 | −7.9111E+00 | 5.0735E+00 | −1.8914E+00 | 3.1205E−01 |
| S7 | −6.6532E+00 | 3.2628E+00 | −8.8779E−01 | 1.0139E−01 |
| S8 | −3.6912E+00 | 1.5876E+00 | −3.9432E−01 | 4.3658E−02 |
| S9 | −1.1513E+00 | 3.9048E−01 | −7.6193E−02 | 6.5418E−03 |
| S10 | 6.5053E−02 | −3.4189E−02 | 8.3831E−03 | −8.3023E−04 |
| S11 | 6.3047E−02 | −3.1607E−02 | 7.7277E−03 | −7.3889E−04 |
| S12 | −6.1514E−02 | 1.2776E−02 | −1.4242E−03 | 6.5330E−05 |
| S13 | −6.6990E−02 | 1.2480E−02 | −1.2583E−03 | 5.2890E−05 |
| S14 | −1.2743E−02 | 2.0289E−03 | −1.8238E−04 | 7.0252E−06 |
| S15 | −1.8670E−03 | 1.9206E−04 | −1.0895E−05 | 2.6081E−07 |
| S16 | 7.7140E−05 | −1.0152E−05 | 6.8082E−07 | −1.8538E−08 |

TABLE 6

| | | | |
|---|---|---|---|
| f1(mm) | 4.48 | f7(mm) | −59.30 |
| f2(mm) | −10.20 | f8(mm) | −2.29 |
| f3(mm) | 12.49 | f (mm) | 4.54 |
| f4(mm) | 100.11 | TTL (mm) | 5.50 |
| f5(mm) | 242.05 | ImgH (mm) | 3.77 |
| f6(mm) | 3.44 | FOV (°) | 78.4 |

Figure 4B:
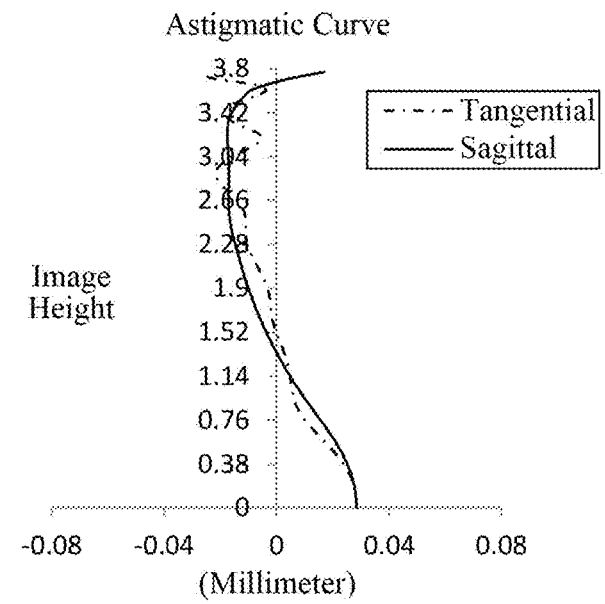
Figure 4C:
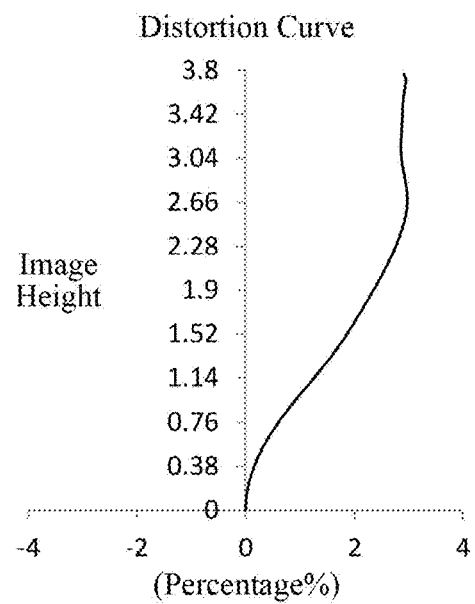
Figure 4D:
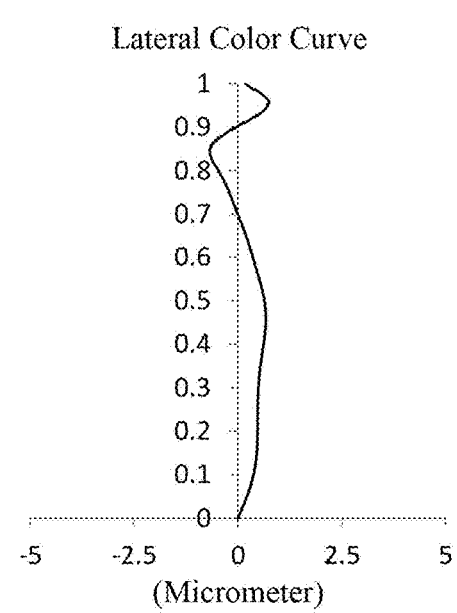

FIG. 4A shows a longitudinal aberration curve of the camera lens assembly of embodiment 2, which represents deviations of focal points converged by light of different wavelengths after passing through the camera lens assembly. FIG. 4B shows an astigmatism curve of the camera lens assembly of embodiment 2, which represents a curvature of a tangential plane and a curvature of a sagittal plane. FIG. 4C shows a distortion curve of the camera lens assembly of embodiment 2, which represents amounts of distortion at different FOVs. FIG. 4D shows a lateral color curve of the camera lens assembly of embodiment 2, which represents deviations of different image heights on the imaging plane after light passes through the lens assembly. As can be seen from FIGS. 4A to 4D, the camera lens assembly according to embodiment 2 can achieve good image quality.

Embodiment 3

Figure 5:
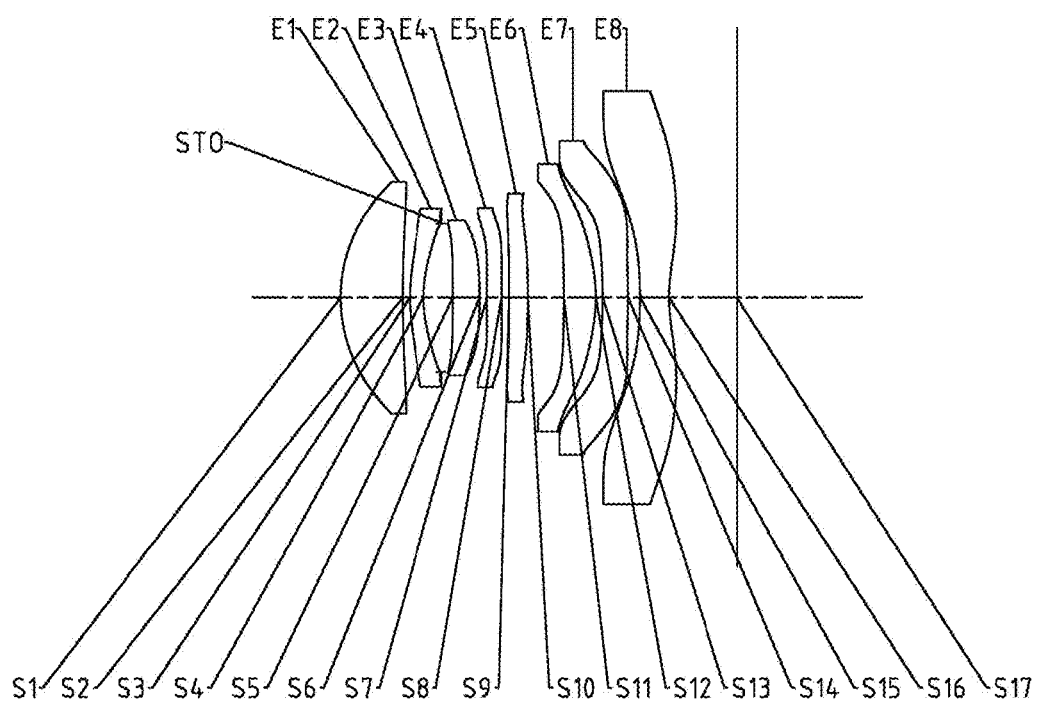
FIG. 5 shows a schematic configuration diagram of a camera lens assembly according to embodiment 3 of the present application.

A camera lens assembly according to embodiment 3 of the present application is described below with reference to FIGS. 5 to 6D. FIG. 5 shows a schematic configuration diagram of the camera lens assembly according to embodiment 3 of the present application.

As shown in FIG. 5, a camera lens assembly according to an exemplary implementation of the present application includes, sequentially from an object side of the lens assembly to an image side of the lens assembly along an optical axis, a first lens E1, a second lens E2, a third lens E3, a fourth lens E4, a fifth lens E5, a sixth lens E6, a seventh lens E7, an eighth lens E8, and an imaging plane S17.

The first lens E1 has a positive refractive power. An object side surface S1 of the first lens E1 is a convex surface. An image side surface S2 of the first lens E1 is a concave surface. The second lens E2 has a negative refractive power. An object side surface S3 of the second lens E2 is a convex surface. An image side surface S4 of the second lens E2 is a concave surface. The third lens E3 has a positive refractive power. An object side surface S5 of the third lens E3 is a concave surface. An image side surface S6 of the third lens E3 is a convex surface. The fourth lens E4 has a positive refractive power. An object side surface S7 of the fourth lens E4 is a concave surface. An image side surface S8 of the fourth lens E4 is a convex surface. The fifth lens E5 has a negative refractive power. An object side surface S9 of the fifth lens E5 is a concave surface. An image side surface S10 of the fifth lens E5 is a convex surface. The sixth lens E6 has a positive refractive power. An object side surface S11 of the sixth lens E6 is a concave surface. An image side surface S12 of the sixth lens E6 is a convex surface. The seventh lens E7 has a negative refractive power. An object side surface S13 of the seventh lens E7 is a concave surface. An image side surface S14 of the seventh lens E7 is a convex surface. The eighth lens E8 has a negative refractive power. An object side surface S15 of the eighth lens E8 is a concave surface. An image side surface S16 of the eighth lens E8 is a concave surface. Light from an object sequentially passes through the respective surfaces S1 to S16 and is finally imaged on the imaging plane S17.

Alternatively, the camera lens assembly in the present embodiment further includes a stop STO disposed between the second lens E2 and the third lens E3.

Table 7 shows the surface type, radius of curvature, thickness, material, and conic coefficient of each lens of the camera lens assembly of embodiment 3, wherein the unit of the radius of curvature and the thickness are both millimeters (mm). Table 8 shows high-order coefficients that may be used for each aspherical surface in embodiment 3, wherein each aspherical surface type can be defined by formula (1) given in embodiment 1 above. Table 9 shows effective focal lengths f1 to f8 of the respective lenses, a total effective focal length f of the camera lens assembly, a total track length TTL of the camera lens assembly, ImgH which is half of a diagonal length of an effective pixel area on the imaging plane S17, and a maximum field of view FOV of the camera lens assembly in embodiment 3.

TABLE 7

| | | | | Material | | |
|---|---|---|---|---|---|---|
| Surface number | Surface type | Radius of curvature | Thickness | Refractive index | Abbe number | Conic coefficient |
| OBJ | Spherical | Infinite | Infinite | | | |
| S1 | Aspherical | 2.1547 | 0.8600 | 1.55 | 64.1 | 0.0357 |
| S2 | Aspherical | 15.2165 | 0.1000 | | | −91.4745 |
| S3 | Aspherical | 2.6218 | 0.1928 | 1.67 | 20.4 | −3.5211 |
| S4 | Aspherical | 1.8254 | 0.2394 | | | −1.7432 |
| STO | Spherical | Infinite | 0.1675 | | | |
| S5 | Aspherical | −52.2716 | 0.3705 | 1.55 | 64.1 | −67.5156 |
| S6 | Aspherical | −5.9325 | 0.1008 | | | 24.2953 |
| S7 | Aspherical | −1675.4103 | 0.2033 | 1.67 | 20.4 | 99.0000 |
| S8 | Aspherical | −25.6096 | 0.1031 | | | −99.0000 |
| S9 | Aspherical | −13.2488 | 0.2595 | 1.55 | 64.1 | −47.0977 |
| S10 | Aspherical | −17.5501 | 0.4983 | | | −41.8007 |
| S11 | Aspherical | −16.1541 | 0.4427 | 1.67 | 20.4 | 95.7890 |
| S12 | Aspherical | −2.1095 | 0.0953 | | | −9.4334 |
| S13 | Aspherical | −4.8375 | 0.3500 | 1.55 | 64.1 | 2.2305 |
| S14 | Aspherical | −5.4532 | 0.1667 | | | 3.4429 |
| S15 | Aspherical | −5.3784 | 0.4000 | 1.67 | 20.4 | 1.5041 |
| S16 | Aspherical | 2.2762 | 0.9500 | | | −14.1874 |
| S17 | Spherical | Infinite | | | | |

TABLE 8

| Surface number | A4 | A6 | A8 | A10 | A12 |
|---|---|---|---|---|---|
| S1 | 1.6557E−03 | −5.0172E−03 | 7.7069E−03 | −5.1626E−03 | −1.8146E−04 |
| S2 | −2.5242E−02 | 5.6396E−02 | −7.3193E−02 | 6.4458E−02 | −3.7338E−02 |
| S3 | −1.0742E−01 | 3.5370E−02 | 1.3863E−01 | −4.4694E−01 | 7.0819E−01 |
| S4 | −7.7686E−02 | −7.6912E−02 | 7.1313E−01 | −2.5054E+00 | 5.4162E+00 |
| S5 | 8.8163E−03 | −3.1414E−01 | 1.4553E+00 | −4.5711E+00 | 9.1323E+00 |
| S6 | 6.1963E−02 | −7.3755E−01 | 2.4491E+00 | −5.3960E+00 | 8.0833E+00 |
| S7 | 1.9190E−01 | −1.3700E+00 | 3.8043E+00 | −6.9978E+00 | 8.5434E+00 |

TABLE 8-continued

| | | | | | |
|---|---|---|---|---|---|
| S8 | 3.0488E−01 | −1.4210E+00 | 3.3404E+00 | −5.1854E+00 | 5.3040E+00 |
| S9 | 2.2936E−01 | −9.3914E−01 | 2.0523E+00 | −2.7350E+00 | 2.3284E+00 |
| S10 | 2.5079E−03 | −1.7085E−01 | 2.6937E−01 | −1.7098E−01 | 2.8052E−02 |
| S11 | 4.1721E−02 | −9.0748E−02 | 6.7547E−02 | −1.4451E−02 | −4.6970E−02 |
| S12 | 7.5801E−02 | −2.2190E−01 | 3.2395E−01 | −3.1324E−01 | 1.8791E−01 |
| S13 | 2.2884E−01 | −4.7883E−01 | 5.3246E−01 | −4.2671E−01 | 2.2333E−01 |
| S14 | 2.7393E−01 | −3.6058E−01 | 2.6468E−01 | −1.3873E−01 | 5.1810E−02 |
| S15 | 1.5869E−02 | −9.6282E−02 | 9.6402E−02 | −4.7833E−02 | 1.4079E−02 |
| S16 | −7.5506E−02 | 2.3718E−02 | −3.4880E−03 | 2.8983E−04 | −1.0842E−04 |

| Surface number | A14 | A16 | A18 | A20 |
|---|---|---|---|---|
| S1 | 2.5915E−03 | −1.6518E−03 | 4.3550E−04 | −4.4491E−05 |
| S2 | 1.2673E−02 | −1.9764E−03 | −1.7292E−05 | 2.9259E−05 |
| S3 | −6.6412E−01 | 3.7174E−01 | −1.1396E−01 | 1.4626E−02 |
| S4 | −7.3706E+00 | 6.1698E+00 | −2.8998E+00 | 5.8882E−01 |
| S5 | −1.1678E+01 | 9.2644E+00 | −4.1494E+00 | 8.0350E−01 |
| S6 | −8.1154E+00 | 5.2365E+00 | −1.9630E+00 | 3.2527E−01 |
| S7 | −6.7526E+00 | 3.2930E+00 | −8.8923E−01 | 1.0050E−01 |
| S8 | −3.5561E+00 | 1.5116E+00 | −3.7102E−01 | 4.0716E−02 |
| S9 | −1.2822E+00 | 4.4561E−01 | −8.9292E−02 | 7.8896E−03 |
| S10 | 2.8899E−02 | −2.0139E−02 | 5.3378E−03 | −5.5073E−04 |
| S11 | 5.8655E−02 | −3.0700E−02 | 7.7076E−03 | −7.5212E−04 |
| S12 | −6.8217E−02 | 1.4614E−02 | −1.7016E−03 | 8.3043E−05 |
| S13 | −7.1797E−02 | 1.3668E−02 | −1.4159E−03 | 6.1500E−05 |
| S14 | −1.3085E−02 | 2.0860E−03 | −1.8751E−04 | 7.2116E−06 |
| S15 | −2.5573E−03 | 2.8149E−04 | −1.7221E−05 | 4.4888E−07 |
| S16 | 3.8121E−05 | −6.0731E−06 | 4.5941E−07 | −1.3684E−08 |

TABLE 9

| | | | |
|---|---|---|---|
| f1(mm) | 4.44 | f7(mm) | −97.22 |
| f2(mm) | −9.97 | f8(mm) | −2.27 |
| f3(mm) | 12.08 | f (mm) | 4.53 |
| f4(mm) | 37.74 | TTL (mm) | 4.64 |
| f5(mm) | −100.02 | ImgH (mm) | 3.73 |
| f6(mm) | 3.48 | FOV (°) | 78.4 |

Figures 6A, 6B:
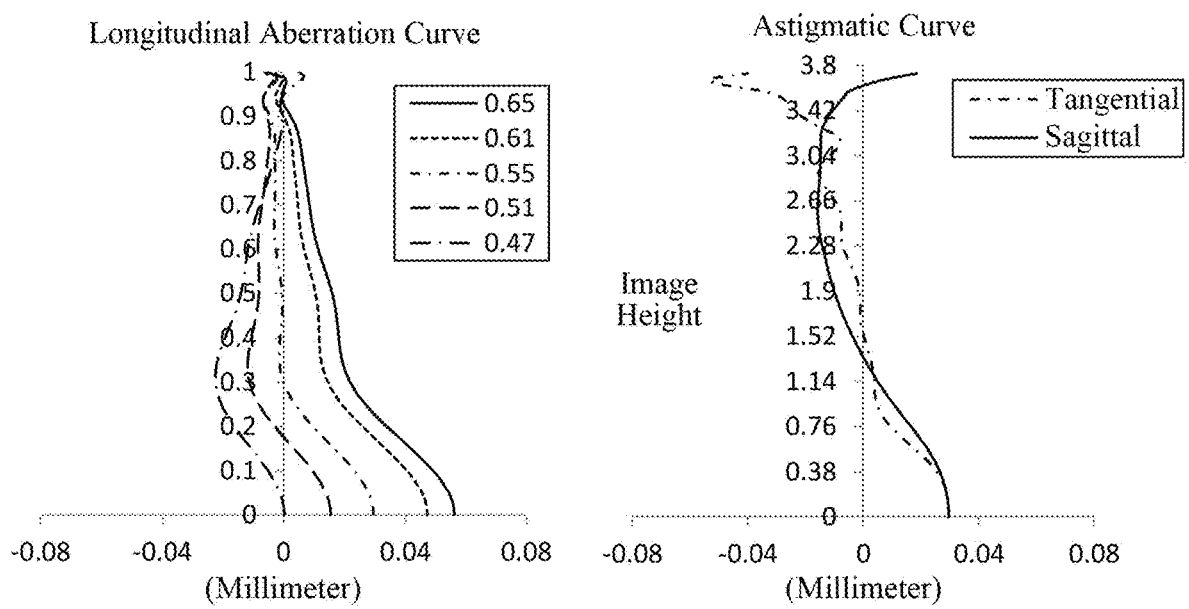

FIG. 6A shows a longitudinal aberration curve of the camera lens assembly of embodiment 3, which represents deviations of focal points converged by light of different wavelengths after passing through the camera lens assembly. FIG. 6B shows an astigmatism curve of the camera lens assembly of embodiment 3, which represents a curvature of a tangential plane and a curvature of a sagittal plane. FIG. 6C shows a distortion curve of the camera lens assembly of embodiment 3, which represents amounts of distortion at different FOVs. FIG. 6D shows a lateral color curve of the camera lens assembly of embodiment 3, which represents deviations of different image heights on the imaging plane after light passes through the lens assembly. As can be seen from FIGS. 6A to 6D, the camera lens assembly according to embodiment 3 can achieve good image quality.

Embodiment 4

A camera lens assembly according to embodiment 4 of the present application is described below with reference to FIGS. 7 to 8D. FIG. 7 shows a schematic configuration diagram of the camera lens assembly according to embodiment 4 of the present application.

As shown in FIG. 7, a camera lens assembly according to an exemplary implementation of the present application includes, sequentially from an object side of the lens assembly to an image side of the lens assembly along an optical axis, a first lens E1, a second lens E2, a third lens E3, a fourth lens E4, a fifth lens E5, a sixth lens E6, a seventh lens E7, an eighth lens E8, and an imaging plane S17.

The first lens E1 has a positive refractive power. An object side surface S1 of the first lens E1 is a convex surface. An image side surface S2 of the first lens E1 is a concave surface. The second lens E2 has a negative refractive power. An object side surface S3 of the second lens E2 is a convex surface. An image side surface S4 of the second lens E2 is a concave surface. The third lens E3 has a positive refractive power. An object side surface S5 of the third lens E3 is a concave surface. An image side surface S6 of the third lens E3 is a convex surface. The fourth lens E4 has a negative refractive power. An object side surface S7 of the fourth lens E4 is a convex surface. An image side surface S8 of the fourth lens E4 is a concave surface. The fifth lens E5 has a positive refractive power. An object side surface S9 of the fifth lens E5 is a convex surface. An image side surface S10 of the fifth lens E5 is a convex surface. The sixth lens E6 has a positive refractive power. An object side surface S11 of the sixth lens E6 is a concave surface. An image side surface S12 of the sixth lens E6 is a convex surface. The seventh lens E7 has a positive refractive power. An object side surface S13 of the seventh lens E7 is a concave surface. An image side surface S14 of the seventh lens E7 is a convex surface. The eighth lens E8 has a negative refractive power. An object side surface S15 of the eighth lens E8 is a concave surface. An image side surface S16 of the eighth lens E8 is a concave surface. Light from an object sequentially passes through the respective surfaces S1 to S16 and is finally imaged on the imaging plane S17.

Alternatively, the camera lens assembly in the present embodiment further includes a stop STO disposed between the second lens E2 and the third lens E3.

Table 10 shows the surface type, radius of curvature, thickness, material, and conic coefficient of each lens of the camera lens assembly of embodiment 4, wherein the unit of the radius of curvature and the thickness are both millimeters (mm). Table 11 shows high-order coefficients that may be used for each aspherical surface in embodiment 4, wherein each aspherical surface type can be defined by formula (1) given in embodiment 1 above. Table 12 shows effective focal lengths f1 to f8 of the respective lenses, a total effective focal length f of the camera lens assembly, a total track length TTL of the camera lens assembly, ImgH which is half of a diagonal length of an effective pixel area on the imaging plane S17, and a maximum field of view FOV of the camera lens assembly in embodiment 4.

TABLE 10

| Surface number | Surface type | Radius of curvature | Thickness | Material Refractive index | Abbe number | Conic coefficient |
|---|---|---|---|---|---|---|
| OBJ | Spherical | Infinite | Infinite | | | |
| S1 | Aspherical | 2.1594 | 0.8586 | 1.55 | 64.1 | 0.0396 |
| S2 | Aspherical | 15.5396 | 0.1000 | | | -92.8521 |
| S3 | Aspherical | 2.5793 | 0.1900 | 1.67 | 20.4 | -3.3531 |
| S4 | Aspherical | 1.8184 | 0.2378 | | | -1.7246 |
| STO | Spherical | Infinite | 0.1625 | | | |
| S5 | Aspherical | -42.1998 | 0.3587 | 1.55 | 64.1 | 99.0000 |
| S6 | Aspherical | -5.9728 | 0.1000 | | | 24.4276 |
| S7 | Aspherical | 136.2282 | 0.1993 | 1.67 | 20.4 | -99.0000 |
| S8 | Aspherical | 58.9514 | 0.1000 | | | -99.0000 |
| S9 | Aspherical | 114.0021 | 0.2709 | 1.55 | 64.1 | -99.0000 |
| S10 | Aspherical | -44.9205 | 0.4914 | | | -99.0000 |
| S11 | Aspherical | -16.1197 | 0.4408 | 1.67 | 20.4 | 95.4312 |
| S12 | Aspherical | -2.1767 | 0.1064 | | | -8.9312 |
| S13 | Aspherical | -5.1456 | 0.3591 | 1.55 | 64.1 | 2.6421 |
| S14 | Aspherical | -4.8241 | 0.1737 | | | 2.3300 |
| S15 | Aspherical | -5.0319 | 0.4006 | 1.67 | 20.4 | 1.4607 |
| S16 | Aspherical | 2.3216 | 0.9500 | | | -14.2286 |
| S17 | Spherical | Infinite | | | | |

TABLE 11

| Surface number | A4 | A6 | A8 | A10 | A12 |
|---|---|---|---|---|---|
| S1 | 9.5371E-04 | -3.1817E-03 | 4.3482E-03 | -1.8532E-03 | -1.8125E-03 |
| S2 | -2.7604E-02 | 6.4584E-02 | -8.9819E-02 | 8.6017E-02 | -5.6051E-02 |
| S3 | -1.0698E-01 | 4.1594E-02 | 1.2792E-01 | -4.4246E-01 | 7.1504E-01 |
| S4 | -8.4503E-02 | -1.4209E-02 | 4.4744E-01 | -1.8347E+00 | 4.3666E+00 |
| S5 | -8.0220E-03 | -1.8936E-01 | 9.0778E-01 | -3.1362E+00 | 6.8267E+00 |
| S6 | 6.2941E-02 | -7.0197E-01 | 2.2907E+00 | -4.9836E+00 | 7.3712E+00 |
| S7 | 1.9265E-01 | -1.3516E+00 | 3.7328E+00 | -6.8414E+00 | 8.3325E+00 |
| S8 | 3.0478E-01 | -1.4387E+00 | 3.4005E+00 | -5.3010E+00 | 5.4441E+00 |
| S9 | 2.1887E-01 | -8.7984E-01 | 1.8852E+00 | -2.4621E+00 | 2.0510E+00 |
| S10 | 2.9566E-03 | -1.6388E-01 | 2.5016E-01 | -1.5332E-01 | 2.7830E-02 |
| S11 | 4.6423E-02 | -9.6819E-02 | 7.2316E-02 | -1.8905E-02 | -4.3921E-02 |
| S12 | 7.6714E-02 | -2.2576E-01 | 3.2799E-01 | -3.1634E-01 | 1.9043E-01 |
| S13 | 2.1520E-01 | -4.5862E-01 | 5.0773E-01 | -4.0313E-01 | 2.0817E-01 |
| S14 | 2.8096E-01 | -3.6248E-01 | 2.6604E-01 | -1.3968E-01 | 5.2393E-02 |
| S15 | 2.1290E-02 | -1.0170E-01 | 9.8207E-02 | -4.6731E-02 | 1.3069E-02 |
| S16 | -7.5294E-02 | 2.3261E-02 | -3.9773E-03 | 6.8605E-04 | -2.2951E-04 |

| Surface number | A14 | A16 | A18 | A20 |
|---|---|---|---|---|
| S1 | 2.8103E-03 | -1.5189E-03 | 3.7870E-04 | -3.7750E-05 |
| S2 | 2.3525E-02 | -5.9395E-03 | 7.9656E-04 | -4.1791E-05 |
| S3 | -6.7504E-01 | 3.7914E-01 | -1.1663E-01 | 1.5038E-02 |
| S4 | -6.3808E+00 | 5.6559E+00 | -2.7865E+00 | 5.8850E-01 |
| S5 | -9.4272E+00 | 8.0091E+00 | -3.8101E+00 | 7.7751E-01 |
| S6 | -7.3053E+00 | 4.6586E+00 | -1.7303E+00 | 2.8488E-01 |
| S7 | -6.5767E+00 | 3.2043E+00 | -8.6423E-01 | 9.7443E-02 |
| S8 | -3.6665E+00 | 1.5665E+00 | -3.8664E-01 | 4.2595E-02 |
| S9 | -1.1020E+00 | 3.7207E-01 | -7.1980E-02 | 6.0863E-03 |
| S10 | 1.8162E-02 | -1.2281E-02 | 2.9564E-03 | -2.7701E-04 |
| S11 | 5.7477E-02 | -3.0445E-02 | 7.6784E-03 | -7.5093E-04 |
| S12 | -6.9810E-02 | 1.5219E-02 | -1.8226E-03 | 9.2852E-05 |
| S13 | -6.5743E-02 | 1.2243E-02 | -1.2346E-03 | 5.1888E-05 |
| S14 | -1.3311E-02 | 2.1366E-03 | -1.9366E-04 | 7.5267E-06 |
| S15 | -2.2406E-03 | 2.3169E-04 | -1.3267E-05 | 3.2257E-07 |
| S16 | 5.6583E-05 | -7.4708E-06 | 5.0095E-07 | -1.3679E-08 |

TABLE 12

| f1(mm) | 4.44 | f7(mm) | 100.03 |
|---|---|---|---|
| f2(mm) | -9.96 | f8(mm) | -2.26 |
| f3(mm) | 12.55 | f (mm) | 4.52 |
| f4(mm) | -150.97 | TTL (mm) | 5.50 |
| f5(mm) | 58.38 | ImgH (mm) | 3.75 |
| f6(mm) | 3.61 | FOV (°) | 78.2 |

Figure 8A:
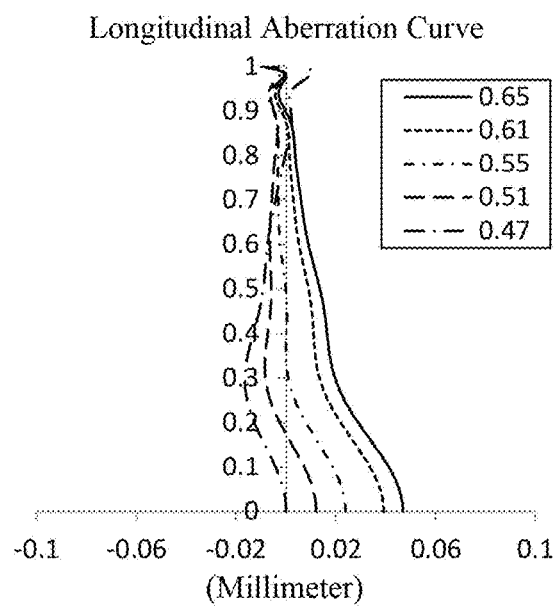
FIG. 8A to 8D show a longitudinal aberration curve, an astigmatism curve, a distortion curve, and a lateral color curve, respectively, of the camera lens assembly of embodiment 4.
Figure 8B:
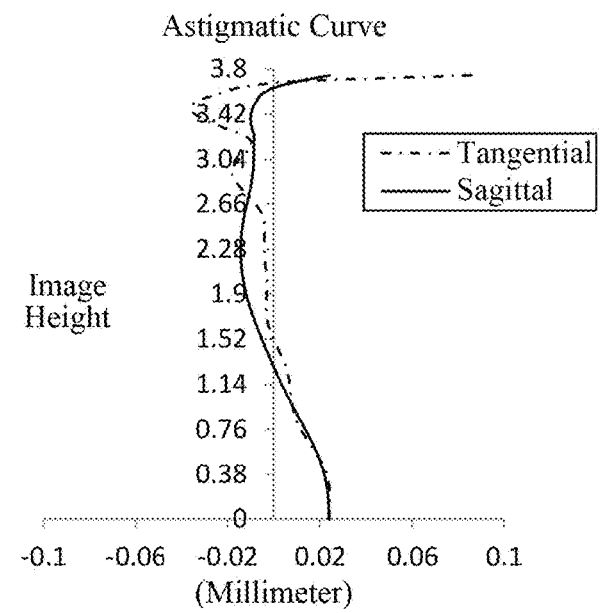
Figure 8C:
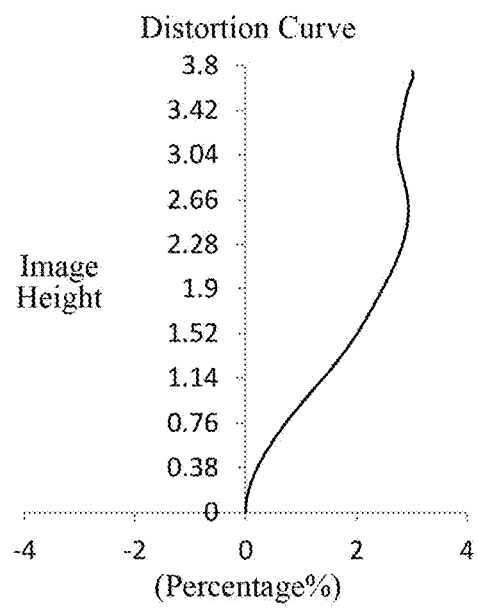
Figure 8D:
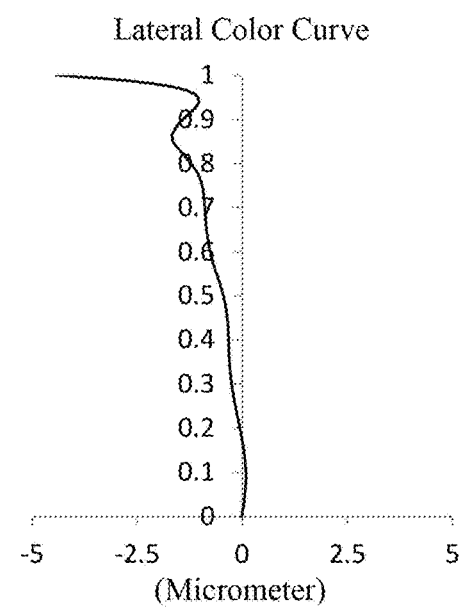

FIG. 8A shows a longitudinal aberration curve of the camera lens assembly of embodiment 4, which represents deviations of focal points converged by light of different wavelengths after passing through the camera lens assembly. FIG. 8B shows an astigmatism curve of the camera lens assembly of embodiment 4, which represents a curvature of a tangential plane and a curvature of a sagittal plane. FIG. 8C shows a distortion curve of the camera lens assembly of embodiment 1, which represents amounts of distortion at different FOVs. FIG. 8D shows a lateral color curve of the camera lens assembly of embodiment 4, which represents deviations of different image heights on the imaging plane after light passes through the lens assembly. As can be seen from FIGS. 8A to 8D, the camera lens assembly according to embodiment 4 can achieve good image quality.

Embodiment 5

A camera lens assembly according to embodiment 5 of the present disclosure is described below with reference to FIG. 9 to FIG. 10D. FIG. 9 shows a schematic configuration diagram of the camera lens assembly according to embodiment 5 of the present disclosure.

As shown in FIG. 9, the camera lens assembly according to an exemplary implementation of the present disclosure includes a first lens E1, a second lens E2, a third lens E3, a fourth lens E4, a fifth lens E5, a sixth lens E6, a seventh lens E7, an eighth lens E8 and an image plane S17, sequentially from an object side of the lens assembly to an image side of the lens assembly along an optical axis.

The first lens E1 has a positive refractive power. An object-side surface S1 of the first lens E1 is a convex surface, and an image-side surface S2 of the first lens E1 is a concave surface. The second lens E2 has a negative refractive power. An object-side surface S3 of the second lens E2 is a convex surface, and an image-side surface S4 of the second lens E2 is a concave surface. The third lens E3 has a positive refractive power. An object-side surface S5 of the third lens E3 is a concave surface, and an image-side surface S6 of the third lens E3 is a convex surface. The fourth lens E4 has a negative refractive power. An object-side surface S7 of the fourth lens E4 is a convex surface, and an image-side surface S8 of the fourth lens E4 is a concave surface. The fifth lens E5 has a positive refractive power. An object-side surface S9 of the fifth lens E5 is a convex surface, and an image-side surface S10 of the fifth lens E5 is a convex surface. The sixth lens E6 has a positive refractive power. An object-side surface S11 of the sixth lens E6 is a concave surface, and an image-side surface S12 of the sixth lens E6 is a convex surface. The seventh lens E7 has a negative refractive power. An object-side surface S13 of the seventh lens E7 is a concave surface, and an image-side surface S14 of the seventh lens E7 is a convex surface. The eighth lens E8 has a negative refractive power. An object-side surface S15 of the eighth lens E8 is a concave surface, and an image-side surface S16 of the eighth lens E8 is a concave surface. Light from an object sequentially passes through the respective surfaces S1 to S16 and is finally imaged on the imaging plane S17.

Alternatively, the camera lens assembly in the present embodiment further includes a stop STO disposed between the second lens E2 and the third lens E3.

Table 13 shows surface type, radius of curvature, thickness, material, and conic coefficient of each lens of the camera lens assembly in embodiment 5, wherein the units for the radius of curvature and the thickness are millimeters (mm). Table 14 shows high-order coefficients that can be used for each aspherical surface in embodiment 5, wherein the surface type of each aspherical surface can be defined by the formula (1) given in embodiment 1 as described above. Table 15 shows effective focal length f1 to f8 of respective lens, a total effective focal length f of the camera lens assembly, a total track length TTL of the camera lens assembly, half of a diagonal length ImgH of an effective pixel area on the imaging plane S17 and a maximal field of view FOV of the camera lens assembly in embodiment 5.

TABLE 13

| Surface number | Surface type | Radius of curvature | Thickness | Material Refractive index | Abbe number | Conic coefficient |
|---|---|---|---|---|---|---|
| OBJ | Spherical | Infinity | Infinity | | | |
| S1 | Aspherical | 2.1744 | 0.8869 | 1.55 | 64.1 | 0.0528 |
| S2 | Aspherical | 9.9661 | 0.1000 | | | −98.9994 |
| S3 | Aspherical | 2.5834 | 0.2000 | 1.67 | 20.4 | −3.4101 |
| S4 | Aspherical | 1.9696 | 0.2378 | | | −1.7346 |
| STO | Spherical | Infinity | 0.1661 | | | |
| S5 | Aspherical | −40.4969 | 0.3860 | 1.55 | 64.1 | 99.0000 |
| S6 | Aspherical | −6.0645 | 0.1000 | | | 24.0679 |
| S7 | Aspherical | 117.3786 | 0.2008 | 1.67 | 20.4 | 10.7783 |
| S8 | Aspherical | 62.5638 | 0.1000 | | | −99.0000 |
| S9 | Aspherical | 1357.0693 | 0.2879 | 1.55 | 64.1 | −99.0000 |
| S10 | Aspherical | −34.0891 | 0.4357 | | | 99.0000 |
| S11 | Aspherical | −16.0980 | 0.4553 | 1.67 | 20.4 | 95.5680 |
| S12 | Aspherical | −2.0659 | 0.1039 | | | −9.3865 |
| S13 | Aspherical | −4.9512 | 0.3447 | 1.55 | 64.1 | 2.4187 |
| S14 | Aspherical | −6.2965 | 0.1739 | | | 3.1516 |
| S15 | Aspherical | −5.8000 | 0.3710 | 1.67 | 20.4 | 1.7549 |
| S16 | Aspherical | 2.3090 | 0.9500 | | | −14.5447 |
| S17 | Spherical | Infinity | | | | |

TABLE 14

| Surface number | A4 | A6 | A8 | A10 | A12 |
|---|---|---|---|---|---|
| S1 | −5.9655E−04 | 4.3365E−03 | −1.7058E−02 | 3.1307E−02 | −3.1808E−02 |
| S2 | −3.3357E−02 | 7.6078E−02 | −1.0436E−01 | 1.0034E−01 | −6.6726E−02 |
| S3 | −1.0372E−01 | 3.9535E−02 | 1.2940E−01 | −4.4164E−01 | 6.9309E−01 |
| S4 | −7.2823E−02 | −4.6095E−02 | 5.6512E−01 | −2.1784E+00 | 4.9177E+00 |
| S5 | −4.5950E−04 | −2.7272E−01 | 1.2739E+00 | −3.9833E+00 | 7.8692E+00 |
| S6 | 6.2325E−02 | −6.8315E−01 | 2.1912E+00 | −4.6816E+00 | 6.8169E+00 |
| S7 | 1.9491E−01 | −1.3534E+00 | 3.7322E+00 | −6.8567E+00 | 8.4074E+00 |
| S8 | 3.0384E−01 | −1.4410E+00 | 3.4041E+00 | −5.3026E+00 | 5.4416E+00 |
| S9 | 2.1863E−01 | −8.7699E−01 | 1.8773E+00 | −2.4501E+00 | 2.0381E+00 |
| S10 | 3.2345E−03 | −1.6557E−01 | 2.4793E−01 | −1.5147E−01 | 3.0532E−02 |
| S11 | 5.3398E−02 | −1.2180E−01 | 1.1339E−01 | −6.2046E−02 | −1.3682E−02 |
| S12 | 7.3342E−02 | −2.1264E−01 | 3.1098E−01 | −2.9885E−01 | 1.7771E−01 |
| S13 | 2.2685E−01 | −4.7835E−01 | 5.3230E−01 | −4.2494E−01 | 2.2036E−01 |
| S14 | 2.7142E−01 | −3.5191E−01 | 2.5558E−01 | −1.3232E−01 | 4.8872E−02 |
| S15 | 1.2419E−02 | −8.5358E−02 | 8.5394E−02 | −4.1013E−02 | 1.1450E−02 |
| S16 | −7.7602E−02 | 2.4645E−02 | −5.2011E−03 | 1.5461E−03 | −5.5990E−04 |

| Surface number | A14 | A16 | A18 | A20 |
|---|---|---|---|---|
| S1 | 1.9121E−02 | −6.7539E−03 | 1.2934E−03 | −1.0491E−04 |
| S2 | 2.9133E−02 | −7.8845E−03 | 1.1927E−03 | −7.7332E−05 |

TABLE 14-continued

| | | | |
|---|---|---|---|
| S3 | −6.2900E−01 | 3.3752E−01 | −9.8903E−02 | 1.2144E−02 |
| S4 | −6.7856E+00 | 5.6508E+00 | −2.6061E+00 | 5.1321E−01 |
| S5 | −9.8756E+00 | 7.6409E+00 | −3.3202E+00 | 6.2018E−01 |
| S6 | −6.6394E+00 | 4.1361E+00 | −1.4883E+00 | 2.3519E−01 |
| S7 | −6.7145E+00 | 3.3313E+00 | −9.2329E−01 | 1.0842E−01 |
| S8 | −3.6585E+00 | 1.5574E+00 | −3.8159E−01 | 4.1463E−02 |
| S9 | −1.0924E+00 | 3.6744E−01 | −7.0696E−02 | 5.9310E−03 |
| S10 | 1.3589E−02 | −9.6206E−03 | 2.2436E−03 | −2.0292E−04 |
| S11 | 4.3620E−02 | −2.6556E−02 | 7.0942E−03 | −7.1664E−04 |
| S12 | −6.4147E−02 | 1.3746E−02 | −1.6155E−03 | 8.0611E−05 |
| S13 | −6.9870E−02 | 1.3072E−02 | −1.3275E−03 | 5.6462E−05 |
| S14 | −1.2223E−02 | 1.9307E−03 | −1.7200E−04 | 6.5524E−06 |
| S15 | −1.9471E−03 | 1.9882E−04 | −1.1195E−05 | 2.6634E−07 |
| S16 | 1.2846E−04 | −1.6407E−05 | 1.0948E−06 | −3.0027E−08 |

TABLE 15

| | | | |
|---|---|---|---|
| f1(mm) | 4.84 | f7(mm) | −46.16 |
| f2(mm) | −13.87 | f8(mm) | −2.35 |
| f3(mm) | 12.86 | f (mm) | 4.49 |
| f4(mm) | −194.71 | TTL (mm) | 5.50 |
| f5(mm) | 60.21 | ImgH (mm) | 3.77 |
| f6(mm) | 3.39 | FOV (°) | 79.3 |

Figure 10C:
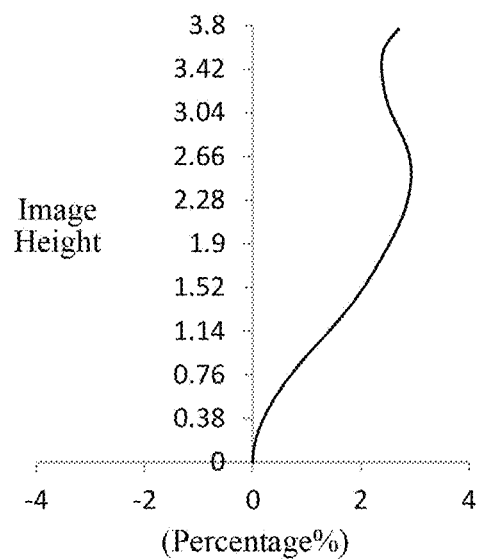
Figure 10D:
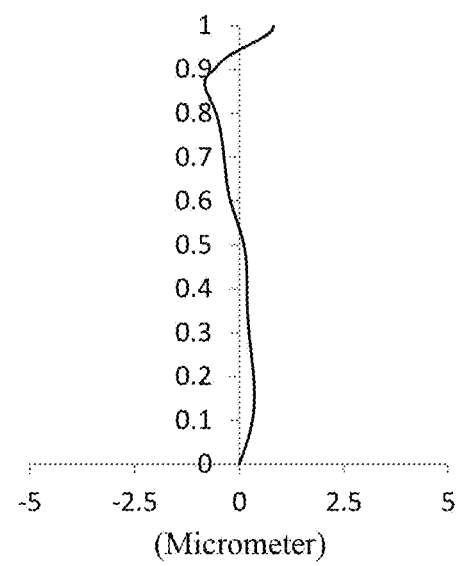

FIG. 10A shows a longitudinal aberration curve of the camera lens assembly of embodiment 5, which represents deviations of focal points converged by light of different wavelengths after passing through the lens assembly. FIG. 10B shows an astigmatism curve of the camera lens assembly of embodiment 5, which represents a curvature of a tangential plane and a curvature of a sagittal plane. FIG. 10C shows a distortion curve of the camera lens assembly of embodiment 5, which represents amounts of distortion at different FOVs. FIG. 10D shows a lateral color curve of the camera lens assembly of embodiment 5, which represents deviations of different image heights on the imaging plane after light passes through the lens assembly. As can be seen from FIG. 10A to FIG. 10D, the camera lens assembly according to embodiment 5 can achieve good imaging quality.

Embodiment 6

Figure 11:
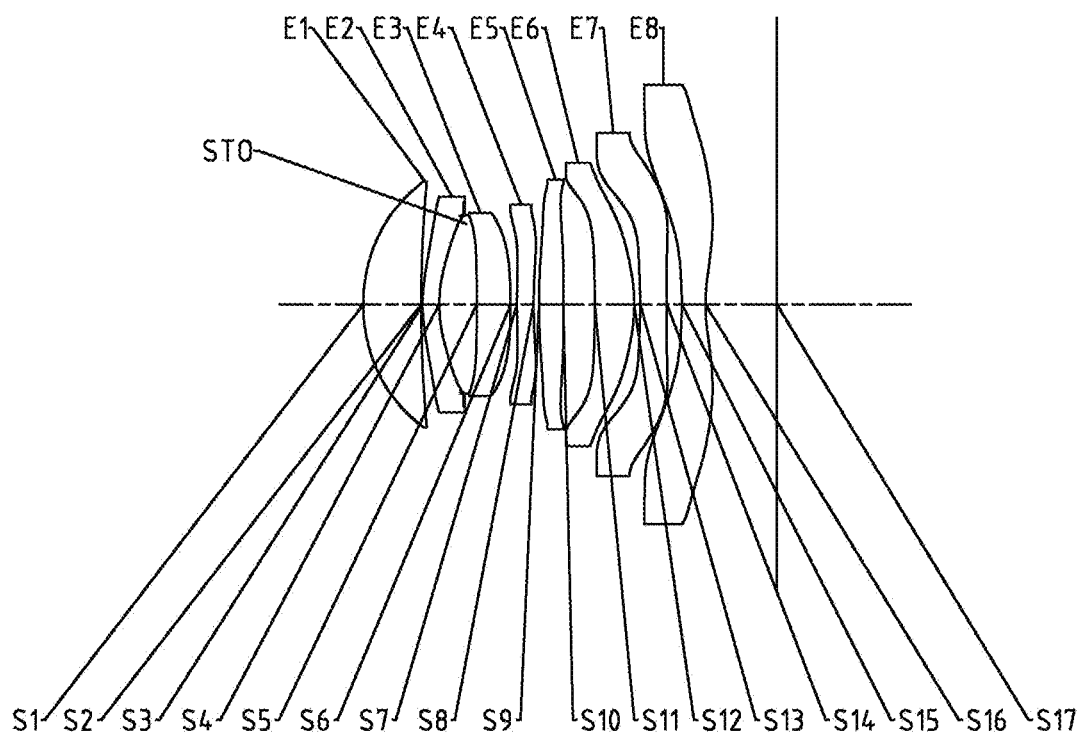
FIG. 11 shows a schematic configuration diagram of a camera lens assembly according to embodiment 6 of the present application.

A camera lens assembly according to embodiment 6 of the present disclosure is described below with reference to FIG. 11 to FIG. 12D. FIG. 11 shows a schematic configuration diagram of the camera lens assembly according to embodiment 6 of the present disclosure.

As shown in FIG. 11, a camera lens assembly according to an exemplary implementation of the present disclosure includes a first lens E1, a second lens E2, a third lens E3, a fourth lens E4, a fifth lens E5, a sixth lens E6, a seventh lens E7, an eighth lens E8, and an image plane S17, sequentially from an object side of the lens assembly to an image side of the lens assembly along an optical axis.

The first lens E1 has a positive refractive power. An object-side surface S1 of the first lens E1 is a convex surface, and an image-side surface S2 of the first lens E1 is a concave surface. The second lens E2 has a negative refractive power. An object-side surface S3 of the second lens E2 is a convex surface, and an image-side surface S4 of the second lens E2 is a concave surface. The third lens E3 has a positive refractive power. An object-side surface S5 of the third lens E3 is a concave surface, and an image-side surface S6 of the third lens E3 is a convex surface. The fourth lens E4 has a negative refractive power. An object-side surface S7 of the fourth lens E4 is a convex surface, and an image-side surface S8 of the fourth lens E4 is a concave surface. The fifth lens E5 has a positive refractive power. An object-side surface S9 of the fifth lens E5 is a convex surface, and an image-side surface S10 of the fifth lens E5 is a concave surface. The sixth lens E6 has a positive refractive power. An object-side surface S11 of the sixth lens E6 is a concave surface, and an image-side surface S12 of the sixth lens E6 is a convex surface. The seventh lens E7 has a negative refractive power. An object-side surface S13 of the seventh lens E7 is a concave surface, and an image-side surface S14 of the seventh lens E7 is a convex surface. The eighth lens E8 has a negative refractive power. An object-side surface S15 of the eighth lens E8 is a concave surface, and an image-side surface S16 of the eighth lens E8 is a concave surface. Light from an object sequentially passes through the respective surfaces S1 to S16 and is finally imaged on the imaging plane S17.

Alternatively, the camera lens assembly in the present embodiment further includes a stop STO disposed between the second lens E2 and the third lens E3.

Table 16 shows surface type, radius of curvature, thickness, material, and conic coefficient of each lens of the camera lens assembly of embodiment 6, wherein the units for the radius of curvature and the thickness are millimeters (mm). Table 17 shows high-order coefficients that can be used for each aspherical surface in embodiment 6, wherein the surface type of each aspherical surface can be defined by the formula (1) given in embodiment 1 as described above. Table 18 shows effective focal lengths f1 to f8 of the respective lens, a total effective focal length f of the camera lens assembly, a total track length TTL of the camera lens assembly, half of a diagonal length ImgH of an effective pixel area on the imaging plane S17, and a maximal field of view FOV of the camera lens assembly in embodiment 6.

TABLE 16

| Surface number | Surface type | Radius of curvature | Thickness | Material Refractive index | Material Abbe number | Conic coefficient |
|---|---|---|---|---|---|---|
| OBJ | Spherical | Infinity | Infinity | | | |
| S1 | Aspherical | 2.1428 | 0.7697 | 1.55 | 64.1 | 0.1765 |
| S2 | Aspherical | 12.4708 | 0.0214 | | | −87.3760 |
| S3 | Aspherical | 2.3121 | 0.2200 | 1.67 | 20.4 | −4.0039 |
| S4 | Aspherical | 1.7408 | 0.3254 | | | −1.9380 |
| STO | Spherical | Infinity | 0.1734 | | | |
| S5 | Aspherical | −44.5375 | 0.4486 | 1.55 | 64.1 | −21.0989 |
| S6 | Aspherical | −6.4022 | 0.0856 | | | 24.0531 |
| S7 | Aspherical | 15.9110 | 0.2200 | 1.67 | 20.4 | −43.7189 |
| S8 | Aspherical | 8.6358 | 0.0723 | | | −49.7621 |
| S9 | Aspherical | 13.0376 | 0.3231 | 1.55 | 64.1 | −99.0000 |

TABLE 16-continued

| Surface number | Surface type | Radius of curvature | Thickness | Material Refractive index | Abbe number | Conic coefficient |
|---|---|---|---|---|---|---|
| S10 | Aspherical | 1232.5044 | 0.4184 | | | 99.0000 |
| S11 | Aspherical | −16.3314 | 0.5248 | 1.67 | 20.4 | 95.0894 |
| S12 | Aspherical | −2.0629 | 0.0793 | | | −8.0523 |
| S13 | Aspherical | −5.4752 | 0.3552 | 1.55 | 64.1 | 2.8756 |
| S14 | Aspherical | −6.7366 | 0.1978 | | | 4.0351 |
| S15 | Aspherical | −5.7283 | 0.3150 | 1.67 | 20.4 | 1.9179 |
| S16 | Aspherical | 2.3546 | 0.9500 | | | −9.9941 |
| S17 | Spherical | Infinity | | | | |

TABLE 17

| Surface number | A4 | A6 | A8 | A10 | A12 |
|---|---|---|---|---|---|
| S1 | 5.6112E−03 | −1.3008E−02 | 2.9644E−02 | −4.2907E−02 | 4.0138E−02 |
| S2 | −3.4317E−02 | 6.0076E−02 | −6.1347E−02 | 4.3829E−02 | −2.1249E−02 |
| S3 | −7.7024E−02 | −2.5502E−03 | 5.9280E−02 | −7.4341E−02 | 5.3113E−02 |
| S4 | −4.6286E−02 | −4.7485E−02 | 8.9528E−02 | −3.3670E−02 | −4.1832E−02 |
| S5 | 5.0341E−03 | −1.4585E−01 | 4.5944E−01 | −1.1229E+00 | 1.7342E+00 |
| S6 | 1.0440E−01 | −6.9503E−01 | 1.8209E+00 | −3.2634E+00 | 4.0036E+00 |
| S7 | 1.7688E−01 | −1.1283E+00 | 2.7985E+00 | −4.7026E+00 | 5.3621E+00 |
| S8 | 2.5704E−01 | −1.1799E+00 | 2.5986E+00 | −3.7542E+00 | 3.5640E+00 |
| S9 | 2.0152E−01 | −7.7886E−01 | 1.6215E+00 | −2.0723E+00 | 1.6753E+00 |
| S10 | −3.3667E−03 | −7.4275E−02 | 4.8624E−02 | 8.6578E−02 | −1.5747E−01 |
| S11 | 3.1908E−02 | −5.5474E−02 | 1.0034E−02 | 3.4028E−02 | −7.4181E−02 |
| S12 | 8.3061E−02 | −1.9700E−01 | 2.4585E−01 | −2.2919E−01 | 1.4112E−01 |
| S13 | 2.3098E−01 | −4.0943E−01 | 3.5040E−01 | −2.2239E−01 | 9.6489E−02 |
| S14 | 2.8529E−01 | −3.5858E−01 | 2.3330E−01 | −1.0031E−01 | 2.8977E−02 |
| S15 | 4.6590E−02 | −1.5909E−01 | 1.4665E−01 | −7.0220E−02 | 2.0219E−02 |
| S16 | −9.2593E−02 | 2.6699E−02 | −2.5980E−03 | −1.6972E−04 | 3.0637E−06 |

| Surface number | A14 | A16 | A18 | A20 |
|---|---|---|---|---|
| S1 | −2.3778E−02 | 8.6250E−03 | −1.7366E−03 | 1.4651E−04 |
| S2 | 6.6457E−03 | −1.2612E−03 | 1.2924E−04 | −5.2791E−06 |
| S3 | −1.8517E−02 | 2.8514E−04 | 1.7862E−03 | −3.8254E−04 |
| S4 | 5.3441E−02 | −6.3115E−03 | −1.5425E−02 | 6.2898E−03 |
| S5 | −1.6837E+00 | 1.0023E+00 | −3.3489E−01 | 4.8124E−02 |
| S6 | −3.2627E+00 | 1.6853E+00 | −4.9993E−01 | 6.5116E−02 |
| S7 | −4.0116E+00 | 1.8724E+00 | −4.9059E−01 | 5.4782E−02 |
| S8 | −2.2098E+00 | 8.6686E−01 | −1.9591E−01 | 1.9647E−02 |
| S9 | −8.6558E−01 | 2.7917E−01 | −5.1364E−02 | 4.1161E−03 |
| S10 | 1.1137E−01 | −4.1504E−02 | 8.0997E−03 | −6.5841E−04 |
| S11 | 7.0766E−02 | −3.4940E−02 | 8.6471E−03 | −8.4180E−04 |
| S12 | −5.4168E−02 | 1.2606E−02 | −1.6443E−03 | 9.2824E−05 |
| S13 | −2.5421E−02 | 3.7500E−03 | −2.6949E−04 | 6.2428E−06 |
| S14 | −5.4160E−03 | 6.0784E−04 | −3.5053E−05 | 6.8299E−07 |
| S15 | −3.6235E−03 | 3.9660E−04 | −2.4329E−05 | 6.4218E−07 |
| S16 | 1.4330E−05 | −2.2404E−06 | 1.2203E−07 | −2.0285E−09 |

TABLE 18

| | | | |
|---|---|---|---|
| f1(mm) | 4.56 | f7(mm) | −58.84 |
| f2(mm) | −12.13 | f8(mm) | −2.38 |
| f3(mm) | 13.48 | f (mm) | 4.46 |
| f4(mm) | −27.75 | TTL (mm) | 5.50 |
| f5(mm) | 23.85 | ImgH (mm) | 3.77 |
| f6(mm) | 3.38 | FOV (°) | 79.5 |

Figure 12A:
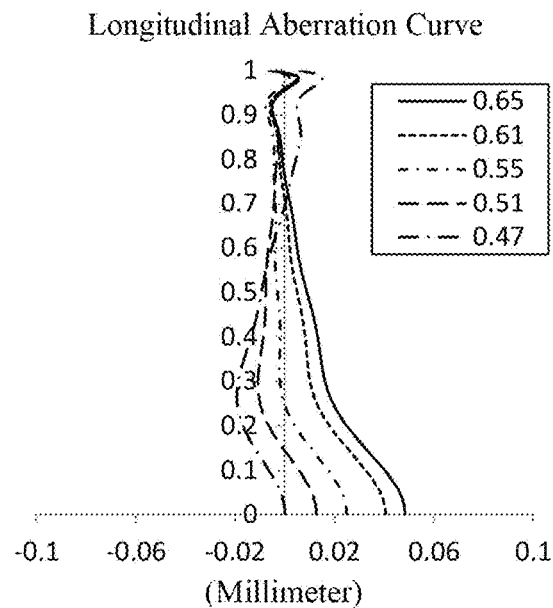
FIG. 12A to 12D show a longitudinal aberration curve, an astigmatism curve, a distortion curve, and a lateral color curve, respectively, of the camera lens assembly of embodiment 6.
Figure 12B:
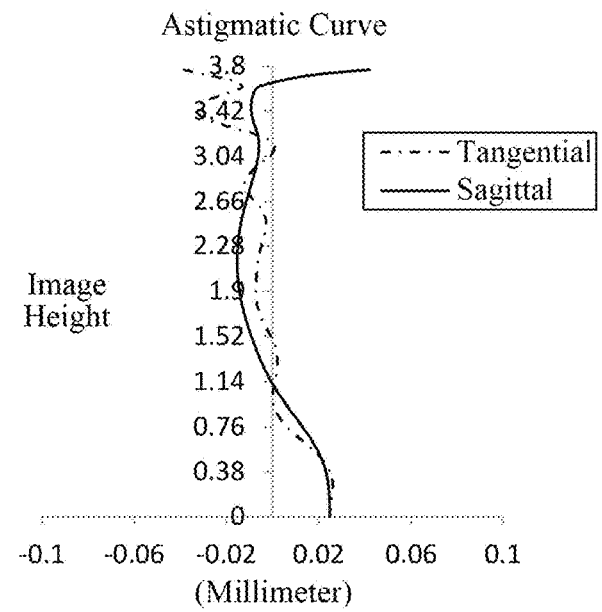
Figure 12C:
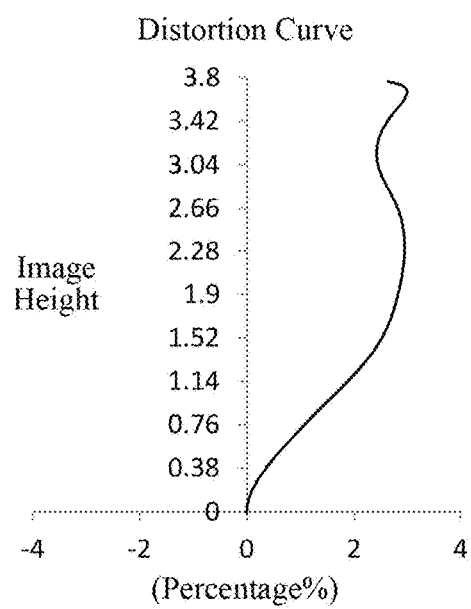
Figure 12D:
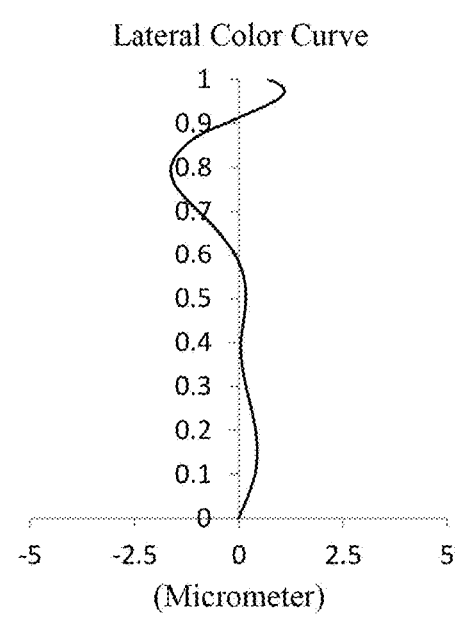

FIG. 12A shows a longitudinal aberration curve of the camera lens assembly of embodiment 6, which represents deviations of focal points converged by light of different wavelengths after passing through the lens assembly. FIG. 12B shows an astigmatism curve of the camera lens assembly of embodiment 6, which represents a curvature of a tangential plane and a curvature of a sagittal plane. FIG. 12C shows a distortion curve of the camera lens assembly of embodiment 6, which represents amounts of distortion at different FOVs. FIG. 12D shows a lateral color curve of the camera lens assembly of embodiment 6, which represents deviations of different image heights on the imaging plane after light passes through the lens assembly. As can be seen from FIG. 12A to FIG. 12D, the camera lens assembly according to embodiment 6 can achieve good imaging quality.

Embodiment 7

Figure 13:
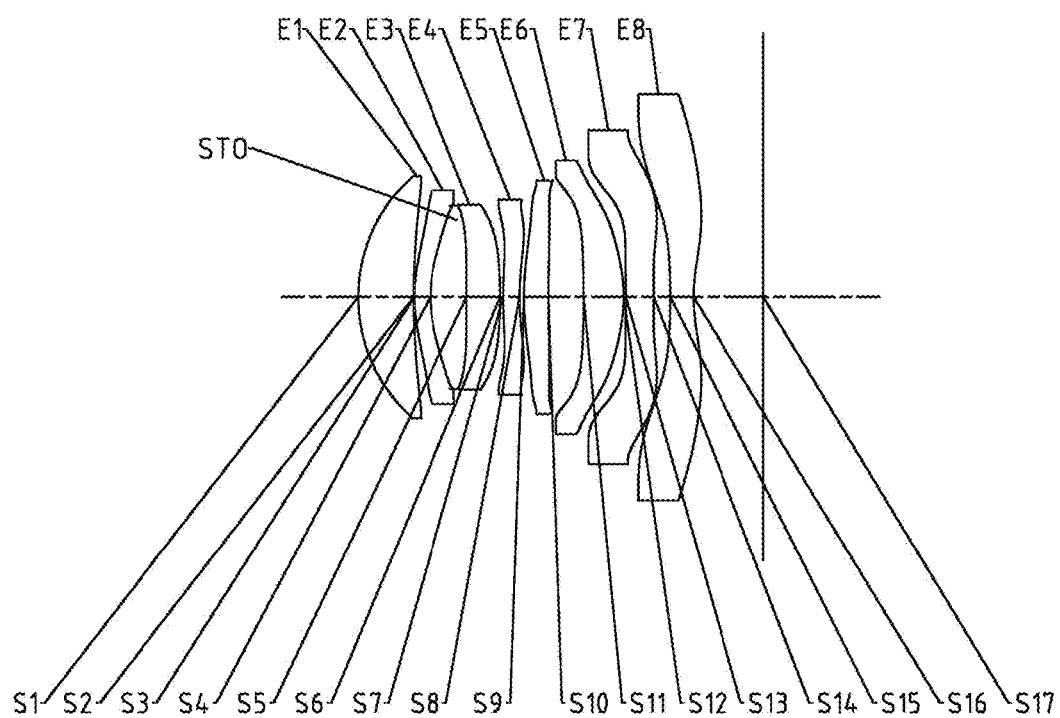
FIG. 13 shows a schematic configuration diagram of a camera lens assembly according to embodiment 7 of the present application.

A camera lens assembly according to embodiment 7 of the present disclosure is described below with reference to FIG. 13 to FIG. 14D. FIG. 13 shows a schematic configuration diagram of a camera lens assembly according to embodiment 7 of the present disclosure.

As shown in FIG. 13, the camera lens assembly according to an exemplary implementation of the present disclosure includes a first lens E1, a second lens E2, a third lens E3, a fourth lens E4, a fifth lens E5, a sixth lens E6, a seventh lens E7, an eighth lens E8, and an image plane S17, sequentially from an object side of the lens assembly to an image side of the lens assembly along an optical axis.

The first lens E1 has a positive refractive power. An object-side surface S1 of the first lens E1 is a convex surface, and an image-side surface S2 of the first lens E1 is a concave surface. The second lens E2 has a negative refractive power. An object-side surface S3 of the second lens E2 is a convex surface, and an image-side surface S4 of the second lens E2 is a concave surface. The third lens E3 has a positive refractive power. An object-side surface S5 of the third lens E3 is a concave surface, and an image-side surface S6 of the third lens E3 is a convex surface. The fourth lens E4 has a negative refractive power. An object-side surface S7 of the fourth lens E4 is a convex surface, and an image-side surface S8 of the fourth lens E4 is a concave surface. The fifth lens E5 has a positive refractive power. An object-side surface S9 of the fifth lens E5 is a convex surface, and an image-side surface S10 of the fifth lens E5 is a concave surface. The sixth lens E6 has a positive refractive power. An object-side surface S11 of the sixth lens E6 is a concave surface, and an image-side surface S12 of the sixth lens E6 is a convex surface. The seventh lens E7 has a negative refractive power. An object-side surface S13 of the seventh lens E7 is a concave surface, and an image-side surface S14 of the seventh lens E7 is a convex surface. The eighth lens E8 has a negative refractive power. An object-side surface S15 of the eighth lens E8 is a concave surface, and an image-side surface S16 of the eighth lens E8 is a concave surface. Light from an object sequentially passes through the respective surfaces S1 to S16 and is finally imaged on the imaging plane S17.

Alternatively, the camera lens assembly in the present embodiment further includes a stop STO disposed between the second lens E2 and the third lens E3.

Table 19 shows surface type, radius of curvature, thickness, material, and conic coefficient of each lens of the camera lens assembly in embodiment 7, wherein the units for the radius of curvature and the thickness are millimeters (mm). Table 20 shows high-order coefficients that can be used for each aspherical surface in embodiment 7, wherein the surface type of each aspherical surface can be defined by the formula (1) given in embodiment 1 as described above.

Table 21 shows effective focal lengths f1 to f8 of the respective lens, a total effective focal length f of the camera lens assembly, a total optical length TTL of the camera lens assembly, half of a diagonal length ImgH of an effective pixel area on the imaging plane S17, and a maximal field of view FOV of the camera lens assembly in embodiment 7.

TABLE 19

| Surface number | Surface type | Radius of curvature | Thickness | Refractive index | Abbe number | Conic coefficient |
| --- | --- | --- | --- | --- | --- | --- |
| OBJ | Spherical | Infinity | Infinity | | | |
| S1 | Aspherical | 2.2658 | 0.7500 | 1.55 | 64.1 | 0.1390 |
| S2 | Aspherical | 7.9258 | 0.0100 | | | −59.0998 |
| S3 | Aspherical | 2.1850 | 0.2200 | 1.67 | 20.4 | −3.9329 |
| S4 | Aspherical | 1.8520 | 0.3148 | | | −2.4037 |
| STO | Spherical | Infinity | 0.1783 | | | |
| S5 | Aspherical | −119.9077 | 0.4549 | 1.55 | 64.1 | −99.0000 |
| S6 | Aspherical | −6.5950 | 0.0439 | | | 23.3824 |
| S7 | Aspherical | 7.8785 | 0.2200 | 1.67 | 20.4 | −65.9538 |
| S8 | Aspherical | 3.7671 | 0.0606 | | | −52.4904 |
| S9 | Aspherical | 4.0770 | 0.3299 | 1.55 | 64.1 | −83.1925 |
| S10 | Aspherical | 12.2630 | 0.4774 | | | −99.0000 |
| S11 | Aspherical | −16.2537 | 0.5431 | 1.67 | 20.4 | 95.7305 |
| S12 | Aspherical | −2.0313 | 0.0300 | | | −7.1098 |
| S13 | Aspherical | −7.6479 | 0.3772 | 1.55 | 64.1 | 5.7281 |
| S14 | Aspherical | −11.2530 | 0.2249 | | | 8.7655 |
| S15 | Aspherical | −7.3504 | 0.3150 | 1.67 | 20.4 | 3.3943 |
| S16 | Aspherical | 2.3287 | 0.9500 | | | −7.6593 |
| S17 | Spherical | Infinity | | | | |

TABLE 20

| Surface number | A4 | A6 | A8 | A10 | A12 |
| --- | --- | --- | --- | --- | --- |
| S1 | 6.5400E−03 | −1.6727E−02 | 3.5854E−02 | −5.0862E−02 | 4.6677E−02 |
| S2 | −5.0085E−02 | 1.1672E−01 | −1.5133E−01 | 1.3418E−01 | −8.1803E−02 |
| S3 | −7.4827E−02 | 3.7887E−02 | −2.6713E−02 | 4.2004E−02 | −7.0994E−02 |
| S4 | −2.9573E−02 | −7.6737E−02 | 1.6332E−01 | −2.1996E−01 | 2.3411E−01 |
| S5 | −6.1997E−03 | −8.4195E−02 | 2.3586E−01 | −5.3356E−01 | 7.4776E−01 |
| S6 | 1.5393E−01 | −9.8286E−01 | 2.6308E+00 | −4.5434E+00 | 5.2393E+00 |
| S7 | 1.7406E−01 | −1.1283E+00 | 2.7362E+00 | −4.3218E+00 | 4.5720E+00 |
| S8 | 1.7761E−01 | −7.6274E−01 | 1.5010E+00 | −1.9243E+00 | 1.5679E+00 |
| S9 | 1.4871E−01 | −4.9931E−01 | 9.5909E−01 | −1.0998E+00 | 7.3768E−01 |
| S10 | −3.8847E−02 | 5.3279E−02 | −1.6260E−01 | 3.2378E−01 | −3.4528E−01 |
| S11 | −1.8797E−03 | 7.6391E−03 | −3.5534E−02 | 3.3444E−02 | −4.0511E−02 |
| S12 | 6.8107E−02 | −1.4657E−01 | 1.4969E−01 | −1.1205E−01 | 5.0912E−02 |
| S13 | 2.3114E−01 | −3.7251E−01 | 2.6909E−01 | −1.3289E−01 | 3.9072E−02 |
| S14 | 2.8890E−01 | −3.6405E−01 | 2.3776E−01 | −1.0393E−01 | 3.0973E−02 |
| S15 | 6.7164E−02 | −1.8462E−01 | 1.5580E−01 | −7.0447E−02 | 1.9642E−02 |
| S16 | −8.7622E−02 | 1.8052E−02 | 6.7305E−04 | −2.8729E−04 | −2.4356E−04 |

| Surface number | A14 | A16 | A18 | A20 |
| --- | --- | --- | --- | --- |
| S1 | −2.6974E−02 | 9.4548E−03 | −1.8175E−03 | 1.4408E−04 |
| S2 | 3.3385E−02 | −8.7439E−03 | 1.3350E−03 | −9.0947E−05 |
| S3 | 7.0488E−02 | −3.8444E−02 | 1.1008E−02 | −1.2983E−03 |
| S4 | −2.0396E−01 | 1.3382E−01 | −5.3315E−02 | 9.3625E−03 |
| S5 | −6.4636E−01 | 3.3665E−01 | −9.6735E−02 | 1.1722E−02 |
| S6 | −3.9877E+00 | 1.9189E+00 | −5.2830E−01 | 6.3405E−02 |
| S7 | −3.1924E+00 | 1.4092E+00 | −3.5403E−01 | 3.8338E−02 |
| S8 | −8.0645E−01 | 2.5835E−01 | −4.7891E−02 | 4.0901E−03 |
| S9 | −2.8359E−01 | 5.7947E−02 | −4.7283E−03 | −5.5753E−05 |
| S10 | 2.0805E−01 | −7.1905E−02 | 1.3475E−02 | −1.0749E−03 |
| S11 | 3.7505E−02 | −1.9271E−02 | 4.9620E−03 | −4.9691E−04 |
| S12 | −1.1427E−02 | 5.3579E−04 | 2.2506E−04 | −2.9721E−05 |
| S13 | −3.8174E−03 | −9.2643E−04 | 2.7027E−04 | −1.9553E−05 |
| S14 | −6.0953E−03 | 7.4686E−04 | −5.0690E−05 | 1.4194E−06 |

TABLE 20-continued

| S15 | −3.4926E−03 | 3.8743E−04 | −2.4490E−05 | 6.7366E−07 |
| S16 | 9.7119E−05 | −1.5020E−05 | 1.1188E−06 | −3.3553E−08 |

TABLE 21

| f1(mm) | 5.49 | f7(mm) | −44.89 |
|---|---|---|---|
| f2(mm) | −24.14 | f8(mm) | −2.53 |
| f3(mm) | 12.62 | f (mm) | 4.35 |
| f4(mm) | −10.71 | TTL (mm) | 5.50 |
| f5(mm) | 10.90 | ImgH (mm) | 3.55 |
| f6(mm) | 3.32 | FOV (°) | 77.5 |

Figure 14A:
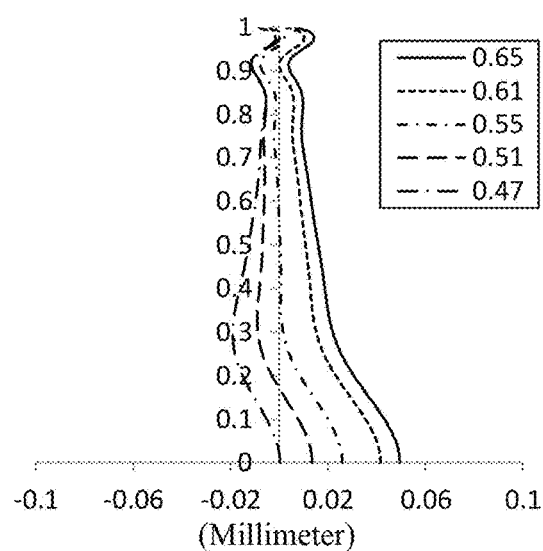
FIG. 14A to 14D show a longitudinal aberration curve, an astigmatism curve, a distortion curve, and a lateral color curve, respectively, of the camera lens assembly of embodiment 7.
Figure 14B:
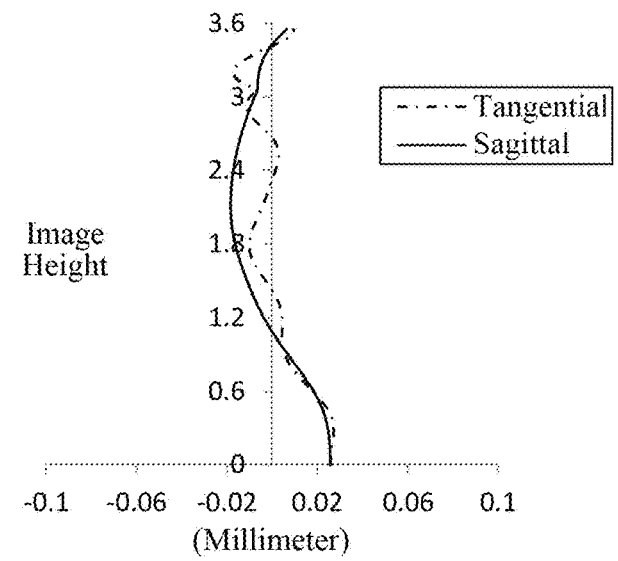
Figures 14C, 14D:
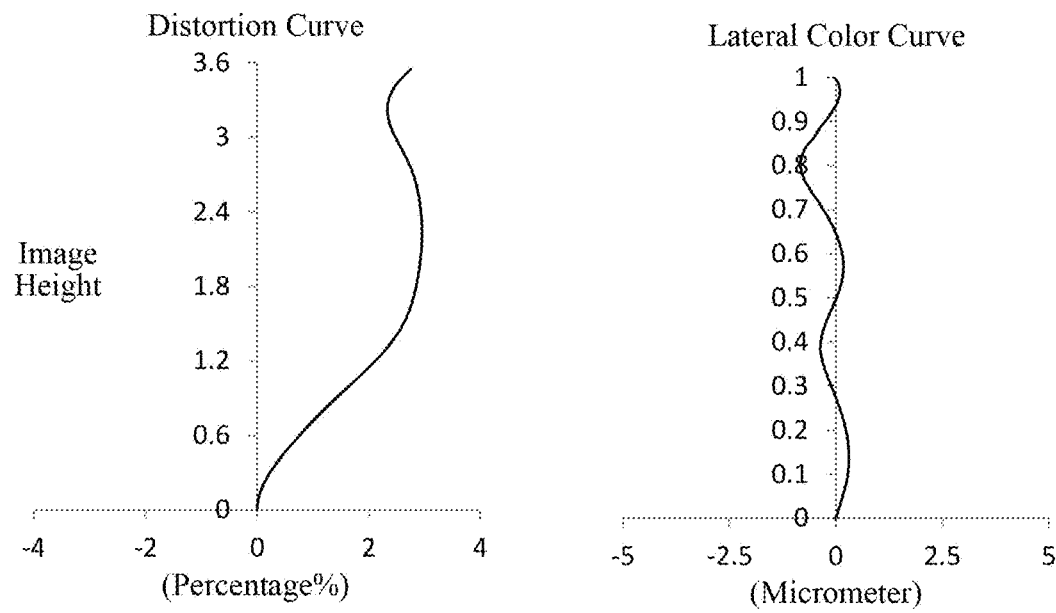

FIG. 14A shows a longitudinal aberration curve of the camera lens assembly of embodiment 7, which represents deviations of focal points converged by light of different wavelengths after passing through the lens assembly. FIG. 14B shows an astigmatism curve of the camera lens assembly of embodiment 7, which represents a curvature of a tangential plane and a curvature of a sagittal plane. FIG. 14C shows a distortion curve of the camera lens assembly of embodiment 7, which represents amounts of distortion at different FOVs. FIG. 14D shows a lateral color curve of the camera lens assembly of embodiment 7, which represents deviations of different image heights on the imaging plane after light passes through the lens assembly. As can be seen from FIG. 14A to FIG. 14D, the camera lens assembly according to embodiment 7 can achieve good imaging quality.

Embodiment 8

Figure 15:
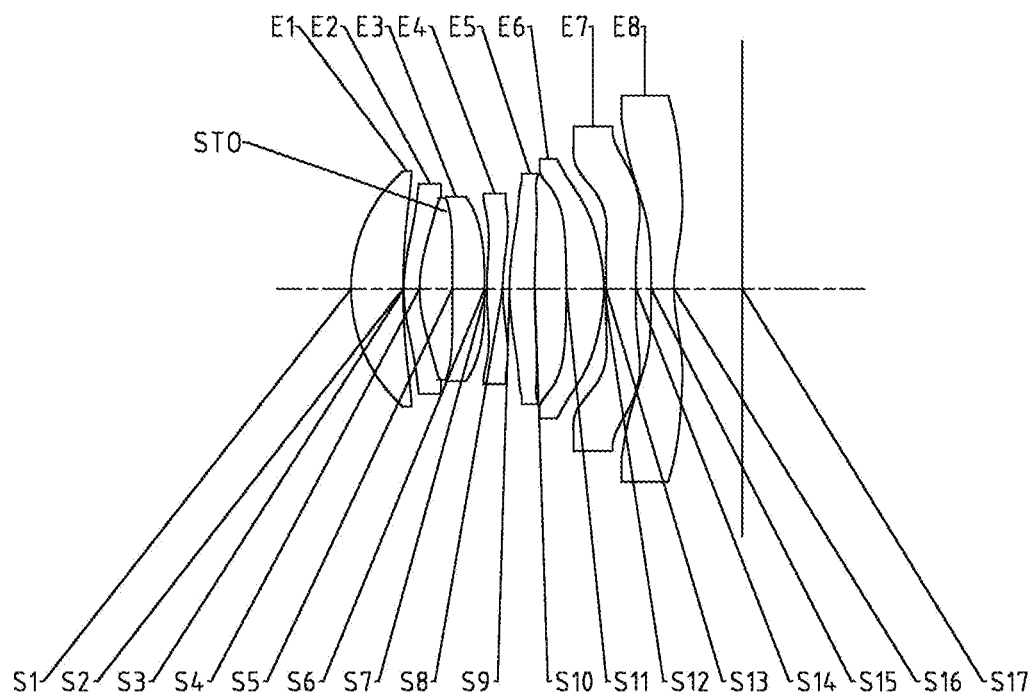
FIG. 15 shows a schematic configuration diagram of a camera lens assembly according to embodiment 8 of the present application.

A camera lens assembly according to embodiment 8 of the present disclosure is described below with reference to FIG. 15 to FIG. 16D. FIG. 15 shows a schematic configuration diagram of the camera lens assembly according to embodiment 8 of the present disclosure.

As shown in FIG. 15, the camera lens assembly according to an exemplary embodiment of the present disclosure includes a first lens E1, a second lens E2, a third lens E3, a fourth lens E4, a fifth lens E5, a sixth lens E6, a seventh lens E7, an eighth lens E8, and an image plane S17, sequentially from an object side of the lens assembly to an image side of the lens assembly along an optical axis.

The first lens E1 has a positive refractive power. An object-side surface S1 of the first lens E1 is a convex surface, and an image-side surface S2 of the first lens E1 is a concave surface. The second lens E2 has a negative refractive power. An object-side surface S3 of the second lens E2 is a convex surface, and an image-side surface S4 of the second lens E2 is a concave surface. The third lens E3 has a positive refractive power. An object-side surface S5 of the third lens E3 is a convex surface, and an image-side surface S6 of the third lens E3 is a convex surface. The fourth lens E4 has a negative refractive power. An object-side surface S7 of the fourth lens E4 is a convex surface, and an image-side surface S8 of the fourth lens E4 is a concave surface. The fifth lens E5 has a positive refractive power. An object-side surface S9 of the fifth lens E5 is a convex surface, and an image-side surface S10 of the fifth lens E5 is a concave surface. The sixth lens E6 has a positive refractive power. An object-side surface S11 of the sixth lens E6 is a concave surface, and an image-side surface S12 of the sixth lens E6 is a convex surface. The seventh lens E7 has a negative refractive power. An object-side surface S13 of the seventh lens E7 is a concave surface, and an image-side surface S14 of the seventh lens E7 is a convex surface. The eighth lens E8 has a negative refractive power. An object-side surface S15 of the eighth lens E8 is a concave surface, and an image-side surface S16 of the eighth lens E8 is a concave surface. Light from an object sequentially passes through the respective surfaces S1 to S16 and is finally imaged on the imaging plane S17.

Alternatively, the camera lens assembly in the present embodiment further includes a stop STO disposed between the second lens E2 and the third lens E3.

Table 22 shows surface type, radius of curvature, thickness, material, and conic coefficient of each lens of the camera lens assembly in embodiment 8, wherein the units for the radius of curvature and the thickness are millimeters (mm). Table 23 shows high-order coefficients that can be used for each aspherical surface in embodiment 8, wherein the surface type of each aspherical surface can be defined by the formula (1) given in embodiment 1 as described above. Table 24 shows effective focal lengths f1 to f8 of the respective lens, a total effective focal length f of the camera lens assembly, a total track length TTL of the camera lens assembly, half of a diagonal length ImgH of an effective pixel area on the imaging plane S17, and a maximal field of view FOV of the camera lens assembly in embodiment 8.

TABLE 22

| Surface number | Surface type | Radius of curvature | Thickness | Material Refractive index | Material Abbe number | Conic coefficient |
|---|---|---|---|---|---|---|
| OBJ | Spherical | Infinity | Infinity | | | |
| S1 | Aspherical | 2.3164 | 0.7234 | 1.55 | 64.1 | 0.1569 |
| S2 | Aspherical | 7.2221 | 0.0100 | | | −43.4651 |
| S3 | Aspherical | 2.1904 | 0.2200 | 1.67 | 20.4 | −4.3703 |
| S4 | Aspherical | 1.8593 | 0.2982 | | | −2.7457 |
| STO | Spherical | Infinity | 0.1559 | | | |
| S5 | Aspherical | 70.5987 | 0.4534 | 1.55 | 64.1 | 99.0000 |
| S6 | Aspherical | −6.7376 | 0.0300 | | | 22.8823 |
| S7 | Aspherical | 5.3191 | 0.2200 | 1.67 | 20.4 | −79.5656 |
| S8 | Aspherical | 2.7281 | 0.0942 | | | −53.8988 |
| S9 | Aspherical | 3.1808 | 0.3504 | 1.55 | 64.1 | −57.4514 |
| S10 | Aspherical | 9.1395 | 0.4412 | | | −99.0000 |
| S11 | Aspherical | −16.3834 | 0.5224 | 1.67 | 20.4 | 95.9862 |
| S12 | Aspherical | −2.0083 | 0.0300 | | | −6.8420 |
| S13 | Aspherical | −10.7829 | 0.4175 | 1.55 | 64.1 | 11.4893 |
| S14 | Aspherical | −13.6538 | 0.2136 | | | 15.9137 |
| S15 | Aspherical | −9.9637 | 0.3150 | 1.67 | 20.4 | 8.2589 |
| S16 | Aspherical | 2.2414 | 0.9500 | | | −5.1725 |
| S17 | Spherical | Infinity | | | | |

TABLE 23

| Surface number | A4 | A6 | A8 | A10 | A12 |
|---|---|---|---|---|---|
| S1 | 6.7097E−03 | −2.1182E−02 | 4.8318E−02 | −7.1375E−02 | 6.6322E−02 |
| S2 | −5.0083E−02 | 1.1980E−01 | −1.5455E−01 | 1.3496E−01 | −8.0927E−02 |
| S3 | −7.5773E−02 | 4.6519E−02 | −3.9585E−02 | 5.1700E−02 | −7.1267E−02 |
| S4 | −2.7941E−02 | −9.5691E−02 | 2.2698E−01 | −3.3509E−01 | 3.5351E−01 |
| S5 | 9.1183E−04 | −9.5982E−02 | 2.3239E−01 | −4.7612E−01 | 6.5555E−01 |
| S6 | 1.5954E−01 | −9.2434E−01 | 2.3090E+00 | −3.6760E+00 | 3.8968E+00 |
| S7 | 1.1765E−01 | −7.6980E−01 | 1.6235E+00 | −2.1694E+00 | 1.9262E+00 |
| S8 | 1.4007E−01 | −4.9402E−01 | 7.3852E−01 | −6.7708E−01 | 3.1310E−01 |
| S9 | 7.4036E−02 | −8.6258E−02 | −7.4206E−02 | 4.4179E−01 | −7.0953E−01 |
| S10 | −4.3853E−02 | 1.2933E−01 | −3.5243E−01 | 6.0159E−01 | −6.1225E−01 |
| S11 | −2.4529E−02 | 6.6434E−02 | −1.0616E−01 | 4.8799E−02 | 1.3077E−02 |
| S12 | 8.6167E−02 | −1.5362E−01 | 9.0720E−02 | −2.0608E−02 | −9.5635E−03 |
| S13 | 2.7296E−01 | −3.7776E−01 | 1.6353E−01 | 2.8246E−02 | −7.6744E−02 |
| S14 | 3.0759E−01 | −3.7970E−01 | 2.2569E−01 | −8.1451E−02 | 1.6805E−02 |
| S15 | 8.4183E−02 | −2.5393E−01 | 2.3314E−01 | −1.1532E−01 | 3.5284E−02 |
| S16 | −9.2095E−02 | 3.4323E−04 | 2.3752E−02 | −1.2595E−02 | 3.4539E−03 |

| Surface number | A14 | A16 | A18 | A20 |
|---|---|---|---|---|
| S1 | −3.8174E−02 | 1.3173E−02 | −2.4700E−03 | 1.9031E−04 |
| S2 | 3.2437E−02 | −8.3267E−03 | 1.2388E−03 | −8.1119E−05 |
| S3 | 6.1883E−02 | −3.0856E−02 | 8.3218E−03 | −9.4487E−04 |
| S4 | −2.7355E−01 | 1.4902E−01 | −4.9505E−02 | 7.4615E−03 |
| S5 | −5.7660E−01 | 3.0986E−01 | −9.2468E−02 | 1.1711E−02 |
| S6 | −2.7339E+00 | 1.2170E+00 | −3.1079E−01 | 3.4644E−02 |
| S7 | −1.1424E+00 | 4.4063E−01 | −9.9470E−02 | 9.8518E−03 |
| S8 | −2.4905E−02 | −3.2982E−02 | 1.0936E−02 | −7.8498E−04 |
| S9 | 5.7099E−01 | −2.4961E−01 | 5.6893E−02 | −5.3239E−03 |
| S10 | 3.7097E−01 | −1.3223E−01 | 2.5801E−02 | −2.1363E−03 |
| S11 | −2.5386E−02 | 1.1986E−02 | −2.6046E−03 | 2.3198E−04 |
| S12 | 9.4180E−03 | −3.1867E−03 | 5.2117E−04 | −3.5601E−05 |
| S13 | 4.2833E−02 | −1.1675E−02 | 1.5948E−03 | −8.7377E−05 |
| S14 | −1.2840E−03 | −1.8252E−04 | 4.5496E−05 | −2.7336E−06 |
| S15 | −6.9078E−03 | 8.4637E−04 | −5.9276E−05 | 1.8125E−06 |
| S16 | −5.8074E−04 | 6.0547E−05 | −3.6057E−06 | 9.3806E−08 |

TABLE 24

| f1(mm) | 5.87 | f7(mm) | −97.92 |
|---|---|---|---|
| f2(mm) | −24.48 | f8(mm) | −2.63 |
| f3(mm) | 11.16 | f (mm) | 4.14 |
| f4(mm) | −8.42 | TTL (mm) | 5.45 |
| f5(mm) | 8.65 | ImgH (mm) | 3.44 |
| f6(mm) | 3.27 | FOV (°) | 78.4 |

Figure 16A:
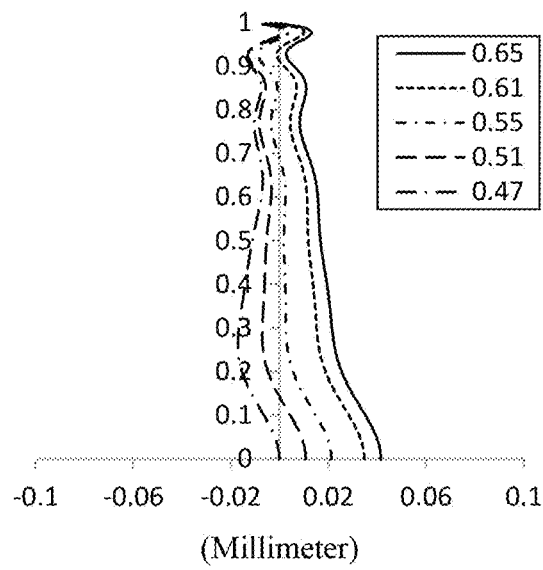
FIG. 16A to 16D show a longitudinal aberration curve, an astigmatism curve, a distortion curve, and a lateral color curve, respectively, of the camera lens assembly of embodiment 8.
Figure 16B:
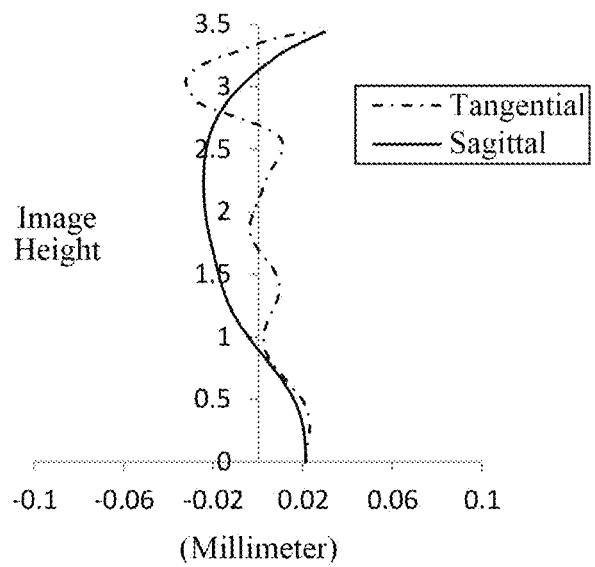
Figure 16C:
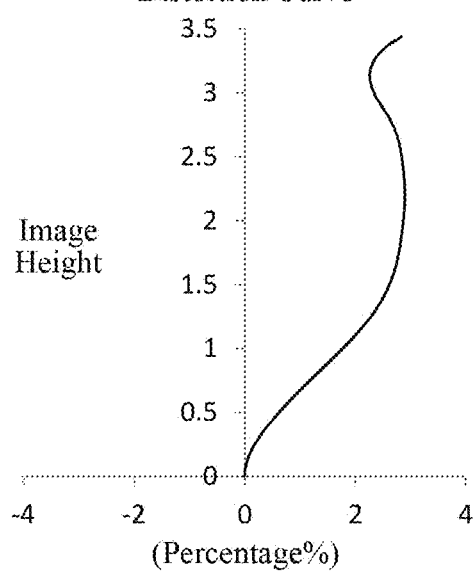
Figure 16D:
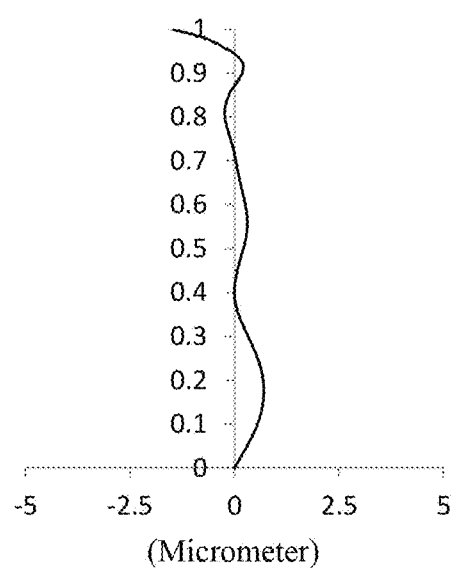

FIG. 16A shows a longitudinal aberration curve of the camera lens assembly of embodiment 8, which represents deviations of focal points converged by light of different wavelengths after passing through the lens assembly. FIG. 16B shows an astigmatism curve of the camera lens assembly of embodiment 8, which represents a curvature of a tangential plane and a curvature of a sagittal plane. FIG. 16C shows a distortion curve of the camera lens assembly of embodiment 8, which represents amounts of distortion at different FOVs. FIG. 16D shows a lateral color curve of the camera lens assembly of embodiment 8, which represents deviations of different image heights on the imaging plane after light passes through the lens assembly. As can be seen from FIG. 16A to FIG. 16D, the camera lens assembly according to embodiment 8 can achieve good imaging quality.

Embodiment 9

Figure 17:
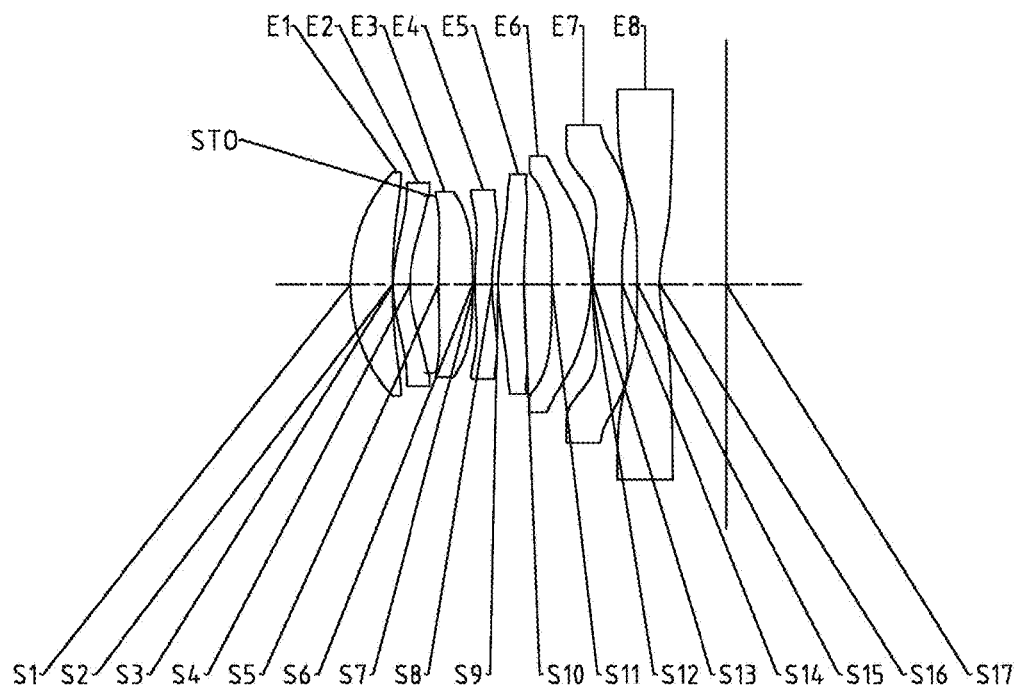
FIG. 17 shows a schematic configuration diagram of a camera lens assembly according to embodiment 9 of the present application.

A camera lens assembly according to embodiment 9 of the present disclosure is described below with reference to FIG. 17 to FIG. 18D. FIG. 17 shows a schematic configuration diagram of the camera lens assembly according to embodiment 9 of the present disclosure.

As shown in FIG. 17, the camera lens assembly according to an exemplary embodiment of the present disclosure includes a first lens E1, a second lens E2, a third lens E3, a fourth lens E4, a fifth lens E5, a sixth lens E6, a seventh lens E7, an eighth lens E8, and an image plane S17, sequentially from an object side of the lens assembly to an image side of the lens assembly along an optical axis.

The first lens E1 has a positive refractive power. An object-side surface S1 of the first lens E1 is a convex surface, and an image-side surface S2 of the first lens E1 is a concave surface. The second lens E2 has a negative refractive power. An object-side surface S3 of the second lens E2 is a convex surface, and an image-side surface S4 of the second lens E2 is a concave surface. The third lens E3 has a positive refractive power. An object-side surface S5 of the third lens E3 is a convex surface, and an image-side surface S6 of the third lens E3 is a convex surface. The fourth lens E4 has a negative refractive power. An object-side surface S7 of the fourth lens E4 is a convex surface, and an image-side surface S8 of the fourth lens E4 is a concave surface. The fifth lens E5 has a positive refractive power. An object-side surface S9 of the fifth lens E5 is a convex surface, and an image-side surface S10 of the fifth lens E5 is a concave surface. The sixth lens E6 has a positive refractive power. An object-side surface S11 of the sixth lens E6 is a concave surface, and an image-side surface S12 of the sixth lens E6 is a convex surface. The seventh lens E7 has a positive refractive power. An object-side surface S13 of the seventh lens E7 is a concave surface, and an image-side surface S14 of the seventh lens E7 is a convex surface. The eighth lens E8 has a negative refractive power. An object-side surface S15 of the eighth lens E8 is a concave surface, and an image-side surface S16 of the eighth lens E8 is a concave surface. Light from an object sequentially passes through the respective surfaces S1 to S16 and is finally imaged on the imaging plane S17.

Alternatively, the camera lens assembly in the present embodiment further includes a stop STO disposed between the second lens E2 and the third lens E3.

Table 25 shows surface type, radius of curvature, thickness, material, and conic coefficient of each lens of the camera lens assembly in embodiment 9, wherein the units for the radius of curvature and the thickness are millimeters (mm). Table 26 shows high-order coefficients that can be used for each aspherical surface in embodiment 9, wherein the surface type of each aspherical surface can be defined by the formula (1) given in embodiment 1 as described above. Table 27 shows effective focal lengths f1 to f8 of the respective lens, a total effective focal length f of the camera lens assembly, a total track length TTL of the camera lens assembly, half of a diagonal length ImgH of the effective pixel area on the imaging plane S17, and a maximal field of view FOV of the camera lens assembly in embodiment 9.

TABLE 25

| Surface number | Surface type | Radius of curvature | Thickness | Material Refractive index | Abbe number | Conic coefficient |
|---|---|---|---|---|---|---|
| OBJ | Spherical | Infinity | Infinity | | | |
| S1 | Aspherical | 2.5387 | 0.5932 | 1.55 | 64.1 | 0.2421 |
| S2 | Aspherical | 6.6086 | 0.0100 | | | −32.0914 |
| S3 | Aspherical | 1.9330 | 0.2400 | 1.67 | 20.4 | −4.7249 |
| S4 | Aspherical | 1.7059 | 0.2782 | | | −3.1783 |
| STO | Spherical | Infinity | 0.1316 | | | |
| S5 | Aspherical | 19.1779 | 0.4821 | 1.55 | 64.1 | 99.0000 |
| S6 | Aspherical | −6.7498 | 0.0300 | | | 22.8455 |
| S7 | Aspherical | 5.5462 | 0.2400 | 1.67 | 20.4 | −84.1529 |
| S8 | Aspherical | 2.6433 | 0.0878 | | | −56.3218 |
| S9 | Aspherical | 2.9930 | 0.3621 | 1.55 | 64.1 | −46.7746 |
| S10 | Aspherical | 8.3593 | 0.3962 | | | −77.9128 |
| S11 | Aspherical | −19.5412 | 0.5514 | 1.67 | 20.4 | 99.0000 |
| S12 | Aspherical | −1.9668 | 0.0300 | | | −7.1194 |
| S13 | Aspherical | −30.2332 | 0.4058 | 1.55 | 64.1 | 99.0000 |
| S14 | Aspherical | −22.6810 | 0.2144 | | | 51.3037 |
| S15 | Aspherical | −31.3542 | 0.3150 | 1.67 | 20.4 | 70.8397 |
| S16 | Aspherical | 1.9487 | 0.9500 | | | −4.1541 |
| S17 | Spherical | Infinity | | | | |

TABLE 26

| Surface number | A4 | A6 | A8 | A10 | A12 |
|---|---|---|---|---|---|
| S1 | 1.1744E−02 | −1.9888E−02 | 3.7203E−02 | −5.4181E−02 | 5.2462E−02 |
| S2 | −5.9188E−02 | 1.5138E−01 | −1.9929E−01 | 1.7487E−01 | −1.0212E−01 |
| S3 | −7.8302E−02 | 6.5293E−02 | −9.0976E−02 | 1.4679E−01 | −1.9309E−01 |
| S4 | −1.5024E−02 | −1.9634E−01 | 6.0759E−01 | −1.2269E+00 | 1.6635E+00 |
| S5 | 1.5390E−02 | −1.7212E−01 | 5.8129E−01 | −1.4079E+00 | 2.1608E+00 |
| S6 | 1.4337E−01 | −7.1698E−01 | 1.5908E+00 | −2.3373E+00 | 2.3649E+00 |
| S7 | 9.2800E−02 | −5.8667E−01 | 1.0600E+00 | −1.1609E+00 | 7.5827E−01 |
| S8 | 1.5549E−01 | −5.5891E−01 | 9.4076E−01 | −1.0984E+00 | 8.6182E−01 |
| S9 | 7.0956E−02 | −6.3793E−02 | −1.4140E−01 | 5.3551E−01 | −7.8454E−01 |
| S10 | −3.5478E−02 | 1.3032E−01 | −3.7496E−01 | 6.4297E−01 | −6.5645E−01 |
| S11 | −4.7776E−02 | 1.6641E−01 | −3.4933E−01 | 4.0046E−01 | −3.1290E−01 |
| S12 | 1.0432E−01 | −2.3244E−01 | 2.1920E−01 | −1.3764E−01 | 5.1965E−02 |
| S13 | 3.3907E−01 | −5.2625E−01 | 3.8498E−01 | −1.7198E−01 | 3.4892E−02 |
| S14 | 3.3959E−01 | −4.3985E−01 | 2.9580E−01 | −1.3689E−01 | 4.4838E−02 |
| S15 | 7.2662E−02 | −2.7268E−01 | 2.5475E−01 | −1.2305E−01 | 3.5913E−02 |
| S16 | −9.9448E−02 | 2.9300E−03 | 2.5877E−02 | −1.3995E−02 | 3.7806E−03 |

| Surface number | A14 | A16 | A18 | A20 |
|---|---|---|---|---|
| S1 | −3.1715E−02 | 1.1485E−02 | −2.2488E−03 | 1.7846E−04 |
| S2 | 3.7091E−02 | −7.5485E−03 | 6.5225E−04 | 1.8126E−06 |
| S3 | 1.5584E−01 | −7.3716E−02 | 1.9258E−02 | −2.1637E−03 |
| S4 | −1.5015E+00 | 8.5800E−01 | −2.7820E−01 | 3.8975E−02 |
| S5 | −2.0864E+00 | 1.2248E+00 | −3.9829E−01 | 5.5017E−02 |
| S6 | −1.6408E+00 | 7.4729E−01 | −2.0069E−01 | 2.3989E−02 |
| S7 | −2.6120E−01 | 2.7102E−02 | 9.0109E−03 | −2.2167E−03 |
| S8 | −4.6816E−01 | 1.8372E−01 | −4.7891E−02 | 6.0094E−03 |
| S9 | 6.0719E−01 | −2.6061E−01 | 5.9021E−02 | −5.5343E−03 |
| S10 | 4.0340E−01 | −1.4802E−01 | 3.0106E−02 | −2.6149E−03 |
| S11 | 1.7053E−01 | −6.0599E−02 | 1.2248E−02 | −1.0426E−03 |
| S12 | −7.3890E−03 | −1.6635E−03 | 7.4403E−04 | −7.7260E−05 |
| S13 | 3.5847E−03 | −3.2056E−03 | 5.7492E−04 | −3.5072E−05 |
| S14 | −1.0101E−02 | 1.4780E−03 | −1.2537E−04 | 4.6357E−06 |
| S15 | −6.6026E−03 | 7.5134E−04 | −4.8466E−05 | 1.3553E−06 |
| S16 | −6.1092E−04 | 6.0017E−05 | −3.3191E−06 | 7.9393E−08 |

TABLE 27

| | | | |
|---|---|---|---|
| f1(mm) | 7.10 | f7(mm) | 161.30 |
| f2(mm) | −37.03 | f8(mm) | −2.65 |
| f3(mm) | 9.10 | f (mm) | 3.84 |
| f4(mm) | −7.58 | TTL (mm) | 5.32 |
| f5(mm) | 8.24 | ImgH (mm) | 3.44 |
| f6(mm) | 3.13 | FOV (°) | 82.6 |

Figures 18A, 18B:
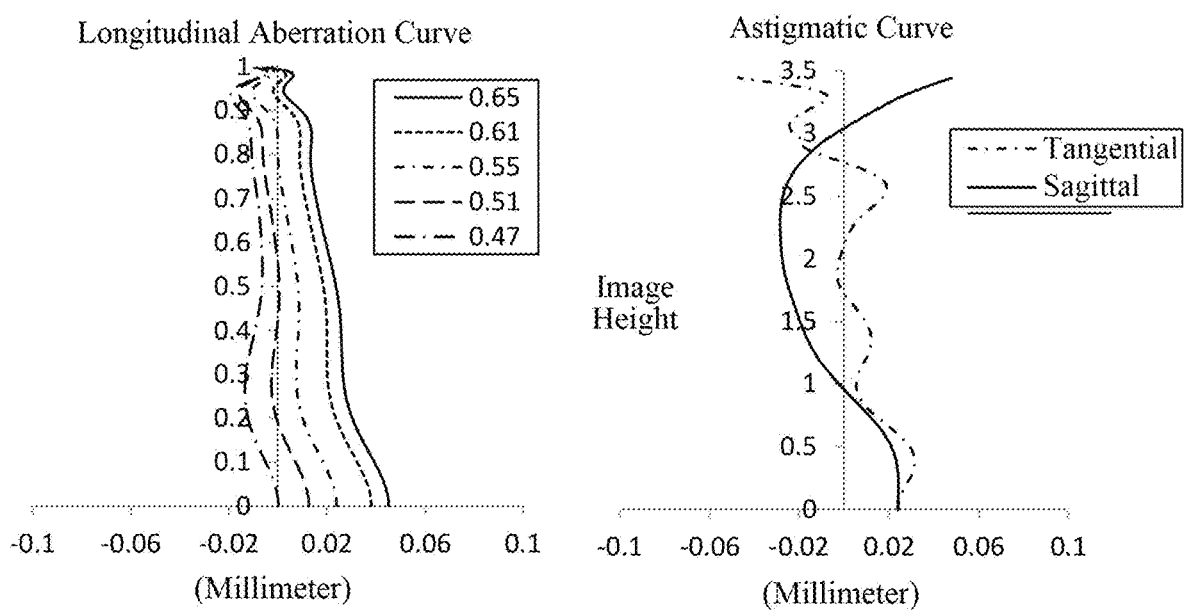

FIG. 18A shows a longitudinal aberration curve of the camera lens assembly of embodiment 9, which represents deviations of focal points converged by light of different wavelengths after passing through the lens assembly. FIG. 18B shows an astigmatism curve of the camera lens assembly of embodiment 9, which represents a curvature of a tangential plane and a curvature of a sagittal plane. FIG. 18C shows a distortion curve of the camera lens assembly of embodiment 9, which represents amounts of distortion at different FOVs. FIG. 18D shows a lateral color curve of the camera lens assembly of embodiment 9, which represents deviations of different image heights on the imaging plane after light passes through the lens assembly. As can be seen from FIG. 18A to FIG. 18D, the camera lens assembly according to embodiment 9 can achieve good imaging quality.

Embodiment 10

A camera lens assembly according to embodiment 10 of the present disclosure is described below with reference to FIG. 19 to FIG. 20D. FIG. 19 shows a schematic configuration diagram of the camera lens assembly according to embodiment 10 of the present disclosure.

As shown in FIG. 19, the camera lens assembly according to an exemplary embodiment of the present disclosure includes a first lens E1, a second lens E2, a third lens E3, a fourth lens E4, a fifth lens E5, a sixth lens E6, a seventh lens E7, an eighth lens E8, and an image plane S17, sequentially from an object side of the lens assembly to an image side of the lens assembly along an optical axis.

The first lens E1 has a positive refractive power. An object-side surface S1 of the first lens E1 is a convex surface, and an image-side surface S2 of the first lens E1 is a concave surface. The second lens E2 has a positive refractive power. An object-side surface S3 of the second lens E2 is a convex surface, and an image-side surface S4 of the second lens E2 is a concave surface. The third lens E3 has a positive refractive power. An object-side surface S5 of the third lens E3 is a concave surface, and an image-side surface S6 of the third lens E3 is a convex surface. The fourth lens E4 has a negative refractive power. An object-side surface S7 of the fourth lens E4 is a concave surface, and an image-side surface S8 of the fourth lens E4 is a concave surface. The fifth lens E5 has a positive refractive power. An object-side surface S9 of the fifth lens E5 is a convex surface, and an image-side surface S10 of the fifth lens E5 is a convex surface. The sixth lens E6 has a positive refractive power. An object-side surface S11 of the sixth lens E6 is a concave surface, and an image-side surface S12 of the sixth lens E6 is a convex surface. The seventh lens E7 has a negative refractive power. An object-side surface S13 of the seventh lens E7 is a concave surface, and an image-side surface S14 of the seventh lens E7 is a convex surface. The eighth lens E8 has a negative refractive power. An object-side surface S15 of the eighth lens E8 is a concave surface, and an image-side surface S16 of the eighth lens E8 is a concave surface. Light from an object sequentially passes through the respective surfaces S1 to S16 and is finally imaged on the imaging plane S17.

Alternatively, the camera lens assembly in the present embodiment further includes a stop STO disposed between the second lens E2 and the third lens E3.

Table 28 shows surface type, radius of curvature, thickness, material, and conic coefficient of each lens of the camera lens assembly in embodiment 10, wherein the units for the radius of curvature and the thickness are millimeters (mm). Table 29 shows high-order coefficients that can be used for each aspherical surface in embodiment 10, wherein the surface type of each aspherical surface can be defined by the formula (1) given in embodiment 1 as described above. Table 30 shows effective focal lengths f1 to f8 of the respective lens, a total effective focal length f of the camera lens assembly, a total track length TTL of the camera lens assembly, half of a diagonal length ImgH of an effective pixel area on the imaging plane S17, and a maximal field of view FOV of the camera lens assembly in embodiment 10.

TABLE 28

| Surface number | Surface type | Radius of curvature | Thickness | Material Refractive index | Material Abbe number | Conic coefficient |
|---|---|---|---|---|---|---|
| OBJ | Spherical | Infinity | Infinity | | | |
| S1 | Aspherical | 2.1474 | 0.6957 | 1.55 | 64.1 | 0.0317 |
| S2 | Aspherical | 4.8352 | 0.1000 | | | −99.0000 |
| S3 | Aspherical | 1.9672 | 0.2023 | 1.67 | 20.4 | −3.5474 |
| S4 | Aspherical | 1.9400 | 0.2111 | | | −1.5904 |
| STO | Spherical | Infinity | 0.1812 | | | |
| S5 | Aspherical | −25.1232 | 0.3604 | 1.55 | 64.1 | −99.0000 |
| S6 | Aspherical | −5.9012 | 0.1000 | | | 24.3094 |
| S7 | Aspherical | −64.8833 | 0.1976 | 1.67 | 20.4 | 99.0000 |
| S8 | Aspherical | 18.8975 | 0.1000 | | | 98.7066 |
| S9 | Aspherical | 21.4299 | 0.3334 | 1.55 | 64.1 | 99.0000 |
| S10 | Aspherical | −23.5723 | 0.4476 | | | 0.8322 |
| S11 | Aspherical | −15.8216 | 0.6285 | 1.67 | 20.4 | 98.3945 |
| S12 | Aspherical | −2.0793 | 0.1005 | | | −7.8118 |
| S13 | Aspherical | −4.5411 | 0.3141 | 1.55 | 64.1 | 2.4988 |
| S14 | Aspherical | −6.5680 | 0.1462 | | | 1.2379 |
| S15 | Aspherical | −6.9740 | 0.4971 | 1.67 | 20.4 | 2.0628 |
| S16 | Aspherical | 2.1123 | 0.8842 | | | −12.5244 |
| S17 | Spherical | Infinity | | | | |

TABLE 29

| Surface number | A4 | A6 | A8 | A10 | A12 |
|---|---|---|---|---|---|
| S1 | 3.3490E−03 | −1.8975E−02 | 4.8288E−02 | −7.1079E−02 | 6.4955E−02 |
| S2 | −2.2112E−02 | 2.6682E−02 | −1.3968E−02 | 3.0379E−03 | −1.9430E−03 |
| S3 | −1.3148E−01 | 1.3939E−01 | −1.9207E−01 | 2.4951E−01 | −2.3558E−01 |
| S4 | −7.6492E−02 | 9.4342E−02 | −4.4730E−01 | 1.4755E+00 | −2.9530E+00 |
| S5 | −1.0978E−02 | −2.1028E−01 | 1.0060E+00 | −3.2253E+00 | 6.5228E+00 |
| S6 | 6.0813E−02 | −6.8049E−01 | 2.1648E+00 | −4.6282E+00 | 6.7594E+00 |

TABLE 29-continued

| | | | | | |
|---|---|---|---|---|---|
| S7 | 1.9943E−01 | −1.3797E+00 | 3.7490E+00 | −6.7991E+00 | 8.2170E+00 |
| S8 | 2.9754E−01 | −1.3995E+00 | 3.2739E+00 | −5.0213E+00 | 5.0568E+00 |
| S9 | 2.0467E−01 | −8.0886E−01 | 1.7449E+00 | −2.3244E+00 | 2.0071E+00 |
| S10 | −1.1395E−03 | −1.2859E−01 | 1.6142E−01 | −6.5531E−02 | 7.7685E−03 |
| S11 | 3.9514E−02 | −1.0637E−01 | 1.0319E−01 | −9.5311E−02 | 6.3693E−02 |
| S12 | 6.0843E−02 | −1.6018E−01 | 1.9649E−01 | −1.6326E−01 | 8.2918E−02 |
| S13 | 1.8072E−01 | −3.5537E−01 | 3.3637E−01 | −2.1392E−01 | 7.8408E−02 |
| S14 | 2.3995E−01 | −2.9180E−01 | 1.9866E−01 | −9.6315E−02 | 3.3402E−02 |
| S15 | 1.6458E−02 | −6.0754E−02 | 4.9329E−02 | −1.9708E−02 | 4.6188E−03 |
| S16 | −5.8665E−02 | 1.5719E−02 | −3.0401E−03 | 8.1089E−04 | −2.4196E−04 |

| Surface number | A14 | A16 | A18 | A20 |
|---|---|---|---|---|
| S1 | −3.7161E−02 | 1.2934E−02 | −2.5186E−03 | 2.1075E−04 |
| S2 | 2.8701E−03 | −1.8230E−03 | 5.5065E−04 | −6.8511E−05 |
| S3 | 1.5255E−01 | −6.5103E−02 | 1.9194E−02 | −3.4181E−03 |
| S4 | 3.7254E+00 | −2.8654E+00 | 1.2284E+00 | −2.2172E−01 |
| S5 | −8.3896E+00 | 6.6807E+00 | −3.0016E+00 | 5.8249E−01 |
| S6 | −6.5986E+00 | 4.1286E+00 | −1.5021E+00 | 2.4259E−01 |
| S7 | −6.4144E+00 | 3.0615E+00 | −7.9394E−01 | 8.2985E−02 |
| S8 | −3.3187E+00 | 1.3671E+00 | −3.1986E−01 | 3.2605E−02 |
| S9 | −1.1405E+00 | 4.1610E−01 | −8.8762E−02 | 8.4134E−03 |
| S10 | −1.5645E−02 | 2.0540E−02 | −8.9237E−03 | 1.3177E−03 |
| S11 | −2.7052E−02 | 7.3729E−03 | −1.4152E−03 | 1.6620E−04 |
| S12 | −2.3772E−02 | 3.4381E−03 | −1.6401E−04 | −6.1042E−06 |
| S13 | −1.1963E−02 | −8.8430E−04 | 5.0439E−04 | −4.4587E−05 |
| S14 | −7.8555E−03 | 1.1688E−03 | −9.8361E−05 | 3.5503E−06 |
| S15 | −6.6260E−04 | 5.7212E−05 | −2.7288E−06 | 5.5144E−08 |
| S16 | 4.6047E−05 | −4.9599E−06 | 2.8235E−07 | −6.6700E−09 |

TABLE 30

| | | | |
|---|---|---|---|
| f1(mm) | 6.40 | f7(mm) | −28.20 |
| f2(mm) | 100.23 | f8(mm) | −2.30 |
| f3(mm) | 13.87 | f (mm) | 4.49 |
| f4(mm) | −21.22 | TTL (mm) | 5.50 |
| f5(mm) | 20.38 | ImgH (mm) | 3.77 |
| f6(mm) | 3.41 | FOV (°) | 79.7 |

Figure 20A:
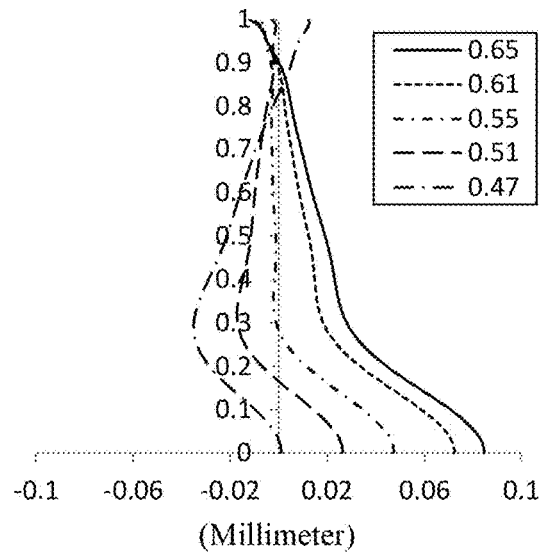
FIG. 20A to 20D show a longitudinal aberration curve, an astigmatism curve, a distortion curve, and a lateral color curve, respectively, of the camera lens assembly of embodiment 10.
Figure 20B:
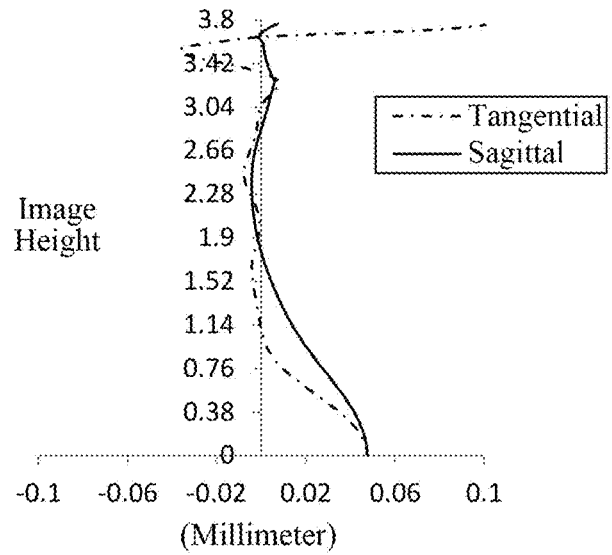
Figure 20C:
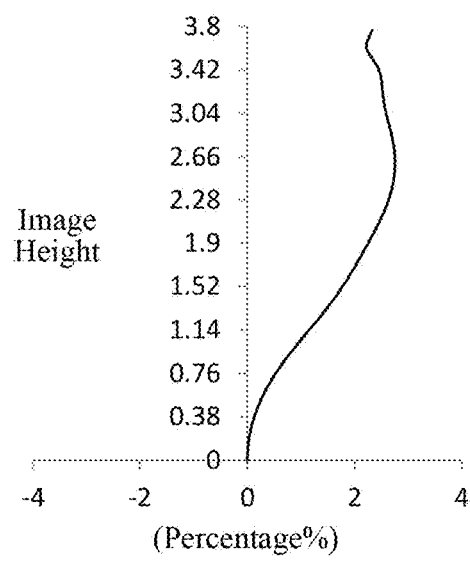
Figure 20D:
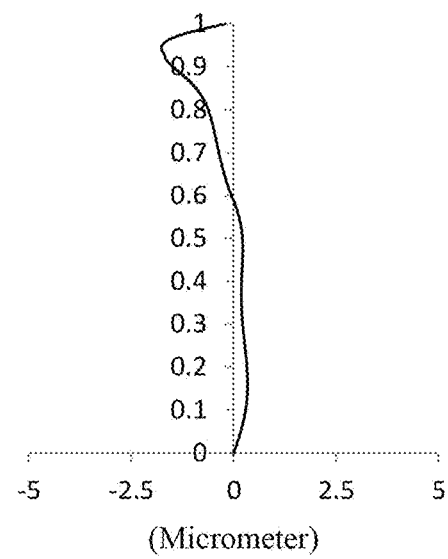

FIG. 20A shows a longitudinal aberration curve of the camera lens assembly of embodiment 10, which represents deviations of focal points converged by light of different wavelengths after passing through the lens assembly. FIG. 20B shows an astigmatism curve of the camera lens assembly of embodiment 10, which represents a curvature of a tangential plane and a curvature of a sagittal plane. FIG. 20C shows a distortion curve of the camera lens assembly of embodiment 10, which represents amounts of distortion at different FOVs. FIG. 20D shows a lateral color curve of the camera lens assembly of embodiment 10, which represents deviations of different image heights on the imaging plane after light passes through the lens assembly. As can be seen from FIG. 20A to FIG. 20D, the camera lens assembly according to embodiment 10 can achieve good imaging quality.

Embodiment 11

Figure 21:
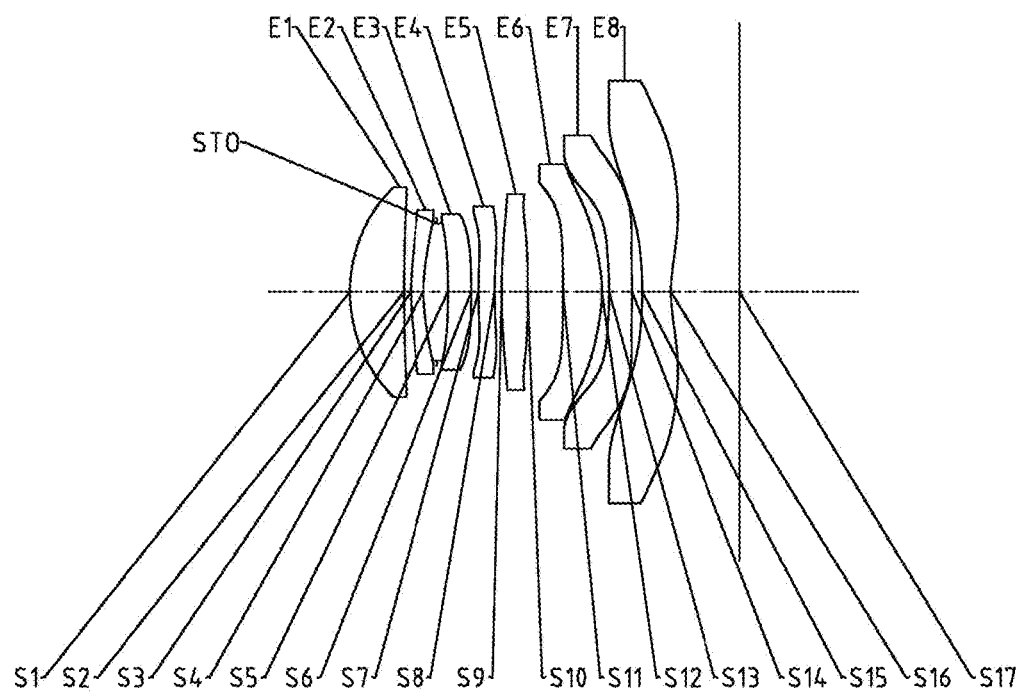
FIG. 21 shows a schematic configuration diagram of a camera lens assembly according to embodiment 11 of the present application.

A camera lens assembly according to embodiment 11 of the present disclosure is described below with reference to FIG. 21 to FIG. 22D. FIG. 21 shows a schematic configuration diagram of the camera lens assembly according to embodiment 11 of the present disclosure.

As shown in FIG. 21, the camera lens assembly according to an exemplary embodiment of the present disclosure includes a first lens E1, a second lens E2, a third lens E3, a fourth lens E4, a fifth lens E5, a sixth lens E6, a seventh lens E7, an eighth lens E8, and an image plane S17, sequentially from an object side of the lens assembly to an image side of the lens assembly along an optical axis.

The first lens E1 has a positive refractive power. An object-side surface S1 of the first lens E1 is a convex surface, and an image-side surface S2 of the first lens E1 is a concave surface. The second lens E2 has a negative refractive power. An object-side surface S3 of the second lens E2 is a convex surface, and an image-side surface S4 of the second lens E2 is a concave surface. The third lens E3 has a negative refractive power. An object-side surface S5 of the third lens E3 is a concave surface, and an image-side surface S6 of the third lens E3 is a convex surface. The fourth lens E4 has a positive refractive power. An object-side surface S7 of the fourth lens E4 is a convex surface, and an image-side surface S8 of the fourth lens E4 is a concave surface. The fifth lens E5 has a positive refractive power. An object-side surface S9 of the fifth lens E5 is a convex surface, and an image-side surface S10 of the fifth lens E5 is a convex surface. The sixth lens E6 has a positive refractive power. An object-side surface S11 of the sixth lens E6 is a concave surface, and an image-side surface S12 of the sixth lens E6 is a convex surface. The seventh lens E7 has a negative refractive power. An object-side surface S13 of the seventh lens E7 is a concave surface, and an image-side surface S14 of the seventh lens E7 is a convex surface. The eighth lens E8 has a negative refractive power. An object-side surface S15 of the eighth lens E8 is a concave surface, and an image-side surface S16 of the eighth lens E8 is a concave surface. Light from an object sequentially passes through the respective surfaces S1 to S16 and is finally imaged on the imaging plane S17.

Alternatively, the camera lens assembly in the present embodiment further includes a stop STO disposed between the second lens E2 and the third lens E3.

Table 31 shows surface type, radius of curvature, thickness, material, and conic coefficient of each lens of the camera lens assembly of embodiment 11, wherein the units for the radius of curvature and the thickness are millimeters (mm). Table 32 shows high-order coefficients that can be used for each aspherical surface in embodiment 11, wherein the surface type of each aspherical surface can be defined by the formula (1) given in embodiment 1 as described above.

Table 33 shows effective focal lengths f1 to f8 of the respective lens, a total effective focal length f of the camera lens assembly, a total track length TTL of the camera lens assembly, half of a diagonal length ImgH of an effective pixel area on the imaging plane S17, and a maximal field of view FOV of the camera lens assembly in embodiment 11.

TABLE 31

| Surface number | Surface type | Radius of curvature | Thickness | Material Refractive index | Abbe number | Conic coefficient |
|---|---|---|---|---|---|---|
| OBJ | Spherical | Infinity | Infinity | | | |
| S1 | Aspherical | 2.1176 | 0.7617 | 1.55 | 64.1 | 0.0688 |
| S2 | Aspherical | 17.7564 | 0.1000 | | | −90.6546 |
| S3 | Aspherical | 3.5265 | 0.1814 | 1.67 | 20.4 | −2.7803 |
| S4 | Aspherical | 2.6131 | 0.1872 | | | −2.0607 |
| STO | Spherical | Infinity | 0.1596 | | | |
| S5 | Aspherical | −9.0111 | 0.3266 | 1.55 | 64.1 | −99.0000 |
| S6 | Aspherical | −10.9063 | 0.1023 | | | 42.9021 |
| S7 | Aspherical | 10.8981 | 0.2263 | 1.67 | 20.4 | −78.8939 |
| S8 | Aspherical | 13.8453 | 0.1000 | | | 87.6394 |
| S9 | Aspherical | 18.6523 | 0.3653 | 1.55 | 64.1 | 99.0000 |
| S10 | Aspherical | −32.0349 | 0.4983 | | | 99.0000 |
| S11 | Aspherical | −15.9232 | 0.5471 | 1.67 | 20.4 | 95.0991 |
| S12 | Aspherical | −2.0938 | 0.1010 | | | −9.7103 |
| S13 | Aspherical | −4.6463 | 0.3233 | 1.55 | 64.1 | 2.3540 |
| S14 | Aspherical | −5.6555 | 0.1422 | | | 2.9839 |
| S15 | Aspherical | −5.7600 | 0.4033 | 1.67 | 20.4 | 1.6439 |
| S16 | Aspherical | 2.1732 | 0.9743 | | | −16.1609 |
| S17 | Spherical | Infinity | | | | |

TABLE 33

| f1(mm) | 4.28 | f7(mm) | −53.21 |
|---|---|---|---|
| f2(mm) | −15.93 | f8(mm) | −2.24 |
| f3(mm) | −100.02 | f (mm) | 4.61 |
| f4(mm) | 72.04 | TTL (mm) | 5.50 |
| f5(mm) | 21.40 | ImgH (mm) | 3.77 |
| f6(mm) | 3.44 | FOV (°) | 77.8 |

Figures 22A, 22B:
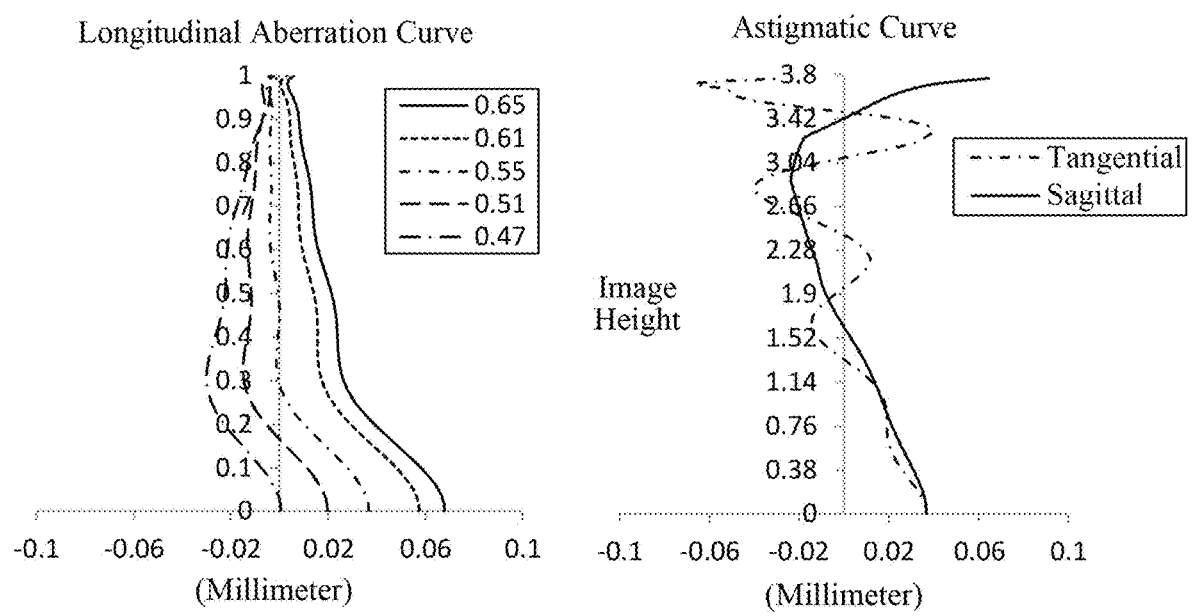
FIG. 22A to 22D show a longitudinal aberration curve, an astigmatism curve, a distortion curve, and a lateral color curve, respectively, of the camera lens assembly of embodiment 11.
Figures 22C, 22D:
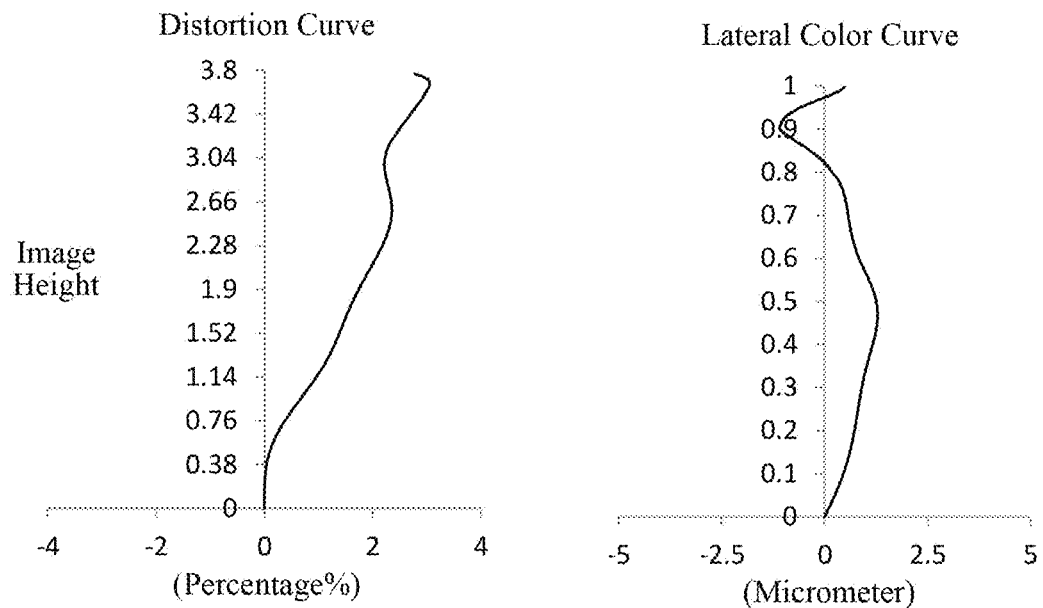

FIG. 22A shows a longitudinal aberration curve of the camera lens assembly of embodiment 11, which represents deviations of focal points converged by light of different wavelengths after passing through the lens assembly. FIG. 22B shows an astigmatism curve of the camera lens assembly of embodiment 11, which represents a curvature of a tangential plane and a curvature of a sagittal plane. FIG. 22C shows a distortion curve of the camera lens assembly of embodiment 11, which represents amounts of distortion at different FOVs. FIG. 22D shows a lateral color curve of the camera lens assembly of embodiment 11, which represents deviations of different image heights on the imaging plane after light passes through the lens assembly. As can be seen from FIG. 22A to FIG. 22D, the camera lens assembly according to embodiment 11 can achieve good imaging quality.

Embodiment 12

A camera lens assembly according to embodiment 12 of the present disclosure is described below with reference to

TABLE 32

| Surface number | A4 | A6 | A8 | A10 | A12 |
|---|---|---|---|---|---|
| S1 | 9.5439E−04 | −7.6314E−03 | 1.8496E−02 | −2.2912E−02 | 1.6554E−02 |
| S2 | −3.0781E−02 | 7.2634E−02 | −1.1715E−01 | 1.4364E−01 | −1.2619E−01 |
| S3 | −1.0358E−01 | 7.1341E−02 | −9.8160E−04 | −1.8293E−01 | 4.1184E−01 |
| S4 | −6.8842E−02 | −1.0316E−01 | 7.3291E−01 | −2.3657E+00 | 4.6581E+00 |
| S5 | 8.2252E−03 | −4.5336E−01 | 2.2983E+00 | −7.1815E+00 | 1.4142E+01 |
| S6 | 5.2161E−02 | −6.1469E−01 | 1.6793E+00 | −2.7012E+00 | 2.4296E+00 |
| S7 | 1.8589E−01 | −1.2642E+00 | 3.4118E+00 | −6.2981E+00 | 7.9010E+00 |
| S8 | 2.8619E−01 | −1.2850E+00 | 2.8482E+00 | −4.1914E+00 | 4.0954E+00 |
| S9 | 2.0079E−01 | −7.8328E−01 | 1.6482E+00 | −2.1617E+00 | 1.8758E+00 |
| S10 | −6.4272E−03 | −1.2076E−01 | 1.8398E−01 | −1.6131E−01 | 1.5159E−01 |
| S11 | 4.1716E−02 | −9.7228E−02 | 7.8021E−02 | −4.7428E−02 | −5.1840E−03 |
| S12 | 5.3438E−02 | −1.2548E−01 | 1.4813E−01 | −1.3173E−01 | 7.4939E−02 |
| S13 | 1.9658E−01 | −4.0674E−01 | 4.3689E−01 | −3.3823E−01 | 1.6905E−01 |
| S14 | 2.6857E−01 | −3.5304E−01 | 2.5726E−01 | −1.3424E−01 | 5.0313E−02 |
| S15 | 1.1351E−02 | −7.7602E−02 | 7.5914E−02 | −3.5771E−02 | 9.8320E−03 |
| S16 | −7.1432E−02 | 1.5759E−02 | 3.0459E−03 | −2.7194E−03 | 7.3378E−04 |

| Surface number | A14 | A16 | A18 | A20 |
|---|---|---|---|---|
| S1 | −6.0513E−03 | 4.7164E−04 | 3.5076E−04 | −8.6067E−05 |
| S2 | 7.4736E−02 | −2.8198E−02 | 6.1043E−03 | −5.7887E−04 |
| S3 | −4.6377E−01 | 2.9820E−01 | −1.0345E−01 | 1.4953E−02 |
| S4 | −5.6943E+00 | 4.2450E+00 | −1.7624E+00 | 3.1156E−01 |
| S5 | −1.7549E+01 | 1.3277E+01 | −5.5743E+00 | 9.8839E−01 |
| S6 | −7.8944E−01 | −5.3912E−01 | 5.6947E−01 | −1.4839E−01 |
| S7 | −6.5375E+00 | 3.3713E+00 | −9.6014E−01 | 1.1237E−01 |
| S8 | −2.6318E+00 | 1.0689E+00 | −2.4689E−01 | 2.4892E−02 |
| S9 | −1.0986E+00 | 4.2455E−01 | −9.8857E−02 | 1.0558E−02 |
| S10 | −1.2953E−01 | 7.2408E−02 | −2.2125E−02 | 2.8079E−03 |
| S11 | 3.2692E−02 | −2.2111E−02 | 6.2512E−03 | −6.4860E−04 |
| S12 | −2.5336E−02 | 4.9431E−03 | −5.1675E−04 | 2.2672E−05 |
| S13 | −5.0968E−02 | 8.9305E−03 | −8.3639E−04 | 3.2346E−05 |
| S14 | −1.2848E−02 | 2.0840E−03 | −1.9166E−04 | 7.5703E−06 |
| S15 | −1.6507E−03 | 1.6699E−04 | −9.3647E−06 | 2.2379E−07 |
| S16 | −1.0913E−04 | 9.5903E−06 | −4.6434E−07 | 9.4238E−09 |

Figure 23:
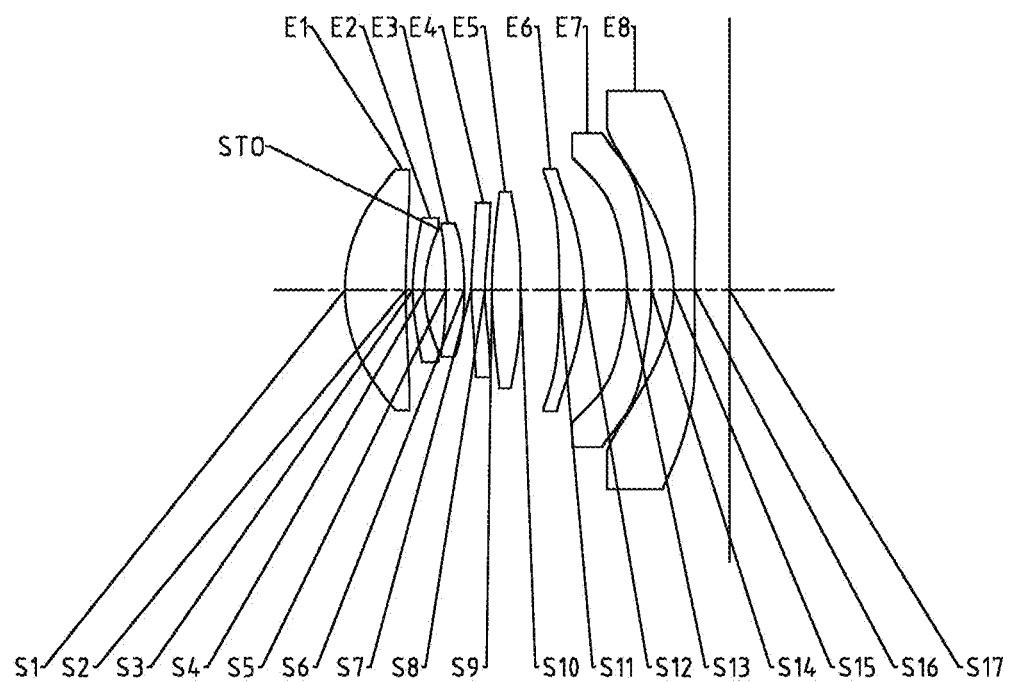
FIG. 23 shows a schematic configuration diagram of a camera lens assembly according to embodiment 12 of the present application.
Figure 24A:
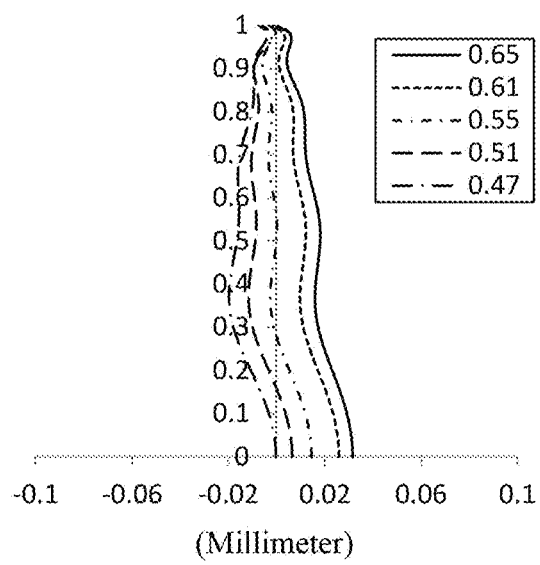
FIG. 24A to 24D show a longitudinal aberration curve, an astigmatism curve, a distortion curve, and a lateral color curve, respectively, of the camera lens assembly of embodiment 12.
Figure 24B:
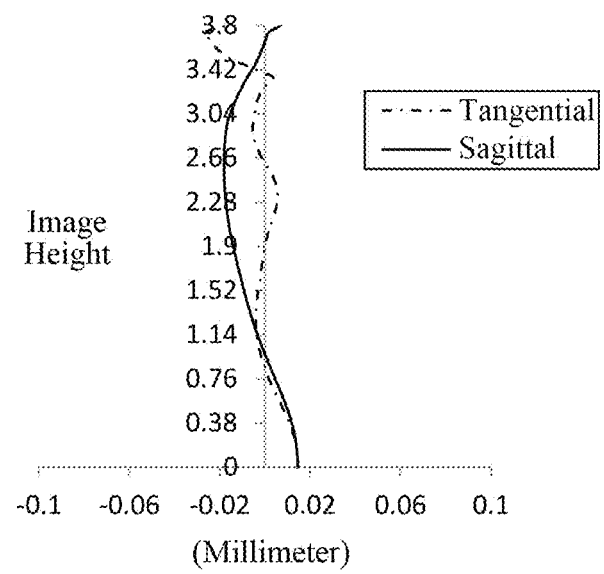
Figure 24C:
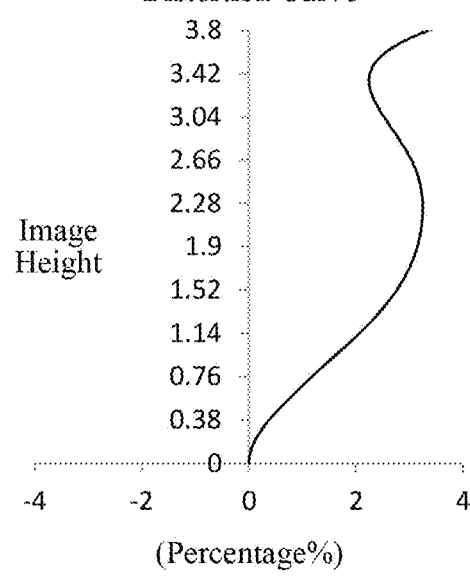
Figure 24D:
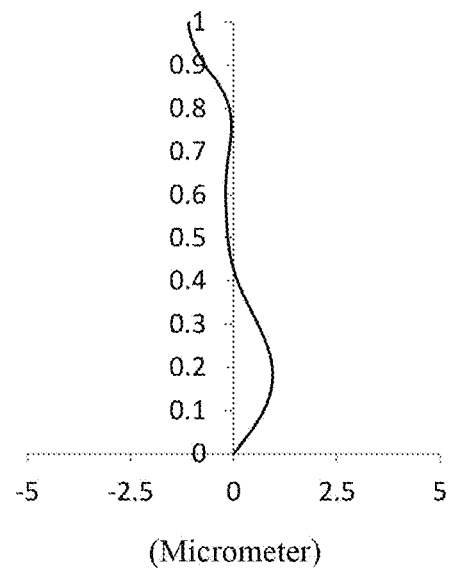

FIG. 23 to FIG. 24D. FIG. 23 shows a schematic configuration diagram of the camera lens assembly according to embodiment 12 of the present disclosure.

As shown in FIG. 23, the camera lens assembly according to an exemplary embodiment of the present disclosure includes a first lens E1, a second lens E2, a third lens E3, a fourth lens E4, a fifth lens E5, a sixth lens E6, a seventh lens E7, an eighth lens E8, and an image plane S17, sequentially from an object side of the lens assembly to an image side of the lens assembly along an optical axis.

The first lens E1 has a positive refractive power. An object-side surface S1 of the first lens E1 is a convex surface, and an image-side surface S2 of the first lens E1 is a concave surface. The second lens E2 has a negative refractive power. An object-side surface S3 of the second lens E2 is a convex surface, and an image-side surface S4 of the second lens E2 is a concave surface. The third lens E3 has a positive refractive power. An object-side surface S5 of the third lens E3 is a concave surface, and an image-side surface S6 of the third lens E3 is a convex surface. The fourth lens E4 has a negative refractive power. An object-side surface S7 of the fourth lens E4 is a convex surface, and an image-side surface S8 of the fourth lens E4 is a concave surface. The fifth lens E5 has a positive refractive power. An object-side surface S9 of the fifth lens E5 is a convex surface, and an image-side surface S10 of the fifth lens E5 is a convex surface. The sixth lens E6 has a positive refractive power. An object-side surface S11 of the sixth lens E6 is a concave surface, and an image-side surface S12 of the sixth lens E6 is a convex surface. The seventh lens E7 has a negative refractive power. An object-side surface S13 of the seventh lens E7 is a concave surface, and an image-side surface S14 of the seventh lens E7 is a convex surface. The eighth lens E8 has a negative refractive power. An object-side surface S15 of the eighth lens E8 is a concave surface, and an image-side surface S16 of the eighth lens E8 is a convex surface. Light from an object sequentially passes through the respective surfaces S1 to S16 and is finally imaged on the imaging plane S17.

Alternatively, the camera lens assembly in the present embodiment further includes a stop STO disposed between the second lens E2 and the third lens E3.

Table 34 shows surface type, radius of curvature, thickness, material, and conic coefficient of each lens of the camera lens assembly in embodiment 12, wherein the units for the radius of curvature and the thickness are millimeters (mm). Table 35 shows high-order coefficients that can be used for each aspherical surface in embodiment 12, wherein the surface type of each aspherical surface can be defined by the formula (1) given in embodiment 1 as described above. Table 36 shows effective focal lengths f1 to f8 of the respective lens, a total effective focal length f of the camera lens assembly, a total optical length TTL of the camera lens assembly, half of a diagonal length ImgH of an effective pixel area on the imaging plane S17, and a maximal field of view FOV of the camera lens assembly in embodiment 12.

TABLE 34

| Surface number | Surface type | Radius of curvature | Thickness | Material Refractive index | Abbe number | Conic coefficient |
|---|---|---|---|---|---|---|
| OBJ | Spherical | Infinity | Infinity | | | |
| S1 | Aspherical | 2.2321 | 0.8710 | 1.55 | 64.1 | −0.2804 |
| S2 | Aspherical | 15.2825 | 0.1000 | | | −24.4451 |
| S3 | Aspherical | 3.0945 | 0.1700 | 1.67 | 20.4 | −1.7754 |
| S4 | Aspherical | 1.9343 | 0.2013 | | | −0.0717 |
| STO | Spherical | Infinity | 0.1025 | | | |
| S5 | Aspherical | −6.1764 | 0.2637 | 1.55 | 64.1 | 1.5036 |
| S6 | Aspherical | −4.0753 | 0.1000 | | | 8.2298 |
| S7 | Aspherical | 4.9837 | 0.1940 | 1.67 | 20.4 | −41.6968 |
| S8 | Aspherical | 3.6451 | 0.1000 | | | −85.8843 |
| S9 | Aspherical | 5.8995 | 0.4118 | 1.55 | 64.1 | −99.0000 |
| S10 | Aspherical | −13.0643 | 0.5544 | | | −15.8338 |
| S11 | Aspherical | −13.7219 | 0.3500 | 1.67 | 20.4 | 50.1648 |
| S12 | Aspherical | −2.8285 | 0.6140 | | | −6.0037 |
| S13 | Aspherical | −3.0534 | 0.3500 | 1.55 | 64.1 | 0.1068 |
| S14 | Aspherical | −4.3896 | 0.3171 | | | 1.9522 |
| S15 | Aspherical | −2.1078 | 0.3000 | 1.67 | 20.4 | −0.6108 |
| S16 | Aspherical | −640.0704 | 0.5000 | | | 99.0000 |
| S17 | Spherical | Infinity | | | | |

TABLE 35

| Surface number | A4 | A6 | A8 | A10 | A12 |
|---|---|---|---|---|---|
| S1 | 2.1900E−05 | 5.7036E−03 | −1.2398E−02 | 1.5688E−02 | −1.2846E−02 |
| S2 | 2.5736E−02 | −7.1904E−02 | 1.0461E−01 | −1.0083E−01 | 6.4824E−02 |
| S3 | 4.0233E−03 | −1.2999E−01 | 1.8248E−01 | −1.6610E−01 | 1.9993E−01 |
| S4 | 2.6648E−03 | −1.7368E−01 | 8.2638E−01 | −3.3442E+00 | 9.0883E+00 |
| S5 | 4.4922E−02 | −1.5435E−01 | 3.0077E−01 | −5.4617E−01 | 5.8684E−01 |
| S6 | 1.0266E−01 | −4.6409E−01 | 1.4415E+00 | −4.4743E+00 | 1.0865E+01 |
| S7 | 6.3688E−02 | −3.3433E−01 | 6.2083E−01 | −9.1508E−01 | 1.0361E+00 |
| S8 | 1.2637E−01 | −4.1427E−01 | 7.2566E−01 | −9.4070E−01 | 8.3794E−01 |
| S9 | −4.8798E−03 | −1.0123E−02 | 7.5315E−02 | −1.0076E−01 | 5.8658E−02 |
| S10 | −4.2233E−02 | −1.0273E−05 | 2.7655E−02 | −4.7199E−02 | 7.7800E−02 |
| S11 | 1.9879E−02 | −6.0799E−02 | 1.0027E−01 | −1.2833E−01 | 9.8888E−02 |
| S12 | 1.7212E−02 | −3.2340E−02 | 5.5607E−02 | −7.0610E−02 | 4.7653E−02 |
| S13 | −2.9266E−02 | 1.2706E−01 | −1.3414E−01 | 6.9423E−02 | −2.3344E−02 |
| S14 | −9.9691E−02 | 2.4593E−01 | −2.2328E−01 | 1.1228E−01 | −3.5013E−02 |
| S15 | −3.3555E−02 | 1.2156E−01 | −1.4417E−01 | 9.4123E−02 | −3.6292E−02 |
| S16 | 3.7267E−02 | −4.5457E−02 | 2.0142E−02 | −5.2170E−03 | 8.6805E−04 |

TABLE 35-continued

| Surface number | A14 | A16 | A18 | A20 |
|---|---|---|---|---|
| S1 | 6.6033E-03 | -2.0723E-03 | 3.5456E-04 | -2.4609E-05 |
| S2 | -2.7428E-02 | 7.3099E-03 | -1.1020E-03 | 7.0935E-05 |
| S3 | -2.8472E-01 | 2.6926E-01 | -1.3372E-01 | 2.6276E-02 |
| S4 | -1.5060E+01 | 1.4692E+01 | -7.6935E+00 | 1.6575E+00 |
| S5 | -1.4562E-01 | -2.7819E-01 | 2.4572E-01 | -5.9804E-02 |
| S6 | -1.7491E+01 | 1.7242E+01 | -9.3676E+00 | 2.1300E+00 |
| S7 | -7.4968E-01 | 3.1776E-01 | -7.1996E-02 | 6.7473E-03 |
| S8 | -4.7016E-01 | 1.5690E-01 | -2.8393E-02 | 2.1441E-03 |
| S9 | -1.4800E-02 | 3.1034E-04 | 5.2318E-04 | -6.7874E-05 |
| S10 | -7.7481E-02 | 4.0514E-02 | -1.0408E-02 | 1.0405E-03 |
| S11 | -4.4876E-02 | 1.1882E-02 | -1.6992E-03 | 1.0112E-04 |
| S12 | -1.7275E-02 | 3.4152E-03 | -3.4633E-04 | 1.4010E-05 |
| S13 | 5.5824E-03 | -8.9720E-04 | 8.3471E-05 | -3.3101E-06 |
| S14 | 6.9231E-03 | -8.4933E-04 | 5.9929E-05 | -1.9041E-06 |
| S15 | 8.5065E-03 | -1.1938E-03 | 9.2560E-05 | -3.0614E-06 |
| S16 | -9.4588E-05 | 6.5274E-06 | -2.5651E-07 | 4.3018E-09 |

TABLE 36

| f1(mm) | 4.62 | f7(mm) | -20.03 |
|---|---|---|---|
| f2(mm) | -7.96 | f8(mm) | -3.07 |
| f3(mm) | 20.76 | f (mm) | 4.35 |
| f4(mm) | -20.93 | TTL (mm) | 5.50 |
| f5(mm) | 7.42 | ImgH (mm) | 3.88 |
| f6(mm) | 5.10 | FOV (°) | 81.6 |

FIG. 24A shows a longitudinal aberration curve of the camera lens assembly of embodiment 12, which represents deviations of focal points converged by light of different wavelengths after passing through the lens assembly. FIG. 24B shows an astigmatism curve of the camera lens assembly of embodiment 12, which represents a curvature of a tangential plane and a curvature of a sagittal plane. FIG. 24C shows a distortion curve of the camera lens assembly of embodiment 12, which represents amounts of distortion at different FOVs. FIG. 24D shows a lateral color curve of the camera lens assembly of embodiment 12, which represents deviations of different image heights on the imaging plane after light passes through the lens assembly. As can be seen from FIG. 24A to FIG. 24D, the camera lens assembly according to embodiment 12 can achieve good imaging quality.

In view of the above, embodiments 1 to 12 respectively satisfy the relationship shown in Table 37 below.

TABLE 37

| | Example | | | | | | | | | | | |
|---|---|---|---|---|---|---|---|---|---|---|---|---|
| Formula | 1 | 2 | 3 | 4 | 5 | 6 | 7 | 8 | 9 | 10 | 11 | 12 |
| f/EPD | 1.71 | 1.71 | 1.71 | 1.71 | 1.63 | 1.51 | 1.44 | 1.38 | 1.35 | 1.80 | 1.90 | 1.98 |
| TTL/ImgH | 1.46 | 1.46 | 1.24 | 1.47 | 1.46 | 1.46 | 1.55 | 1.58 | 1.55 | 1.57 | 1.46 | 1.42 |
| FOV (°) | 78.6 | 78.4 | 78.4 | 78.2 | 79.3 | 79.5 | 77.5 | 78.4 | 82.6 | 79.7 | 77.8 | 81.7 |
| f2/f | -2.32 | -2.24 | -2.20 | -2.20 | -3.09 | -2.72 | -5.55 | -5.92 | -9.64 | 22.31 | -3.45 | -1.83 |
| f4/f | -13.50 | 22.03 | 8.32 | -33.38 | -43.38 | -6.22 | -2.46 | -2.03 | -1.97 | -4.72 | 15.61 | -4.81 |
| f7/f | -10.33 | -13.05 | -21.44 | 22.12 | -10.29 | -13.19 | -10.33 | -23.66 | 41.98 | -6.28 | -11.53 | -4.60 |
| R11/R12 | 7.75 | 7.68 | 7.66 | 7.41 | 7.79 | 7.92 | 8.00 | 8.16 | 9.94 | 7.61 | 7.60 | 4.85 |
| CT1/CT2 | 4.53 | 4.52 | 4.46 | 4.52 | 4.43 | 3.50 | 3.41 | 3.29 | 2.47 | 3.44 | 4.20 | 5.12 |
| (TTL/ImgH)/(f/EPD) | 0.85 | 0.85 | 0.73 | 0.86 | 0.90 | 0.97 | 1.08 | 1.14 | 1.15 | 0.87 | 0.77 | 0.72 |
| f7/f8 | 19.92 | 25.85 | 42.78 | -44.35 | 19.62 | 24.68 | 17.73 | 37.26 | -60.82 | 12.25 | 23.72 | 6.53 |
| f7/R6 | 7.84 | 9.94 | 16.39 | -16.75 | 7.61 | 9.19 | 6.81 | 14.53 | -23.90 | 4.78 | 4.88 | 4.91 |

The present disclosure further provides an imaging apparatus, having a photosensitive element which may be a photosensitive charge-coupled device (CCD) or a complementary metal-oxide semiconductor (CMOS). The imaging apparatus may be an independent imaging device such as a digital camera, or may be an imaging module integrated in a mobile electronic device such as a mobile phone. The imaging apparatus is equipped with the camera lens assembly described above.

The above disclosure is provided just to describe the preferred embodiments of the present disclosure and the related technical principles. It should be appreciated by those skilled in the art that the inventive scope of the present disclosure is not limited to the technical solutions formed by the particular combinations of the above technical features. The inventive scope should also cover other technical solutions formed by any other combinations of the above technical features or equivalent features thereof without departing from the concept of the invention, such as, technical solutions formed by replacing the features as disclosed in the present disclosure with (but not limited to), technical features with similar functions.

What is claimed is:

1. A camera lens assembly, wherein, sequentially from an object side of the lens assembly to an image side of the assembly along an optical axis, the lens assembly comprises:
   a first lens having a positive refractive power, an image-side surface of the first lens is a concave surface;
   a second lens having a refractive power;
   a third lens having a refractive power;
   a fourth lens having a refractive power;
   a fifth lens having a refractive power;
   a sixth lens having a positive refractive power, an object-side surface of the sixth lens is a concave surface;

a seventh lens having a refractive power;
an eighth lens having a negative refractive power, an object-side surface of the eighth lens is concave surface; and
wherein, the camera lens assembly satisfies: f/EPD≤2.0, where f is a total effective focal length of the camera lens assembly and EPD is an entrance pupil diameter of the camera lens assembly.

2. The camera lens assembly according to claim 1, wherein the camera lens assembly satisfies: TTL/ImgH≤1.6, where TTL is a total track length of the camera lens assembly and ImgH is half of a diagonal length of an effective pixel area on an imaging plane of the camera lens assembly.

3. The camera lens assembly according to claim 2, wherein the camera lens assembly satisfies: 75°<FOV<85°, where FOV is a full field of view of the camera lens assembly.

4. The camera lens assembly according to claim 2, wherein the camera lens assembly further comprises a stop disposed between the second lens and the third lens.

5. The camera lens assembly according to claim 1, wherein the camera lens assembly satisfies: −10<f2/f<25, wherein f2 is an effective focal length of the second lens.

6. The camera lens assembly according to claim 1, wherein the camera lens assembly satisfies: −45<f4/f<25, where f4 is an effective focal length of the fourth lens.

7. The camera lens assembly according to claim 1, wherein the camera lens assembly satisfies: −30<f7/f<50, where f7 is an effective focal length of the seventh lens.

8. The camera lens assembly according to claim 1, wherein the camera lens assembly satisfies: 4<R11/R12<10, where R11 is a radius of curvature of the object-side surface of the sixth lens and R12 is a radius of curvature of an image-side surface of the sixth lens.

9. The camera lens assembly according to claim 2, wherein the camera lens assembly satisfies: 0.5<(TTL/ImgH)/(f/EPD)≤1.5.

10. The camera lens assembly according to claim 1, wherein the camera lens assembly satisfies: −65<f7/f8<45, where f7 is an effective focal length of the seventh lens and f8 is an effective focal length of the eighth lens.

11. The camera lens assembly according to claim 1, wherein the camera lens assembly satisfies: −25<f7/R6<20, where f7 is an effective focal length of the seventh lens and R6 is a radius of curvature of an image-side surface of the third lens.

12. The camera lens assembly, wherein, sequentially from an object side of the camera lens assembly to an image side of the camera lens assembly along an optical axis, the lens assembly comprises:
a first lens having a positive refractive power, an image-side surface of the first lens is a concave surface;
a second lens having a refractive power;
a third lens having a refractive power;
a fourth lens having a refractive power;
a fifth lens having a refractive power;
a sixth lens having a positive refractive power, an object-side surface of the sixth lens is a concave surface;
a seventh lens having a refractive power;
an eighth lens having a negative refractive power, an object-side surface of which is a concave surface; and
wherein the camera lens assembly satisfies: 2<CT1/CT2<6, where CT1 is a center thickness of the first lens on the optical axis and CT2 is a center thickness of the second lens on the optical axis.

13. The camera lens assembly according to claim 12, wherein the camera lens assembly satisfies: −10<f2/f<25, where f2 is an effective focal length of the second lens and f is a total effective focal length of the camera lens assembly.

14. The camera lens assembly according to claim 12, wherein the camera lens assembly satisfies: −45<f4/f<25, where f4 is an effective focal length of the fourth lens and f is a total effective focal length of the camera lens assembly.

15. The camera lens assembly according to claim 12, wherein the camera lens assembly satisfies: −30<f7/f<50, where f7 is an effective focal length of the seventh lens and f is a total effective focal length of the camera lens assembly.

16. The camera lens assembly according to claim 12, wherein the camera lens assembly satisfies: −65<f7/f8<45, where f7 is an effective focal length of the seventh lens and f8 is an effective focal length of the eighth lens.

17. The camera lens assembly according to claim 12, wherein the camera lens assembly satisfies: −25<f7/R6<20, where f7 is an effective focal length of the seventh lens and R6 is a radius of curvature of an image-side surface of the third lens.

18. The camera lens assembly according to claim 12, wherein the camera lens assembly satisfies: 4<R11/R12<10, where R11 is a radius of curvature of the object-side surface of the sixth lens and R12 is a radius of curvature of an image-side surface of the sixth lens.

19. The camera lens assembly according to claim 12, wherein the camera lens assembly satisfies: 75°<FOV<85°, where FOV is a full field of view of the camera lens assembly.

20. The camera lens assembly according to claim 12, wherein the camera lens assembly satisfies:

$$0.5<(TTL/ImgH)/(f/EPD)\leq1.5,$$

where,
TTL is a total track length of the camera lens assembly,
ImgH is half of a diagonal length of an effective pixel area on an imaging plane of the camera lens assembly,
f is a total effective focal length of the camera lens assembly, and
EPD is an entrance pupil diameter of the camera lens assembly.

* * * * *

UNITED STATES PATENT AND TRADEMARK OFFICE
CERTIFICATE OF CORRECTION

PATENT NO. : 11,460,671 B2  
APPLICATION NO. : 16/843626  
DATED : October 4, 2022  
INVENTOR(S) : Bo Song and Jianke Wenren Page 1 of 1

It is certified that error appears in the above-identified patent and that said Letters Patent is hereby corrected as shown below:

On the Title Page

Column 1, Item (30) Foreign Application Priority Data should be added, and under it should include:  
--Nov. 10, 2017 (CN) .....................................201711105103.4  
Nov. 10, 2017 (CN) .....................................201721494117.5--

Signed and Sealed this  
Seventh Day of January, 2025

Derrick Brent  
*Acting Director of the United States Patent and Trademark Office*